United States Patent [19]
Aizawa et al.

[11] Patent Number: 5,683,149
[45] Date of Patent: Nov. 4, 1997

[54] HYDRAULIC PRESSURE CONTROL APPARATUS HAVING DEVICE FOR ESTIMATING AMOUNT OF FLUID IN RESERVOIR TO WHICH THE FLUID IS DISCHARGED TO REDUCE CYLINDER PRESSURE

[75] Inventors: Hideyuki Aizawa; Masayuki Soga, both of Susono; Kiyoyuki Uchida, Kohnan, all of Japan

[73] Assignee: Toyota Jidosha Kabushiki Kaisha, Toyota, Japan

[21] Appl. No.: 627,962

[22] Filed: Apr. 2, 1996

[30] Foreign Application Priority Data

Apr. 5, 1995 [JP] Japan ................................. 7-80162
Apr. 5, 1995 [JP] Japan ................................. 7-80163
Feb. 6, 1996 [JP] Japan ................................. 8-19692

[51] Int. Cl.$^6$ ............................................... B60T 8/32
[52] U.S. Cl. ............... 303/10; 303/113.5; 303/116.1; 303/166; 303/DIG. 4; 303/122.13
[58] Field of Search ................... 303/10, 11, 116.1, 303/116.2, 116.3, 116.4, DIG. 3, DIG. 4, 113.1, 166, 119.1, 68-69, 122.12, 122.08, 122.13, 113.5; 188/181 R; 364/426.015

[56] References Cited

U.S. PATENT DOCUMENTS 5,558,414   9/1996   Kubota ............................... 303/10

FOREIGN PATENT DOCUMENTS 63-189776   12/1988   Japan .
1-119462    5/1989    Japan .
5-78462     10/1993   Japan .

Primary Examiner—Douglas C. Butler
Attorney, Agent, or Firm—Kenyon & Kenyon

[57] ABSTRACT

A vehicle brake cylinder pressure control apparatus wherein an amount of fluid flow into a reservoir is estimated based on vehicle deceleration and a pressure reducing time of the brake cylinder, while an amount of fluid flow from the reservoir is estimated based on a pumping time during which the fluid is pumped up from the reservoir by a pump, and the vehicle deceleration or an operating speed of a pump motor, so that an amount of the fluid stored in the reservoir is estimated on the basis of the amounts of the flow flows into and from the reservoir. Various parameters may be used in place of the vehicle deceleration, pumping time and motor operating speed, for estimating the amounts of the fluid flow into and from the reservoir and the reservoir fluid amount.

52 Claims, 32 Drawing Sheets

DATA MAP FOR DETERMINING COEFFICIENT KFLUID

FIG. 15

DATA MAP FOR DETERMINING FLOW-IN
RATE COEFFICIENTS A-F

| CONTINUOUS PRESSURE REDUCING TIME | | Kf | | |
|---|---|---|---|---|
| T$_{Dx}$ < T$_{D1}$ | A, B | Afr, Bfr | Afr', Bfr' |
| T$_{D1}$ ≦ T$_{Dx}$ ≦ T$_{D2}$ | C, D | Cfr, Dfr | Cfr', Dfr' |
| T$_{D2}$ < T$_{Dx}$ < T$_{D3}$ | E, F | Efr, Ffr | Efr', Ffr' |

FIG. 16

DATA MAP FOR DETERMINING FLOW-IN
RATE COEFFICIENTS A-F

| CONTINUOUS PRESSURE REDUCING TIME | Kr | | | |
|---|---|---|---|---|
| T$_{Dx}$ < T$_{D1}$ | Ar, Br | Ar', Br' | Arf, Brf | Arf', Brf' |
| T$_{D1}$ ≦ T$_{Dx}$ ≦ T$_{D2}$ | Cr, Dr | Cr', Dr' | Crf, Drf | Crf', Drf' |
| T$_{D2}$ < T$_{Dx}$ < T$_{D3}$ | Er, Fr | Er', Fr' | Erf, Frf | Erf', Frf' |

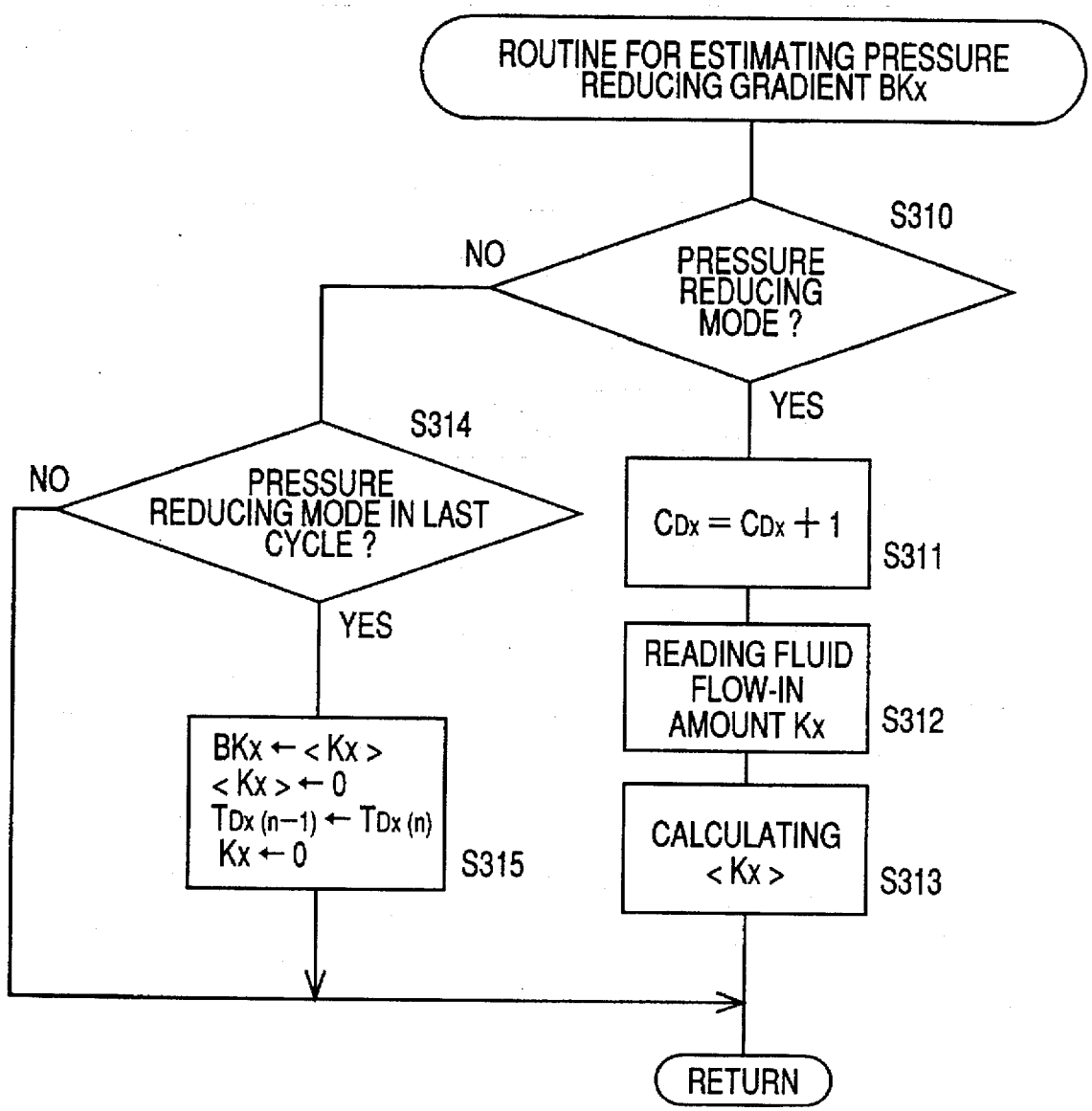

HYDRAULIC PRESSURE CONTROL APPARATUS HAVING DEVICE FOR ESTIMATING AMOUNT OF FLUID IN RESERVOIR TO WHICH THE FLUID IS DISCHARGED TO REDUCE CYLINDER PRESSURE

BACKGROUND OF THE INVENTION

1. Field of the Invention

The present invention relates in general to a hydraulic pressure control apparatus or hydraulic braking apparatus of a motor vehicle, which is capable of controlling, in an anti-lock fashion, a pressure in a wheel brake cylinder of a hydraulically operated brake for braking a wheel of the vehicle, while a master cylinder is disconnected from the wheel brake cylinder. More particularly, this invention is concerned with such a vehicle braking apparatus adapted to reduce the pressure of a working fluid in the wheel brake cylinder by discharging the fluid from the wheel brake cylinder to a reservoir, and increase the fluid pressure in the wheel brake cylinder by pressurizing the fluid received from the reservoir and delivering the pressurized fluid back to the wheel brake cylinder.

2. Discussion of the Related Art

An example of a hydraulically operated braking apparatus of the type indicated above is disclosed in JP-A-119462. This braking apparatus includes (a) a master cylinder having a pressurizing chamber, (b) a wheel brake cylinder for braking a wheel of a motor vehicle, which cylinder is connected to the master cylinder, (c) a reservoir for storing a working fluid, (d) a pump for pressurizing the fluid received from the reservoir and delivering the pressurized fluid to the wheel brake cylinder, (e) a first valve device which is selectively placed in one of a first state in which the wheel brake cylinder is communicated with the master cylinder and is disconnected from the reservoir, a second state in which the wheel brake cylinder is disconnected from both of the master cylinder and the reservoir, and a third state in which the wheel brake cylinder is disconnected from the master cylinder and communicated with the reservoir, (f) a second valve device which is selectively placed in one of a connecting state in which the pump and the reservoir are communicated with each other, and a disconnecting state in which the pump and the reservoir are disconnected from each other, and (g) an anti-lock pressure control means for controlling the fluid pressure in the wheel brake cylinder so as to maintain a slip ratio of the wheel at a substantially optimum value, by selectively placing the first valve device in the second and third states and selectively placing the second valve device in the connecting and disconnecting states. The anti-lock pressure control means includes reservoir fluid amount estimating means for estimating an amount of the fluid stored in the reservoir (hereinafter referred to as "reservoir fluid amount"), on the basis of a pressure reducing time during which the first valve device is held in the third state, and a pressure increasing time during which the second valve device is held in the connecting state.

In the braking apparatus constructed as described above, upon operation of the first valve device to the third state, the wheel brake cylinder is communicated with the reservoir so that the fluid is discharged from the wheel brake cylinder into the reservoir. When the pump is operated while the second valve device is placed in the connecting state, the fluid received from the pump is pressurized by the pump, and the pressurized fluid is delivered to the wheel brake cylinder. Accordingly, the reservoir fluid amount can be estimated on the basis of the pressure reducing time during which the fluid discharged from the wheel brake cylinder is introduced into the reservoir, and the pressure increasing time during which the pressurized fluid is delivered from the pump to the wheel brake cylinder. The pressure increasing time may be considered to be a pumping time during which the fluid is pumped up by the pump and delivered to the wheel brake cylinder.

If the estimated reservoir fluid amount is reduced below a predetermined threshold, the first valve device is returned to the first state for fluid communication of the master cylinder with the wheel brake cylinder.

In the braking apparatus indicated above, the reservoir and the pump are provided for each of the four wheel brake cylinders, whereby the braking system for the vehicle tends to be expensive, and the vehicle tends to have a large weight.

These problems may be solved if the braking apparatus is adapted such that a brake application circuit includes two wheel brake cylinders (e.g., right and left wheel brake cylinders), as in a diagonal or X-crossing braking system in which one of the two sub-systems includes brake cylinders for a front right wheel and a rear left 10 wheel of the vehicle, while the other sub-system includes brake cylinders for a front left wheel and a rear right wheel of the vehicle. In this type of braking system in which each of the two pressure application sub-systems includes two wheel brake cylinders, the reservoir and pump as indicated above are provided for each pressure application sub-system, and only the two reservoirs and only the two pumps are required for the braking system, whereby the weight of the vehicle is accordingly reduced.

In the braking apparatus having two wheel brake cylinders in one brake application circuit, however, there arises another problem of increased complexity in detecting the pressure reducing and increasing times or in operations to estimate the reservoir fluid amount on the basis of the detected pressure reducing and increasing times.

An example of a pressure application sub-system of the diagonal type braking system is shown in FIG. 27. This pressure application sub-system includes (1) a master cylinder 300 having two pressurizing chambers, (2) a front and a rear wheel brake cylinder 304, 306 for a front and a rear wheel of a motor vehicle, which brake cylinders are connected two respective fluid passages which extend from the respective two pressurizing chambers of the master cylinder 300 independently of each other, (3) a first solenoid-operated shut-off valve 310 which is selectively placed in one of a connecting state in which the front and rear wheel brake cylinders 304, 306 are communicated with the master cylinder 300, and a disconnecting state in which the wheel brake cylinders 304, 306 are disconnected from the master cylinder 300, (4) a reservoir 312 for storing a working fluid, (5) a pump 314 for pressurizing the fluid received from the reservoir 312 and delivering the pressurized fluid to the front and rear wheel brake cylinders 304, 306, (6) a valve device 316 which is selectively placed in one of a first state for permitting discharge flows of the fluid from the front and rear wheel brake cylinders 304, 306 to the reservoir 312, a second state for permitting a discharge flow of the fluid from the rear wheel brake cylinder 306 to the reservoir 312 and inhibiting a discharge flow of the fluid from the front wheel brake cylinder 304 to the reservoir 312, and a third state for inhibiting the discharge flows of the fluid from the front and rear wheel brake cylinders 304, 306 and permitting a delivery of the pressurized fluid from the pump to at least one of the front and rear wheel brake cylinders 304, 306, and (7) an anti-lock pressure control means 318 for controlling the pressures of the fluid in the front and rear wheel brake cylinders so as to maintain slip ratios of the corresponding front and rear wheels at substantially optimum values, by selectively placing the valve device 316 in the first, second and third states.

The valve device 316 provided in the pressure application sub-system of FIG. 27 includes a second solenoid-operated shut-off valve 320 and a third 10 solenoid-operated shut-off valve 322. The second shut-off valve 320 is provided in a fluid passage connecting the front wheel brake cylinder 304 and the reservoir 312, while the third shut-off valve 322 is provided in a portion of the above-indicated fluid passage, which portion is between the second shut-off valve 320 and the reservoir 312.

In the above arrangement, upon operations of both the second and third shut-off valves 320, 322 to their open states, the front and rear wheel brake cylinders 304, 306 are communicated with the reservoir 312. When the second and third shut-off valves 304, 306 are closed and opened, respectively, only the rear wheel brake cylinder 306 is communicated with the reservoir 312. The former state of the valve device 316 is the first state described above, while the latter state is the second state also described above.

Between the front wheel brake cylinder 304 and the second shut-off valve 304, there is disposed a pressure reducing device 324 adapted to permit a flow of the fluid from the front wheel brake cylinder 304 to the second shut-off valve 320 and inhibiting a flow of the fluid in the reverse direction when the pressure between the pressure reducing device 324 and the pump 314 is not higher than the pressure between the pressure reducing device 324 and the front wheel brake cylinder 304, by more than a predetermined valve opening pressure difference. An delivery or output port of the pump 314 is connected to a portion of the fluid passage between the pressure reducing device 324 and the second shut-off valve 320.

When the third shut-off valve 322 is closed, the front and rear wheel brake cylinders 304, 306 are both disconnected from the reservoir 312, to inhibit the discharge flows of the fluid from these wheel brake cylinders 304, 306. When the second shut-off valve 320 is closed in this closed state of the third shut-off valve 322, the pressure reducing valve 324 is opened for effecting fluid communication between the delivery port of the pump 314 and the front wheel brake cylinder 304, to permit the pressurized fluid to be delivered from the pump 314 to the front wheel brake cylinder 304. When the second shut-off valve 320 is opened in the closed state of the third shut-off valve 322, on the other hand, the delivery port of the pump 314 is communicated with not only the front wheel brake cylinder 304 but also the rear wheel brake cylinder 306, to thereby permit the pressurized fluid to be delivered from the pump 314 to the front and rear wheel brake cylinders 304, 306. These states of the valve device 316 is the third state described above, in which the pressurized fluid delivered from the pump 314 is supplied to the front wheel brake cylinder 304 through the pressure reducing device 324, irrespective of whether the second shut-off valve 320 is open or closed.

In the former state, that is, when the second shut-off valve 320 is open, the pressurized fluid delivered from the pump 314 is necessarily supplied to the front wheel brake cylinder 304. In the latter state, that is, when the second shut-off valve 320 is closed, the pressurized fluid from the pump 314 is either supplied to both of the front and rear wheel brake cylinders 304, 306, or alternatively to only the rear wheel brake cylinder 306. In the presence of the pressure reducing device 324 between the front wheel brake cylinder 304 and the delivery port of the pump 314, the flow of the fluid from the pump 314 to the front wheel brake cylinder 304 is inhibited while the pressure difference on the opposite sides of the pressure reducing valve 324 is not larger than the predetermined valve opening pressure difference. When the pressure difference reaches the predetermined valve opening pressure difference, the pressure reducing device 324 permits the pressurized fluid from the pup 314 to the front wheel brake cylinder 304. In this case, the pressure to be applied to the front wheel brake cylinder 304 by the pump 314 is lower than the delivery pressure of the pump 314 by the predetermined valve opening pressure difference.

When an anti-lock pressure control operation is initiated in the pressure application sub-system of FIG. 27, one of seven pressure control modes as indicated in TABLE 1 is selected, and the first, second and third shut-off valves 310, 320, 322 are controlled depending upon the selected pressure control mode, to control the fluid pressures in the front and rear wheel brake cylinders 304, 306 so that the slip ratios of the corresponding front and rear wheels are maintained at substantially optimum values. In TABLE 1, the open and closed states of the shut-off valves 310, 320, 322 are indicated by "O" and "C", respectively. While the individual pressure control modes indicated in TABLE 1 will

TABLE 1

| | States of Shut-Off Valves | | | Pressure Control States of Front and Rear Brake Cylinders | |
|---|---|---|---|---|---|
| Mode | 1st | 2nd | 3rd | Front | Rear |
| 1 | O | O | C | M/C Increase | M/C Increase |
| 2 | O | C | C | M/C Increase | Hold |
| 3 | O | C | O | M/C Increase | Reduction |
| 4 | C | O | C | Hold | Pump Increase |
| 5 | C | C | C | Pump Increase | Hold |
| 6 | C | C | O | Pump Increase | Reduction |
| 7 | C | O | O | Reduction | Reduction | be described below in the DESCRIPTION OF THE PREFERRED EMBODIMENTS, the fourth pressure control mode through the seventh pressure control mode are established in most cases. In the fourth through seventh pressure control modes, the first shut-off valve 310 is held closed while the pump 314 (pump drive motor) is held on.

In the seventh pressure control mode, the second and third shut-off valves 320, 322 are both opened, to permit the discharge flows of the fluid from the front and rear wheel brake cylinders 304, 306 to the reservoir 312 so that the fluid pressures in these wheel brake cylinders 304, 306 are reduced.

In the sixth pressure control modes, the second shut-off valve 320 is closed and the third shut-off valve 322 is opened, to permit the discharge flow of the rear wheel brake cylinder 306 to the reservoir 312 and inhibit the discharge flow of the fluid from the front wheel brake cylinder 304 to the reservoir 312 while permitting the pressurized fluid to be delivered from the pump 314 to the front wheel brake cylinder 304, so that the fluid pressure in the rear wheel brake cylinder 306 is reduced while the fluid pressure in the front wheel brake cylinder 304 is increased.

In the fifth pressure control mode, the second and third shut-off valves 320, 322 are both closed to disconnect both of the front and rear wheel brake cylinders 304, 306 from the reservoir 312. Since the second shut-off valve 322 is closed, the pressurized fluid delivered from the pump 314 is supplied to only the front wheel brake cylinder 304, to increase the fluid pressure in the front wheel brake cylinder 304 while maintaining the fluid pressure in the rear wheel brake cylinder 306 at the same level.

In the fourth pressure control mode, the second shut-off valve 320 is opened and the third shut-off valve 322 is closed. As in the fifth pressure control mode, the front and rear wheel brake cylinders 304, 306 are both disconnected from the reservoir 312 in the fourth pressure control mode. In this mode, the pressurized fluid delivered from the pump 314 is supplied to the rear wheel brake cylinder 306 without flowing through the pressure reducing device 324, and is supplied to the front wheel brake cylinder 304 through the pressure reducing device 324. Therefore, when the pressure difference on the opposite sides of the pressure reducing device 324 is smaller than the predetermined value for opening the valve of the device 324, only the fluid pressure in the rear wheel brake cylinder 306 is increased. When the pressure difference on the opposite sides of the pressure reducing device 324 reaches the valve opening pressure difference, the fluid pressures in both of the front and rear wheel brake cylinders 304, 306 are increased by the fluid delivered from the pump 314.

As is apparent from TABLE 1, only the seventh pressure control mode is available for reducing the fluid pressure in the front wheel brake cylinder 304. For reducing the fluid pressure in the rear wheel brake cylinder 306, on the other hand, the seventh and sixth pressure control modes are available. A time during which the fluid pressure in the front or rear wheel brake cylinder 304, 306 is reduced in the seventh pressure control mode is referred to as a first pressure reducing time, and a time during which the fluid pressure in the brake cylinder 304, 306 is reduced in the sixth pressure control mode is referred to as a second pressure reducing time. Therefore, the pressure reducing time of the front wheel brake cylinder 304 is equal to the first pressure reducing time, but the pressure reducing time of the rear wheel brake cylinder 306 is equal to a sum of the first and second pressure reducing times. In other words, the fluid is discharged from both of the front and rear wheel brake cylinders 304, 306 to the reservoir 312 during the first pressure reducing time, while on the other hand the fluid is discharged from only the rear wheel brake cylinder 306 to the reservoir 312 during the second pressure reducing time. In the pressure application sub-system of FIG. 27, the amount of the fluid which has been introduced into the reservoir 312 is estimated on the basis of the first and second pressure reducing times.

It is also noted that the fifth and sixth pressure control modes are available for increasing the fluid pressure in the front wheel brake cylinder 304, while only the fourth pressure control mode is available for increasing the fluid pressure in the rear wheel brake cylinder 306. The pressure increasing time of the front wheel brake cylinder 304 is a sum of the times during which the fifth and sixth pressure control modes are established. The pressure increasing time of the rear wheel brake cylinder 306 is the time during which the fourth pressure control mode is established. The amount of the fluid which has been discharged or pumped up from the reservoir 312 is estimated on the basis of these pressure increasing times. The reservoir fluid amount is estimated on the basis of the cumulative amount of the fluid which has been introduced into the reservoir 312 and the cumulative amount of the fluid which has been pumped up from the reservoir 312. However, this estimation is difficult for the reasons which will be described.

First of all, the pressure reducing and increasing times of the front and rear wheel brake cylinders 304, 306 should be detected by detecting the times during which the valve device 316 are placed in the different states. Accordingly, the detection of the pressure reducing and increasing times tends to be complicated. Namely, these pressure reducing and increasing times cannot be detected by detecting the times in which the valve device 316 is placed in a predetermined one state.

As described above, the cumulative amount of the fluid introduced into the reservoir 312 is the sum of the amount discharged from the front wheel brake cylinder 304 and the amount discharged from the rear wheel brake cylinder 306. In this respect, it is noted that the fluid pressure in the rear wheel brake cylinder 306 is reduced when the valve device 316 is placed in the seventh pressure control mode and when the valve device 316 is placed in the sixth pressure control mode. In the seventh pressure control mode, the second and third shut-off valves 320, 322 are both closed. In the sixth pressure control mode, the second shut-off valve 320 is closed while the third shut-off valve 322 is open. To detect the amount of the fluid introduced into the reservoir 312, it is required to detect the first pressure reducing time during which the seventh pressure control mode is established, and the second pressure reducing time during which the sixth pressure control mode is established.

The sum of the first and second pressure reducing times may be directly detected by detecting the time during which the pressure reducing mode is established for the rear wheel brake cylinder 306. However, the fluid discharged from both of the front and rear wheel brake cylinders 304, 306 is introduced into the reservoir 312 when the seventh pressure control mode (pressure reducing mode for the rear wheel brake cylinder 306) is established. On the other hand, the fluid pressure discharged from only the rear wheel brake cylinder 306 is introduced into the reservoir 312 when the sixth pressure control mode (another pressure reducing mode for the rear wheel brake cylinder 306) is established. The amounts of the fluid discharged per unit time from the rear wheel brake cylinder 306 in the seventh and sixth pressure control modes are different. Therefore, the first and second pressure reducing times should be detected independently of each other, and the amount of the fluid introduced into the reservoir 312 should be estimated using these two pressure reducing times, whereby the operations to detect the pressure reducing times and estimate the amount of the fluid flow into the reservoir 312 tend to be complicated.

The time during which the fluid discharged from the front wheel brake cylinder 304 is introduced into the reservoir 312 is equal to the first pressure reducing time indicated above. However, the cumulative amount of the fluid discharge from the front wheel brake cylinder 304 should also be considered to estimate the amount of the fluid introduced into the reservoir 312.

To estimate the cumulative amount of the fluid discharged from the reservoir 312 by operation of the pump 314, it is required to detect both the time during which the valve device 316 is held in the fourth pressure control mode (with the second and third shut-off valves 320, 322 being closed), and the time during which the pressure increasing mode is established for the front wheel brake cylinder 304, namely, the time during which the fifth or sixth pressure control mode is established (with the third shut-off valve 322 being closed). During an anti-lock pressure control operation of the pressure application sub-system, the fluid pressures in the front and rear wheel brake cylinders 304, 306 are not necessarily the same, and the pressure reducing and increasing times of the front and rear wheel brake cylinders 304, 306 cannot be treated in the same way.

Secondly, the pressure reducing and increasing times of the front and rear wheel brake cylinders 304, 306 should be always detected throughout an anti-lock pressure control operation of the sub-system. In other words, as long as an anti-lock pressure control of one of the front and rear wheels is effected, the pressure reducing and increasing times of the front and rear wheel brake cylinders 304, 306 should be detected, even though the other wheel is not under an anti-lock pressure control, because one pump 314 and one reservoir 316 are provided for the two wheel brake cylinders 304, 306 in the pressure application sub-system.

If the reservoir fluid amount was estimated on the basis of the pressure reducing and increasing times of only the front wheel brake cylinder 304 while the anti-lock pressure control operation is effected for the front wheel brake cylinder 304, for instance, there would arise an erroneous estimation that some amount of the fluid is present in the reservoir 312 while no amount of the fluid is in fact stored in the reservoir. For the front wheel brake cylinder 304, the pressure reducing time is the time during which the seventh pressure control mode is established, while the pressure increasing time is the time during which the fifth or sixth pressure control mode is established. Therefore, the above erroneous estimation would result, if the amount of the fluid introduced into the reservoir 312 which is estimated on the basis of the pressure reducing time is larger than the amount of the fluid discharged from the reservoir 312 which is estimated on the basis of the pressure increasing time, regardless of the time during which the fourth pressure control mode is established.

Actually, however, the fluid is supplied from the reservoir 312 to the rear wheel brake cylinder 306 when the fourth pressure control mode is established. Hence, the reservoir 312 may become empty with a large amount of the fluid being discharged therefrom, if the fourth pressure control mode is established for a relatively long time.

Thus, the prior art braking apparatus or pressure control apparatus is not capable of estimating the cumulative amount of the fluid flow into the reservoir and the cumulative amount of the fluid flow from the reservoir, with sufficiently high accuracy. If the actual cumulative amount of the fluid flow into the reservoir is smaller than the estimated cumulative amount, the pump may possibly be operated even when no fluid is stored in the reservoir. Conversely, if the actual cumulative amount of the fluid flow into the reservoir is larger than the estimated cumulative amount, it may be impossible to rapidly reduce the fluid pressure in the wheel brake cylinder. Similar drawbacks may be encountered if the actual and estimated amounts of the fluid flow from the reservoir are different.

Although the above problems may be avoided by increasing the storage capacity of the reservoir, this solution leads to increased size and weight of the reservoir.

SUMMARY OF THE INVENTION

It is a first object of the present invention to provide a hydraulic pressure control apparatus capable of estimating the cumulative amount of fluid flow into the reservoir with improved accuracy, on the basis of not only the pressure reducing time but also another physical value.

It is a second object of the present invention to provide a hydraulic pressure control apparatus capable of estimating the cumulative amount of fluid flow from the reservoir with improved accuracy, on the basis of not only the pressure increasing time but also another physical value.

It is therefore a third object of the present invention to provide a motor vehicle braking apparatus which includes two wheel brake cylinders in one brake application circuit and which is capable of easily estimating an amount of a working fluid in a reservoir connected to a pump.

The first object may be achieved according to a first aspect of this invention, which provides a hydraulic pressure control apparatus for a brake including a brake cylinder activated by a pressurized fluid for braking a wheel of a vehicle and a reservoir for storing the fluid discharged from the brake cylinder when a pressure of the fluid in the brake cylinder is reduced, the apparatus comprising (a) deceleration obtaining means for obtaining a deceleration value of a body of the vehicle; (b) pressure reducing time obtaining means for obtaining a pressure reducing time during which the pressure of the fluid in the brake cylinder is reduced; and (c) flow-in amount estimating means for estimating a cumulative amount of flow of the fluid into the reservoir, on the basis of the deceleration value obtained by the deceleration obtaining means and the pressure reducing time obtained by the pressure reducing time obtaining means.

The deceleration obtaining means may include a deceleration sensor for directly detecting the deceleration value of the vehicle body, or an acceleration sensor for directly detecting an acceleration value (positive and negative values) of the vehicle body. Alternatively, the deceleration obtaining means may include a wheel speed sensor for detecting the rotating speed of the wheel, and a computer or computing means for estimating the running speed of the vehicle and obtaining the deceleration value of the vehicle body as an amount of change of the estimated vehicle speed per unit time.

In the hydraulic pressure control apparatus constructed according to this first aspect of the present invention, the cumulative amount of flow of the fluid which has been discharged from the brake cylinder into the reservoir is estimated by the flow-in amount estimating means, on the basis of the pressure time during which the fluid pressure in the brake cylinder is reduced and the deceleration value of the vehicle body.

The cumulative amount of the fluid flow into the reservoir increases with an increase in the pressure reducing time, when the amount of the fluid flow discharged from the brake cylinder into the reservoir per unit time (hereinafter referred to as "rate of flow of the fluid into the reservoir") is held constant. Further, the rate of flow of the fluid into the reservoir increases with an increase in a difference between the pressures in the brake cylinder and reservoir. However, an amount of change of the pressure in the reservoir is relatively small, and is considered to be almost constant. Accordingly, the rate of flow of the fluid into the reservoir increases with an increase in the pressure in the brake cylinder. On the other hand, the braking force to be applied to the vehicle increases with an increase in the pressure in the brake cylinder, and the deceleration value of the vehicle body increases with an increase in the braking force. Therefore, it is reasonable to consider that the rate of flow of the fluid into the reservoir increases with an increase in the deceleration value of the vehicle body. Accordingly, the accuracy of estimation of the cumulative amount of flow of the fluid into the reservoir can be improved when the estimation is based on both the pressure reducing time and the deceleration value of the vehicle body, over the accuracy of the estimation on the basis of only the pressure reducing time.

It is noted that the pressure in the brake cylinder is reduced with the time during a period of a given pressure reducing operation for the brake cylinder. In this respect, the accuracy of estimation of the amount of flow of the fluid into the reservoir is higher if the rate of flow of the fluid into the reservoir is estimated such that the rate of flow decreases with the pressure reducing time, than if the rate of flow is estimated such that the rate of flow is held constant throughout the pressure reducing period. However, the rate of flow of the fluid into the reservoir may be estimated such that the rate of flow is held constant. In this case, the estimation of the cumulative amount of the fluid into the reservoir is made simpler.

The present hydraulic pressure control apparatus permits improved accuracy of estimation of the amount of fluid stored in the reservoir. If the apparatus is adapted to increase the fluid pressure in the brake cylinder by supplying the fluid from the reservoir to the brake cylinder while a master cylinder of the brake is disconnected from the brake cylinder, the apparatus does not suffer from a shortage of the fluid or a failure to rapidly reduce the pressure in the brake cylinder, and does not require the reservoir to have large size and weight.

The accuracy of estimation of the cumulative amount of the fluid flow into the reservoir can be improved by detecting the pressure in the wheel brake cylinder by a pressure sensor and estimating the cumulative amount of the fluid flow using the detected brake cylinder pressure and the pressure reducing time. In this case, the apparatus requires the pressure sensor.

To the contrary, the present apparatus does not require such a pressure sensor, since the cumulative amount of flow of the fluid into the reservoir can be estimated with improved accuracy by utilizing a predetermined relationship between the fluid pressure in the brake cylinder and the vehicle deceleration value. Although the present apparatus requires the deceleration obtaining means, this means is usually provided in the hydraulic pressure control apparatus in the form of either a deceleration sensor or a combination of a wheel speed sensor for detecting the rotating speed of the wheel and estimating means for estimating the deceleration of the vehicle body on the basis of the detected speed of the wheel.

According to a first preferred form of the apparatus described above, the flow-in amount estimating means comprises: overshoot estimating means for estimating an amount of overshoot of the pressure in the brake cylinder upon initiation of reduction of the pressure in the brake cylinder; and means for taking into account the amount of overshoot of the pressure estimated by the overshoot estimating means, when the cumulative amount of flow of the fluid into the reservoir is estimated.

In the apparatus constructed as described above, the amount of overshoot of the fluid pressure in the brake cylinder is estimated by the overshoot estimating means, and the estimated amount of overshoot is taken into account when the cumulative amount of flow of the fluid into the reservoir is estimated. The cumulative amount of flow of the fluid into the reservoir increases with an increase in the amount of overshoot of the pressure in the brake cylinder upon initiation of the pressure reduction. Accordingly, the use of the overshoot amount permits higher accuracy of estimation of the cumulative amount of the fluid flow into the reservoir.

The overshoot of the fluid pressure in the brake cylinder upon initiation of the pressure reduction occurs due to a control delay, for example. The present pressure control apparatus may include a pressure reducing valve device disposed in a fluid passage connecting the brake cylinder and the reservoir, and valve control means for controlling the pressure reducing valve device such that the valve device is selectively placed in one of a connecting state for connecting the brake cylinder and the reservoir and a disconnecting state for disconnecting the brake cylinder and the reservoir from each other. In this case, the valve device is not switched from the disconnecting state to the connecting state immediately after the valve device is commanded by the valve control means to be brought to the connecting state, but is switched to the connecting state with a certain time delay. During this time delay, the pressure in the brake cylinder is continuously increased and becomes higher than required, whereby the pressure overshoot occurs. The amount of this pressure overshoot is considered to increase with an increase in the brake cylinder pressure, if the time delay is constant. The overshoot amount is a difference between the brake cylinder pressure when the valve device has been actually switched to the connecting state, and the brake cylinder pressure when the valve device was commanded to be switched to the connecting state. In other words, the brake cylinder pressure when the valve device has been actually switched to the connecting state is a sum of the overshoot amount and the brake cylinder pressure when the valve device was commanded to be switched to the connecting state. Therefore, the use of the overshoot amount as well as the deceleration of the vehicle body permits higher accuracy of estimation of the brake cylinder pressure than the use of only the deceleration.

The apparatus may further include anti-lock pressure control means for controlling the fluid pressure in the brake cylinder in an anti-lock fashion. In the case where the pressure reducing valve device indicated above includes this anti-lock pressure control means, the means for taking account the overshoot amount may be adapted to be operable only when an anti-lock pressure control operation is initiated by the anti-lock pressure control means, that is, only when the pressure in the brake cylinder is reduced for the first time in the anti-lock pressure control operation. Upon initiation of the first reduction of the brake cylinder pressure, the amount of overshoot of the brake cylinder pressure is comparatively considerably influenced by the operating speed of a brake operating member for activating the brake cylinder. When the brake cylinder pressure is reduced for the first time at the start of the anti-lock pressure control operation, the gradients of increase of the pressures in the master cylinder and the brake cylinder of the brake increase with an increase in the operating speed of the brake operating member, and therefore the overshoot amount increases with the operating speed of the brake operating member. When the brake cylinder pressure is reduced during the anti-lock pressure control operation, however, the overshoot amount (or a variation of the overshoot amount) is comparatively small.

According to a second preferred form of the apparatus constructed according to the first aspect of this invention, the apparatus further comprises a pressure increasing device for supplying the pressurized fluid to the brake cylinder, and the flow-in amount estimating means comprises: pressure increasing time obtaining means for obtaining a pressure increasing time during which the pressure in the brake cylinder is increased by the pressure increasing device at least immediately before initiation of the reduction of the pressure in the brake cylinder; and means for taking into account the pressure increasing time obtained by the pressure increasing time obtaining means, when the cumulative amount of flow of the fluid into the reservoir is estimated.

In the hydraulic pressure control apparatus as described above, at least the pressure increasing time immediately before the initiation of the reduction of the brake cylinder pressure is obtained by the pressure increasing time obtaining means, and the obtained pressure increasing time is taken into account when the cumulative amount of flow of the fluid into the reservoir is estimated.

The brake cylinder pressure upon initiation of the pressure reducing operation or period can be considered to be higher when the pressure increasing time immediately preceding the pressure reducing period is relatively long, than when the pressure increasing time is relatively short, provided that the brake cylinder pressure upon initiation of the preceding pressure increasing period and the pressure increasing gradient in this pressure increasing period are constant. Therefore, the cumulative amount of flow of the fluid into the reservoir is relatively large when the pressure increasing time is relatively long than it is relatively short. Accordingly, the use of the pressure increasing time immediately before the pressure reducing period permits higher accuracy of estimation of the cumulative amount of the fluid flow into the reservoir.

It is also possible to take into account not only the pressure increasing time immediately before the pressure reducing period, but also a time duration of a pressure reducing period prior to the present pressure reducing period, and gradients of increase and reduction of the pressure in the preceding pressure increasing and reducing periods. The use of these additional parameters permits higher accuracy of estimation of the brake cylinder pressure upon initiation of the present pressure reducing period.

The means for taking into account the pressure increasing time may include means for taking into account a ratio of the preceding pressure increasing time and the pressure reducing time when the cumulative amount of the fluid flow into the reservoir is estimated.

According to a third preferred form of the first aspect of this invention, the apparatus further comprises: a pump for pumping up the fluid from the reservoir; flow-out amount estimating means for estimating a cumulative amount of flow of the fluid which has been discharged from the reservoir by pumping of the fluid by the pump; and reservoir fluid amount estimating means for estimating an amount of the fluid stored in the reservoir, on the basis of the cumulative amount of flow of the fluid discharged from the reservoir estimated by the flow-out amount estimating means and the cumulative amount of flow of the fluid into the reservoir estimated by the flow-in amount estimating means.

According to a fourth preferred form of the first aspect of the invention, the apparatus further comprises: a pump for pumping up the fluid from the reservoir and delivering the pumped-up fluid to the brake cylinder to increase the pressure of the fluid in the brake cylinder; flow-out amount estimating means for estimating a cumulative amount of flow of the fluid which has been discharged from the reservoir on the basis of a pumping time during which the fluid is pumped up from the reservoir by the pump, and one of the deceleration value obtained by the deceleration obtaining means and an operating speed of an electric motor for operating the pump; and reservoir fluid amount estimating means for estimating an amount of the fluid stored in the reservoir, on the basis of the cumulative amount of flow of the fluid discharged from the reservoir estimated by the flow-out amount estimating means and the cumulative amount of flow of the fluid into the reservoir estimated by the flow-in amount estimating means.

The deceleration obtaining means may comprise a deceleration sensor for detecting the deceleration value of the vehicle body. Alternatively, the deceleration obtaining means may comprises a wheel speed sensor for detecting a rotating speed of the wheel, and deceleration estimating means for estimating the deceleration value of the body of the vehicle on the basis of an output of the wheel speed sensor. In this case, the deceleration obtaining means may be adapted to directly estimate the vehicle body deceleration from the output of the wheel speed sensor. Alternatively, the deceleration obtaining means may include vehicle speed estimating means for estimating the running speed of the vehicle body on the basis of the output of the wheel speed sensor, and deceleration calculating means for calculating the vehicle body deceleration as an amount of change of the running speed of the vehicle body per unit time estimated by the vehicle speed estimating means.

The deceleration obtaining means may comprise at least one of first deceleration obtaining means for obtaining the deceleration value of the body of the vehicle upon initiation of reduction of the pressure in the brake cylinder, and second deceleration obtaining means for obtaining the deceleration value of the body of the vehicle during the reduction of the pressure in the brake cylinder.

The vehicle deceleration is not necessarily held constant during the reduction of the pressure in the brake cylinder. In this sense, it is desirable to obtain the vehicle deceleration from time to time during the reduction of the brake cylinder pressure, and estimate the cumulative amount of the fluid flow into the reservoir.

However, a variation in the vehicle deceleration during one pressure reducing operation or period for the brake cylinder is comparatively small, and can be considered to be substantially constant in most cases. In the case where the deceleration obtaining means is adapted to obtain the vehicle deceleration on the basis of the output of the wheel speed sensor as indicated above, the noise of the output signal of the wheel speed sensor tends to be large during the pressure reducing period. Accordingly, the vehicle deceleration can be obtained with a reduced influence by the noise of the output signal of the wheel speed sensor, if the vehicle deceleration is obtained upon initiation of the pressure reducing operation or period.

According to a fifth preferred form of the apparatus according to the first aspect of this invention, the apparatus further comprises a pressure reducing valve device disposed in a fluid passage connecting the brake cylinder and the reservoir, and valve control means for controlling the pressure reducing valve device such that the valve device is selectively placed in a connecting state for connecting the brake cylinder and the reservoir and a disconnecting state for disconnecting the brake cylinder and the reservoir from each other. In this form of the apparatus, the pressure reducing time obtaining means is adapted to obtain as the pressure reducing time a time during which the valve device is held in the connecting state.

When the pressure reducing valve device is switched to the connecting state for connecting the brake cylinder to the reservoir, the pressure in the brake cylinder is reduced. When this valve device is switched to the disconnecting state for disconnecting the brake cylinder from the reservoir, the pressure in the brake cylinder is maintained or increased. Accordingly, the time during which the valve device is held in the connecting state can be used as the pressure reducing time.

According to a sixth preferred form of the apparatus according to the first aspect of this invention, the the flow-in amount estimating means comprises means for estimating a pressure-equivalent amount corresponding to a level of the pressure in the brake cylinder, and means for taking into account the pressure-equivalent amount when the cumulative amount of flow of the fluid into the reservoir is estimated.

In the above form of the apparatus wherein the estimation of the cumulative amount of the fluid flow into the reservoir is effected by taking into account the estimated pressure-equivalent amount, the accuracy of the estimation is improved. The pressure-equivalent amount may be an amount of overshoot of the brake cylinder pressure or a pressure increasing time immediately before the reduction of the brake cylinder pressure, as well as an amount of change of the brake cylinder pressure itself. The above-described means for taking into account the amount of overshoot estimated by the overshoot estimating means or the pressure increasing time obtained by the pressure increasing time obtaining means according to the first or second preferred form of the invention may be an example of the means for estimating the pressure-equivalent amount.

According to a seventh preferred form of the apparatus according to the first aspect of the present invention, the flow-in amount estimating means comprises flow-in rate estimating means for estimating an amount of flow of the fluid discharged from the brake cylinder into the reservoir per unit time. The cumulative amount of the fluid flow into the reservoir increases with an increase in the rate of flow of the fluid into the reservoir, when the pressure reducing time is constant. The rate of flow of the fluid into the reservoir may be estimated on the basis of the vehicle deceleration estimated by suitable means for estimating an amount corresponding to the vehicle deceleration. The brake cylinder pressure and the rate of flow of the fluid into the reservoir can be estimated to be comparatively high when the estimated vehicle deceleration is comparatively high. The brake cylinder pressure can be directly detected by a suitable pressure detecting device, and the rate of flow of the fluid into the reservoir may be estimated on the basis of an output of this pressure detecting device.

According to an eighth preferred form of the apparatus of the first aspect of this invention, the pressure reducing time obtaining means comprises means for obtaining a continuous pressure reducing the during which the pressure in the brake cylinder is continuously reduced, and the flow-in amount estimating means comprises means for estimating a rate of flow of the fluid discharged from the brake cylinder into the reservoir, on the basis of the continuous pressure reducing time.

An increase in the continuous pressure reducing time results in a decrease in the brake cylinder pressure, causing a decrease in the difference between the brake cylinder pressure and the reservoir pressure. Accordingly, the rate of flow of the fluid into the reservoir is considered to decrease with an increase in the continuous pressure reducing time. The accuracy of estimation of the rate of flow of the fluid into the reservoir can be made higher when the estimation is based on both the vehicle body deceleration and the continuous pressure reducing time, than when it is based on only the vehicle deceleration. If the vehicle deceleration value is relatively large while the continuous pressure reducing time is relatively short, the rate of the fluid flow into the reservoir can be estimated to be relatively high. If the vehicle deceleration value is relatively small while the continuous pressure reducing time is relatively long, on the other hand, the rate of the fluid flow can be estimated to be relatively low. If the vehicle deceleration value is held constant, the rate of the fluid flow can be estimated to decrease with an increase in the continuous pressure reducing time. With the same continuous pressure reducing time, the rate of the fluid flow can be estimated to increase with an increase in the vehicle deceleration value.

In the above eighth preferred form of the apparatus, the flow-in amount estimating means may adapted to estimate the rate of flow of the fluid into the reservoir such that the rate of flow changes in steps or continuously as the continuous pressure reducing time increases, or remains constant throughout the continuous pressure reducing operation or period.

According to a ninth preferred form of the apparatus of the first aspect of this invention, the flow-in amount estimating means comprises overshoot estimating means for estimating an amount of overshoot of the pressure in the brake cylinder upon initiation of reduction of the pressure in the brake cylinder; and means for compensating the cumulative amount of flow of the fluid into the reservoir, depending upon the amount of overshoot estimated by the overshoot estimating means.

The concept of estimating the cumulative amount of flow of the fluid into the reservoir with the overshoot amount of the brake cylinder pressure taken into account is similar to the concept of compensating the once estimated cumulative amount of the fluid flow into the reservoir depending upon the overshoot amount. In the present form of the apparatus, a compensation value corresponding to the overshoot amount may be added to the once estimated cumulative amount of the fluid flow. Alternatively, the once estimated cumulative amount of the fluid flow may be multiplied by the compensation value. The compensation value may be determined such that the compensation value increases with an increase in the difference between the estimated overshoot amount and a reference overshoot amount. In the former case of adding the compensation value to the once estimated cumulative amount, the compensation value is zero when the estimated overshoot amount is equal to the reference overshoot amount. In the latter case of multiplying the once estimated cumulative amount by the compensation value, the compensation value is equal to "1" when the estimated overshoot amount is equal to the reference overshoot amount. The means for compensating the cumulative amount of flow of the fluid into the reservoir may be adapted to compensate the rate of the fluid flow into the reservoir for thereby compensating the cumulative amount of the fluid flow into the reservoir depending upon the estimated overshoot amount.

The overshoot estimating means provided according to the first preferred form of the apparatus described above may comprise wheel deceleration obtaining means for obtaining a deceleration value of the wheel of the vehicle, and means for estimating the amount of overshoot of the pressure in the brake cylinder on the basis of the deceleration value of the wheel.

The apparatus according to the first preferred form of the invention which comprises the overshoot estimating means may further comprise a brake operating member, and a pressurizing device for pressurizing the fluid to a level depending upon an operating state of the brake operating member. In this instance, the overshoot estimating means may comprise gradient obtaining means for obtaining an amount of increase in the pressure in the brake cylinder per unit time during an operation of the brake operating member, and means for estimating the amount of overshoot on the basis of the amount of increase in the pressure in the brake cylinder per unit time obtained by the gradient obtaining means.

When the gradient or rate of increase of the pressure in the brake cylinder is relatively high, the overshoot amount is relatively large. Therefore, the overshoot amount may be estimated on the basis of the gradient of increase of the brake cylinder pressure. When the pressure increase gradient is relatively high, the initial brake cylinder pressure upon initiation of reduction of the brake cylinder pressure is relatively high, so that the deceleration value of the wheel increases with an increase in the initial brake cylinder pressure. Accordingly, the overshoot amount can be estimated on the basis of the wheel deceleration value.

Alternatively, the overshoot estimating means may comprise speed obtaining means for obtaining an operating speed of the brake operating means, and means for estimating the overshoot amount on the basis of the operating speed of the brake operating member obtained by the speed obtaining means.

When the brake operating member such as a brake pedal is operated at a relatively high speed, the brake cylinder pressure is increased at a relatively high rate or gradient. Accordingly, the overshoot amount can be estimated on the basis of the operating speed of the brake operating member. The operating speed of the brake operating member may be a rate of change of the operating stroke or force of the brake operating member. The accuracy of estimation of the overshoot amount can be improved by taking into account an amount of change of the operating speed as well as the operating speed per se.

The apparatus according to the first preferred form comprising the overshoot estimating means may further comprise anti-lock pressure control means for controlling the pressure in the brake cylinder so as to maintain a slip of the wheel on a road surface during activation of the brake cylinder at a substantially optimum value. In this case, the means for taking into account the amount of overshoot may comprise means for taking into account the amount of overshoot estimated by the overshoot estimating means when the cumulative amount of flow of the fluid into the reservoir is estimated upon initiation of a first pressure reducing operation by the anti-lock pressure control means to reduce the pressure of the fluid in the brake cylinder for the first time.

The overshoot amount of the brake cylinder pressure tends to be large particularly when a pressure reducing period is initiated by the anti-lock pressure control means as a result of an operation of the brake operating member at a relatively high speed. However, the overshoot amount and a variation thereof are not so large during an anti-lock pressure control operation, except for an initial part of the first pressure reducing period, that is, during a pressure reducing period following a pressure increasing or holding period. In this respect, it is effective to take into account the overshoot amount upon initiation of the first pressure reducing operation to reduce the brake cylinder pressure for the first time. For the same reason, the cumulative amount of the fluid flow into the reservoir may be effectively compensated depending upon the overshoot amount upon initiation of the first pressure reducing operation, in the ninth preferred form of the apparatus described above.

According to a tenth preferred form of the first aspect of this invention, the apparatus further comprises a pressure increasing device for supplying the pressurized fluid to the brake cylinder, and the flow-in amount estimating means comprises: pressure increasing time obtaining means for obtaining a pressure increasing time during which the pressure in the brake cylinder is increased by the pressure increasing device at least immediately before initiation of reduction of the pressure in the brake cylinder; and means for compensating the cumulative amount of flow of the fluid into the reservoir, depending upon the pressure increasing time obtained by the pressure increasing time obtaining means.

The above-indicated means for compensating the cumulative amount of the fluid flow into the reservoir depending upon the pressure increasing time may be adapted to compensate the cumulative amount of the fluid flow per se, or compensate the rate of flow of the fluid into the reservoir for thereby compensating the cumulative amount of the fluid flow into the reservoir. In the latter case, the flow-in amount estimating means may comprise, for example, flow rate estimating means for estimating the rate of flow of the fluid into the reservoir, flow rate compensating means for compensating the estimated flow rate depending upon the pressure increasing time, and flow rate calculating means for calculating the flow rate on the basis of the flow rate compensated by the flow rate compensating means. The amount of compensation may be determined such that the compensation value is larger when a difference between the pressure increasing time obtained by the pressure increasing time obtaining means and a reference pressure increasing time is relatively large, than when the difference is relatively small. Alternatively, the compensation value may be determined on the basis of a difference between the pressure increasing times of the last two pressure increasing periods, or on the basis of not only the time of the last pressure increasing period, but also a gradient of the pressure increase in the last pressure increasing period, a pressure reducing time of the last pressure reducing period and a gradient of the pressure reduction in the last pressure reducing period.

According to an eleventh preferred form of the first aspect of this invention, the apparatus further comprises a pressure increasing device for supplying the pressurized fluid to the brake cylinder, and the flow-in amount estimating means comprises: gradient obtaining means for obtaining a gradient of increase in the pressure in the brake cylinder by the pressure increasing device; and means for taking into account the gradient of increase in the pressure in the brake cylinder obtained by the gradient obtaining means, when the cumulative amount of flow of the fluid into the reservoir is estimated.

The accuracy of estimation of the brake cylinder pressure upon initiation of the first pressure reducing operation can be improved by taking into account the pressure increasing gradient in addition to or in place of the pressure increasing time, whereby the accuracy of estimation of the cumulative amount of flow of the fluid into the reservoir. Further, the pressure increasing gradient may be taken into account in estimating the rate of flow of the fluid into the reservoir, to thereby improve the cumulative amount of the fluid flow into the reservoir.

According to a twelfth preferred form of the apparatus of the first aspect of the invention, the pressure reducing time obtaining means comprises means for obtaining a last pressure reducing time during which the pressure in the brake cylinder was reduced before present reduction in the pressure in the brake cylinder, and the flow-in amount estimating means comprises means for taking into account the last pressure reducing time when the cumulative amount of flow of the fluid into the reservoir is estimated.

The accuracy of estimation of the brake cylinder pressure upon initiation of the first pressure reducing operation can be improved by taking into account the time of the last pressure reducing period before the present pressure reducing period, whereby the cumulative amount of the fluid flow into the reservoir can be estimated with improved accuracy.

According to a thirteenth preferred form of the apparatus of the first aspect of this invention, the flow-in amount estimating means comprises means for obtaining a gradient of last reduction in the pressure in the brake cylinder before present reduction in the pressure in the brake cylinder, and means for taking into account the gradient of last reduction in the pressure in the brake cylinder when the cumulative amount of flow of the fluid into the reservoir.

The accuracy of estimation of the brake cylinder pressure upon initiation of the first pressure reducing operation can be improved by taking into account the pressure reducing gradient in addition to or in place of the last pressure reducing time, whereby the accuracy of estimation of the cumulative amount of the fluid flow into the reservoir can be improved.

The pressure reducing or increasing gradient may be replaced by a ratio of the pressure reducing and increasing gradients. This ratio may be estimated from the specifications of the associated hydraulic circuit, such as a diameter of an equivalent pressure reducing orifice, a delivery rate of a pump, and the above-indicated rate of the fluid flow into the reservoir.

According to a fourteenth preferred form of the first aspect of this invention, the hydraulic pressure control apparatus further comprises: a master cylinder; a cut-off valve device disposed in a fluid passage connecting the master cylinder and the brake cylinder, the cut-off valve device having a connecting state for connecting the master cylinder and the brake cylinder and a disconnecting state for disconnecting the master cylinder and the brake cylinder from each other; a pressure reducing valve device disposed in a pressure reducing fluid passage connecting the reservoir and the brake cylinder, the pressure reducing valve device having a connecting state for connecting the reservoir and the brake cylinder and a disconnecting state for disconnecting the reservoir and the brake cylinder from each other; a pump for pumping up the fluid from the reservoir; a pressure increasing valve device disposed in a pressure increasing fluid passage connecting a delivery port of the pump and the brake cylinder, the pressure increasing valve device having a connecting state for connecting the delivery port of the pump and the brake cylinder and a disconnecting state for disconnecting the delivery port and the brake cylinder from each other; and anti-lock pressure control means for controlling the cut-off valve device, the pressure reducing valve device and the pressure increasing valve device such that each of the pressure increasing and reducing valve devices is selectively placed in the connecting and disconnecting states while the cut-off valve device is held in the disconnecting state, for controlling the pressure in the brake cylinder so as to maintain a slip of the wheel on a road surface during activation of the brake cylinder at a substantially optimum value.

In the above apparatus, when the pressure increasing valve device is switched to the connecting state, the fluid pumped up and pressurized by the pump is supplied to the brake cylinder. When the pressure increasing valve device is switched to the disconnecting state, the pressurized fluid is not supplied from the pump to the brake cylinder, and is returned to the reservoir through a pressure relief valve, for example.

When the pressure reducing valve device is switched to the connecting state and the pressure increasing valve device is switched to the disconnecting state, the brake cylinder is disconnected from the pump and communicated with the reservoir, whereby the pressure in the brake cylinder is reduced. When the pressure reducing and increasing valve devices are switched to the disconnecting and connecting states, respectively, the brake cylinder is disconnected from the reservoir and communicated with the pump, whereby the pressure in the brake cylinder is increased. When the pressure reducing and increasing valve device are both placed in the disconnecting state, the brake cylinder is disconnected from both the pump and the reservoir, whereby the pressure in the brake cylinder is maintained. The anti-lock pressure control means in the present form of the apparatus is adapted to reduce, increase and hold the pressure in the brake cylinder while the brake cylinder is disconnected from the master cylinder. The brake cylinder is disconnected from the master cylinder during an anti-lock pressure control operation by the anti-lock pressure control means, for the purpose of preventing an undesirable kick-back phenomenon of a brake operating member or brake pedal, namely, a phenomenon wherein the brake pedal is returned by pressure changes in the master cylinder due to the pressure changes in the brake cylinder.

The pressure increasing valve device may be a directional control valve device arranged for connecting the delivery port of the pump to the reservoir while the brake cylinder is disconnected from the delivery port of the pump. The cut-off valve device and the pressure reducing valve device may be constructed as a single valve device. Similarly, the cut-off valve and the pressure increasing valve device, or the pressure reducing and increasing valve devices may be constructed as a single valve device. Where the cut-off valve device and the pressure reducing or increasing valve device are constructed as a single valve device, this single valve device desirably has a cut-off position for closing all fluid passages connected thereto.

The pressure increasing valve device may be disposed in a common portion of the pressure increasing fluid passage and the primary fluid passage connected to the master cylinder, or may be disposed in the pressure increasing fluid passage.

Where the above fourteenth preferred form of the apparatus comprises the pressure increasing time obtaining means provided in the second preferred form of the apparatus described above, this pressure increasing time obtaining means may obtain as the pressure increasing time a time during which a pressure increasing mode for increasing the pressure in the brake cylinder is established by the anti-lock pressure control means.

The pressure increasing time can be considered as a time period during which the pressure increasing mode is established. The pressure increasing mode may be intermittently established by plating the pressure increasing valve device alternately in the connecting and disconnecting states with a controlled duty ratio or in a pulse control fashion. In this case, the pressure increasing time may be a sum of the time periods during which the pressure increasing valve device is intermittently placed in the connecting state.

Similarly, the pressure reducing time obtaining means may obtain as the pressure reducing time a time during which a pressure reducing mode for reducing the brake cylinder pressure is established by the anti-lock pressure control means.

According to a fifteenth preferred form of the first aspect of the invention, the apparatus further comprises: a master cylinder; a cut-off valve device disposed in a primary fluid passage connecting the master cylinder and the brake cylinder, the cut-off valve device having a connecting state for connecting the master cylinder and the brake cylinder and a disconnecting state for disconnecting the master cylinder and the brake cylinder from each other; a pressure reducing valve device disposed in a pressure reducing fluid passage connecting the reservoir and the brake cylinder, the pressure reducing valve device having a connecting state for connecting the reservoir and the brake cylinder and a disconnecting state for disconnecting the reservoir and the brake cylinder from each other; a pump for pumping up the fluid from the reservoir; a pump-up control valve device disposed in a pump-up passage connecting a delivery port of the pump and the reservoir, the pump-up control valve device having a connecting state for connecting the delivery port of the pump and the reservoir and a disconnecting state for disconnecting the delivery port and the reservoir from each other; and anti-lock pressure control means for controlling the cut-off valve device, the pressure reducing valve device and the pump-up control valve device such that each of the pressure increasing and reducing valve devices is selectively placed in the connecting and disconnecting states while the cut-off valve device is held in the disconnecting state, for controlling the pressure in the brake cylinder so as to maintain a slip of the wheel on a road surface during activation of the brake cylinder at a substantially optimum value.

In the above apparatus, when the pump-up control valve device is switched to the connecting state, the fluid in the reservoir is pumped up and pressurized by the pump, and the pressurized fluid is supplied to the brake cylinder. When the pump-up control valve device is switched to the disconnecting state, the fluid is not supplied from the reservoir to the pump, and the pump simply races.

The pressure in the brake cylinder can be reduced, increased and held by selectively placing each of the pressure reducing and pump-up control valve devices in the connecting and disconnecting states while the cut-off valve device is held in the disconnecting state.

Where the above fifteenth preferred form of the apparatus comprises the pressure increasing time obtaining means provided in the second preferred form of the apparatus described above, this pressure increasing time obtaining means may obtain as the pressure increasing time a time during which the pump-up pressure control valve device is placed in the connecting state.

In the fourteenth or fifteenth preferred form of the apparatus, the anti-lock pressure control means may comprise: reservoir fluid amount estimating means for estimating an amount of the fluid stored in the reservoir on the basis of the cumulative amount of flow of the fluid into the reservoir estimated by the flow-in amount estimating means, and a cumulative amount of flow of the fluid from the brake cylinder into the reservoir; and cut-off valve control means for switching the cut-off valve device to the connecting state when the amount of the fluid stored ins aid reservoir estimated by the reservoir fluid amount estimating means is smaller than a predetermined threshold.

During an anti-lock pressure control operation for the brake cylinder, the brake cylinder is disconnected from the master cylinder, and therefore the amount of the fluid stored in the reservoir may be insufficient to increase the brake cylinder pressure as needed, if the fluid amount in the reservoir is reduced below a given lower limit. To avoid this problem, the cut-off valve control means is operated to switch the cut-off valve device to the disconnecting state to permit the pressurized fluid to be supplied from the master cylinder to the brake cylinder, when the estimated fluid amount in the reservoir becomes smaller than a predetermined threshold.

In the fourteenth or fifteenth preferred form of the apparatus, the anti-lock pressure control means may comprise means for switching the cut-off valve device in the connecting and disconnecting states alternately so as to control a duty ratio thereof.

In the above apparatus, the cut-off valve device is placed alternately in the connecting and disconnecting states after the fluid amount in the reservoir becomes smaller than the threshold. In this case, the gradient of the pressure increase in the brake cylinder is lower than in the case where the cut-off valve device is held in the connecting state.

The second object indicated above may be achieved according to a second aspect of the present invention, which provides a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to the brake cylinder to increase a pressure of the fluid in the brake cylinder, the apparatus comprising: (a) deceleration obtaining means for obtaining a deceleration value of a body of the vehicle; (b) pumping time obtaining means for obtaining a pumping time during which the fluid is pumped up from the reservoir by the pump; and (c) flow-out amount estimating means for estimating a cumulative amount of flow of the fluid from the reservoir, on the basis of the pumping time obtained by the pumping time obtaining means and a deceleration value of the body of the vehicle obtained by the deceleration obtaining means.

The pumping time is a time during which the fluid is substantially pumped up from the reservoir by the pump. In some cases, the operating time of the pump is the pumping time. However, this is not necessarily so. Namely, in some cases, the fluid is not pumped up from the reservoir even when the pump is operated. In these cases, only a portion of the operating time of the pump is the pumping time. For instance, a pump-up control valve may be provided in a pump-up fluid passage between the pump and the reservoir. If the pump is operated while this pump-up control valve is closed, the fluid is not pumped up by the pump and the pump simply races. In this case, the operating time of the pump is not equal to the pumping time. Where a pressure relief valve is provided in a fluid passage through which the pressurized fluid from the pump is delivered, the fluid delivered from the pump is returned to the reservoir through the pressure relief valve when the fluid delivered from the pump is not supplied to the brake cylinder. In this case, the fluid is pumped up by the pump, but does not affect the amount of the fluid stored in the reservoir, since the delivered fluid is eventually returned to the reservoir through the relief valve. Thus, the operating time of the pump while the relief valve is open is not considered to be the substantial pumping time.

Where the fluid pumped up by the pump is entirely supplied to the brake cylinder, the flow-out amount estimating means estimates the amount of the fluid which has been supplied to the brake cylinder. Where only a portion of the fluid pumped up by the pump is supplied to the brake cylinder while the other portion is returned to the reservoir, the flow-out amount estimating means is adapted to also estimate the amount of the fluid which has been supplied to the brake cylinder. In the former case, the pumping time is equal to the pressure increasing time of the brake cylinder and equal to the operating time of the pump. In the latter case, the pumping time is equal to the pressure increasing time.

In the present apparatus constructed according to the second aspect of this invention, the cumulative amount of flow of the fluid from the reservoir is estimated on the basis of the pumping time and the vehicle deceleration value. When the amount of the fluid delivered from the pump per unit time, namely, the delivery rate of the pump is held constant, the cumulative amount of the fluid flow from the reservoir increases with an increase in the pumping time, and decreases with an increase in the pressure in the brake cylinder to which the fluid delivered from the pump is supplied. As described above, the brake cylinder pressure can be estimated on the basis of the vehicle deceleration value, such that the brake cylinder pressure decreases with an increase in the vehicle deceleration value. Accordingly, the cumulative amount of the fluid flow from the reservoir can be estimated with higher accuracy on the basis of the pumping time and the vehicle deceleration value, than in the case the estimation is based on only the pumping time.

According to a first preferred form of the apparatus according to the first aspect of this invention, the flow-out amount estimating means comprises: motor speed obtaining means for obtaining a rotating speed of an electric motor provided to operate the pump; and means for taking into account the rotating speed of the motor obtained by the motor speed obtaining means, when the cumulative amount of flow of the fluid from the reservoir is estimated.

The operating speed of the motor increases with an electric current applied to the motor. The accuracy of estimation of the cumulative amount of the fluid flow from the reservoir can be improved when the operating speed of the motor is taken into account for the estimation. The cumulative amount of the fluid flow from the reservoir which has been estimated on the basis of the vehicle deceleration and the pumping time may be compensated by the operating speed of the motor.

According to a second preferred form of the second aspect of this invention, the hydraulic control apparatus further comprises: flow-in amount estimating means for estimating a cumulative amount of flow of the fluid from the brake cylinder into the reservoir; and reservoir fluid amount estimating means for estimating an amount of the fluid stored in the reservoir, on the basis of the cumulative amount of flow of the fluid into the reservoir estimated by the flow-in amount estimating means, and the cumulative amount of flow of the fluid from the reservoir estimated by the flow-out amount estimating means.

The amount of the fluid stored in the reservoir can be estimated on the basis of the cumulative amount of flow of the fluid into the reservoir estimated by the flow-in amount estimating means and the cumulative amount of flow of the fluid from the reservoir estimated by the flow-out amount estimating means.

In the apparatus adapted to control the pressure in the brake cylinder while the brake cylinder is disconnected from a master cylinder, the brake cylinder pressure is increased by using the fluid stored in the reservoir. In this respect, it is desirable to maintain the fluid amount in the reservoir above a predetermined lower limit, and therefore desirable to estimate the reservoir fluid amount with high accuracy.

According to a third preferred form of the apparatus according to the second aspect of this invention, the pumping time obtaining means comprises operating time obtaining means for obtaining as the pumping time an operating time of the pump.

As the operating time of the pump increases, the amount of the fluid which has been pumped up from the reservoir increases, and the cumulative amount of the fluid from the reservoir increases. The delivery rate of the pump may be considered to be held constant or vary.

Since the vehicle deceleration can be estimated on the basis of the brake cylinder pressure upon initiation of reduction of the brake cylinder pressure, the brake cylinder pressure may be considered as one example of a deceleration-equivalent amount corresponding to the vehicle deceleration. In this case, the cumulative amount of the fluid flow into the reservoir is estimated on the basis of the deceleration-equivalent amount.

According to a fourth preferred form of the apparatus according to the second aspect of the invention, the flow-out amount estimating means comprises pump delivery estimating means for estimating a delivery rate of the pump which is an amount of the fluid delivered from the pump per unit time.

The second object indicated above may also be achieved according to a third aspect of the present invention, which provides a hydraulic pressure control apparatus for a brake including a brake cylinder activated by a pressurized fluid for braking a wheel of a vehicle, a reservoir for storing the fluid discharged from the brake cylinder, and a pump operated by an electric motor for pumping up the fluid from the reservoir and supplying the pumped-up fluid to the brake cylinder to increase a pressure of the fluid in the brake cylinder, the apparatus comprising: (a) motor speed obtaining means for obtaining an operating speed of the electric motor; (b) pumping time obtaining means for obtaining a pumping time during which the fluid is pumped up from the reservoir by the pump; and (c) flow-out amount estimating means for estimating a cumulative amount of flow of the fluid from the reservoir, on the basis of the pumping time obtained by the pumping time obtaining means and the operating speed of the electric motor.

In the hydraulic pressure control apparatus constructed as described just above, the cumulative amount of flow of the fluid from the reservoir is estimated on the basis of the pumping time and the operating time of the electric motor. The delivery rate of the pump can be estimated such that the delivery rate increases with an increase with the operating speed of the pump motor. Accordingly, the accuracy of estimation of the cumulative amount of flow of the fluid from the reservoir can be made higher when the estimation is based on not only the pumping time but also the operating speed of the motor, than when the estimation is based on only the pumping time.

Although the pump may be of any type, but is preferably of a positive displacement type such as a plunger pump, which is adapted such that the delivery rate of the pump is substantially proportional to the operating speed of the pump motor. Where the pump is of a velocity type in which the delivery rate is not necessarily proportional to the pump motor, the accuracy of estimation of the cumulative amount of flow of the fluid from the reservoir is more or less lowered than where the pump is of a positive displacement type. However, the use of the operating speed of the pump motor as well as the pumping time permits improved accuracy of estimation of the cumulative amount of the fluid flow from the reservoir, even where the pump is not of the positive displacement type.

The motor speed obtaining means may use a speed detecting device such as an encoder for directly detecting the rotating speed of the motor. Alternatively, the motor speed obtaining means may comprise speed estimating means for estimating the operating speed of the motor. For instance, where the operating speed of the motor is controlled by controlling the electric current to be supplied to the motor, the operating speed of the motor is not changed instantaneously when the electric current supplied to the motor is changed, but is changed with a certain time delay. This time delay increases with an increase in the inertia of the motor and the pump. Therefore, the operating speed of the motor in the process of a change in the electric current can be estimated on the basis of an amount of change of the electric current and the inertia of the motor and pump. Where the voltage to be applied to the motor is kept constant, an increase in the electric current to be supplied to the motor means an increase in the load acting on the motor, and an increase in the motor load results in a decrease in the operating speeds of the pump and motor. Accordingly, the operating speed of the motor can be estimated on the basis of the electric current.

According to a first preferred form of the apparatus according to the third aspect of this invention, the flow-out amount estimating means comprises: deceleration obtaining means for obtaining a deceleration value of a body of the vehicle; and means for taking into account the deceleration value obtained by the deceleration obtaining means, when the cumulative amount of flow of the fluid from the reservoir is estimated.

The delivery rate of the pump increases with an increase in the operating speed of the motor. If the electric current to be supplied to the motor is constant, an increase in the brake cylinder pressure causes an increase in the motor load, which results in a decrease in the operating speed of the motor and a decrease in the delivery rate of the pump. Accordingly, the accuracy of estimation of the cumulative amount of the fluid flow from the reservoir can be improved by taking into account the vehicle deceleration for the estimation. As in the first preferred form of the apparatus of the second aspect of the invention, the cumulative amount of the fluid flow from the reservoir once estimated on the operating speed of the motor and the pumping time may be compensated depending upon the vehicle deceleration value.

According to a second preferred form of the third aspect of this invention, the apparatus further comprises: a mount estimating means for estimating a cumulative amount of flow of the fluid from the brake cylinder into the reservoir; and reservoir fluid amount estimating means for estimating an amount of the fluid stored in the reservoir, on the basis of the cumulative amount of flow of the fluid into the reservoir estimated by the flow-in amount estimating means, and the cumulative amount of flow of the fluid from the reservoir estimated by the flow-out amount estimating means. This preferred form has substantially the same advantage as described above with respect to the second preferred form of the second aspect of the invention.

According to a third preferred form of this third aspect of the invention, the pumping time obtaining means compreises operating time obtaining means for obtaining as the pumping time an operating time of the pump. This preferred form has substantially the same advantage as described above with respect to the third preferred form of the second aspect of the invention.

According to a fourth preferred form of the third aspect of this invention, the apparatus further comprises current control means for controlling an electric current to be supplied to the electric motor, and wherein the motor speed obtaining means comprises speed estimating means for estimating the operating speed of the electric motor on the basis of the electric current supplied to the electric motor and at least one amount including an inertia of a rotating portion of the electric motor.

While the operating speed of the motor increases with an increase in the electric current to be supplied to the motor, the operating speed of the motor does not change immediately after a change in the electric current, due to the inertia of the rotating members of the motor and the inertia of the movable members of the pump. In this respect, it is desirable to estimate the operating speed of the motor in the process of a change in the electric current supplied thereto, on the basis of at least the inertia of the rotating members of the motor as well as the electric current.

According to a fifth preferred form of the third aspect of this invention, the motor speed obtaining means comprises a speed detecting device for directly detecting the operating speed of the electric motor the operating speed of the motor closely relates to the delivery rate of the pump driven by the motor. Accordingly, the accuracy of estimation of the rate of the fluid flow from the reservoir or the cumulative amount of the fluid flow from the reservoir can be improved by taking into account the operating speed of the motor obtained by the motor speed obtaining means. The operating speed of the motor increases with an increase in the electric current to be supplied to the motor. If the electric current is constant, an increase in the brake cylinder pressure causes an increase in the motor load, which results in lowering the motor speed. Therefore, if the electric current to be supplied to the motor is kept constant, the brake cylinder pressure can be estimated from only the operating speed of the motor. If the electric current is variable, the motor speed is directly detected by a suitable detector such as an encoder, and the motor load is estimated from the motor speed and the electric current, whereby the brake cylinder pressure can be estimated from the motor load.

According to a sixth preferred form of the third aspect of this invention, the flow-out amount estimating means comprises pump delivery estimating means for estimating a delivery rate of the pump which is an amount of the fluid delivered from the pump per unit time. This form of the apparatus has substantially the same advantages as the fourth preferred form of the apparatus according to the second aspect of the invention.

According to a seventh preferred form of the third aspect of the invention, a delivery rate of the pump is determined by the operating speed of the electric motor, and the flow-out amount estimating means comprises a pump delivery estimating mans for estimating the delivery rate of the pump which is an amount of the fluid delivered from the pump per unit time, while the pump delivery estimating means comprises means for estimating the delivery rate on the basis of the operating speed of the electric motor.

Where the operating speed of the pump is proportional to the delivery rate, the delivery rate of the pump can be estimated with high accuracy on the basis of the operating speed of the motor, namely, on the basis of the operating speed of the pump.

The first object indicated above may also be achieved according to a fourth aspect of the present invention, which provides a hydraulic pressure control apparatus for a brake including a brake cylinder activated by a pressurized fluid for braking a wheel of a vehicle and a reservoir for storing the fluid discharged from the brake cylinder when a pressure of the fluid in the brake cylinder is reduced, the apparatus comprising: (a) pressure reducing time obtaining means for obtaining a pressure reducing time during which the pressure of the fluid in the brake cylinder is reduced; (b) a pressure detecting device for detecting the pressure of the fluid in the brake cylinder; and (c) flow-in amount estimating means for estimating a cumulative amount of flow of the fluid into the reservoir, on the basis of the pressure of the fluid in the brake cylinder detected by the pressure detecting device and the pressure reducing time obtained by the pressure reducing time obtaining means.

The use of the directly detected brake cylinder pressure in addition to the pressure reducing time permits improved accuracy of estimation of the cumulative amount of flow of the fluid into the reservoir. The brake cylinder pressure may be detected only upon initiation of reduction of the brake cylinder pressure, or from time to time during a period of the reduction of the brake cylinder pressure.

The second object indicated above may also be achieved according to a fifth aspect of this invention, which provides a hydraulic pressure control apparatus for a brake including a brake cylinder activated by a pressurized fluid for braking a wheel of a vehicle, a reservoir for storing the fluid discharged from the brake cylinder, and a pump operated by an electric motor for pumping up the fluid from the reservoir and supplying the pumped-up fluid to the brake cylinder to increase a pressure of the fluid in the brake cylinder, the apparatus comprising: (a) a current obtaining device for obtaining an electric current flowing through the electric motor; (b) pumping time obtaining means for obtaining a pumping time during which the fluid is pumped up from the reservoir by the pump; and (c) flow-out amount estimating means for estimating a cumulative amount of flow of the fluid from the reservoir, on the basis of the pumping time obtained by the pumping time obtaining means and the electric current detected by the deceleration obtaining means.

The electric current of the pump motor increases with a load acting on the pump, if the voltage applied to the motor is constant. Accordingly, an increase in the electric current of the motor causes an increase in the brake cylinder pressure, and results in a decrease in the delivery rate of the pump. Therefore, the cumulative amount of flow of the fluid from the reservoir can be estimated to decrease with an increase in the electric current of the motor. Thus, the load acting on the pump motor can be obtained on the basis of the electric current of the motor. In this sense, the current obtaining means indicated above can be considered as means for estimating the motor load.

As described above, the operating speed of the motor decreases with an increase in the electric current flowing through the motor, if the voltage applied to the motor is constant. Accordingly, the operating speed of the motor can be estimated on the basis of the electric current obtained by the current obtaining means.

It is also noted that the brake cylinder pressure increases with an increase in the load acting on the motor. Accordingly, the brake cylinder pressure can be estimated on the basis of the electric current obtained by the current obtaining means. In this case, it is possible to consider that the motor load is taken into account for the estimation of the cumulative amount of the fluid flow from the reservoir by the flow-out amount estimating means. It is also possible to consider that the electric current flowing through the motor is taken into account for the estimation.

The second object indicated above may also be achieved according to a sixth aspect of this invention, which provides a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to the brake cylinder to increase a pressure of the fluid in the brake cylinder, the apparatus comprising: (a) pumping time obtaining means for obtaining a pumping time during which the fluid is pumped up from the reservoir by the pump; (b) pump state estimating means for estimating an operating state of the pump; and (c) flow-out amount estimating means for estimating a cumulative amount of flow of the fluid from the reservoir, on the basis of the operating state of the pump estimated by the pump state estimating means and the pumping time obtained by the pumping time obtaining means.

The pump state estimating means may include means for estimating the delivery rate of the pump, means for estimating the operating state of the pump, or means for estimating an amount of change in the operating state of the pump, for example.

The second object indicated above may also be achieved according to a seventh aspect of this invention, which provides a hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to the brake cylinder to increase a pressure of the fluid in the brake cylinder, the apparatus comprising: (a) a pressure detecting device for detecting the pressure of the fluid in the brake cylinder; (b) pumping time obtaining means for obtaining a pumping time during which the fluid is pumped up from the reservoir by the pump; and (c) flow-out amount estimating means for estimating a cumulative amount of flow of the fluid from the reservoir, on the basis of the pumping time obtained by the pumping time obtaining means and the pressure of the fluid in the brake cylinder detected by the pressure detecting device.

The use of the directly detected brake cylinder pressure permits improved accuracy of estimation of the cumulative amount of flow of the fluid from the reservoir. The pressure detecting device may include means for detecting the brake cylinder pressure only upon initiation of reduction of the brake cylinder pressure, or means for detecting the brake cylinder pressure from time to time during a period of the pressure reduction of the brake cylinder.

The second object may also be achieved according to an eighth aspect of this invention, which provides a hydraulic pressure control apparatus for a brake including a brake cylinder activated by a pressurized fluid for braking a wheel of a vehicle, a reservoir for storing the fluid discharged from the brake cylinder, and a pump driven by an electric motor for pumping up the fluid from the reservoir and supplying the pumped-up fluid to the brake cylinder to increase a pressure of the fluid in the brake cylinder, the apparatus comprising: (a) deceleration obtaining means for obtaining a deceleration value of a body of the vehicle; (b) motor speed obtaining means for obtaining an operating speed of the electric motor; (c) pumping time obtaining means for obtaining a pumping time during which the fluid is pumped up from the reservoir by the pump; and (d) flow-out amount estimating means for estimating a cumulative amount of flow of the fluid from the reservoir, on the basis of the pumping time obtained by the pumping time obtaining means, the deceleration value of the body of the vehicle obtained by the deceleration obtaining means, and the operating speed of the electric motor obtained by the motor speed obtaining means.

The use of not only the vehicle deceleration and the pumping time but also the operating time of the pump motor permits improved accuracy of estimation of the cumulative amount of the fluid flow from the reservoir. For instance, the delivery rate of the pump is relatively high when the operating speed of the motor is relatively high than when the operating speed is relatively low, if the vehicle deceleration is constant.

The third object indicated above may be achieved according to a ninth aspect of the present invention, which provides a hydraulic braking system for a motor vehicle, comprising: (a) a master cylinder having two pressurizing chambers; (b) two fluid passages for connecting one of the two pressurizing chambers of the master cylinder to a front wheel brake cylinder and a rear wheel brake cylinder for braking a front and a rear wheel, respectively; (c) a first shut-off valve selectively placed in a connecting state for connecting the front and rear wheel brake cylinders to the master cylinder and a disconnecting state for disconnecting the wheel brake cylinders from the master cylinder; (d) a reservoir for storing a working fluid; (e) a pump for pressurizing the fluid pumped up from the reservoir and delivering the pressurized fluid to the front and rear wheel brake cylinders; (f) a valve device having a first state for permitting flows of the fluid from both of the front and rear wheel brake cylinders into the reservoir, a second state for permitting a flow of the fluid from the rear wheel brake cylinder into the reservoir while inhibiting a flow of the fluid from the front wheel brake cylinder, and a third state for inhibiting the flows of the fluid from both of the front and rear wheel brake cylinders while permitting a flow of the pressurized fluid from the pump into at least one of the front and rear wheel brake cylinders; and (g) anti-lock pressure control means for controlling an operation of the pump while the first shut-off valve is placed in the connecting state, and selectively placing the valve device in the first, second and third states, so as to control pressures of the fluid in the front and rear wheel brake cylinders such that a slip of each of the front and rear wheels on a road surface upon activation of the front and rear wheel brake cylinder is maintained at a substantially optimum value, and wherein the anti-lock pressure control means comprising reservoir fluid amount estimating means for estimating an amount of the fluid stored in the reservoir, on the basis of a pressure reducing time during which the valve device is placed in the first state, and an operating time of the pump.

The valve device having the first, second and third states may be adapted so as to permit the flow of the fluid from the pump to (i) only the front wheel brake cylinder, (ii) only the rear wheel brake cylinder, or (iii) both of the front and rear wheel brake cylinders when the valve device is placed in the third state. Further, the valve device may be adapted such that the third state has selected two or three sub-states corresponding to the above three conditions (i), (ii) and (iii) regarding the permitted flows of the fluid from the pump to at least one of the front and rear wheel brake cylinders in the third state.

In the case where the valve device is the valve device 316 including the second shut-off valve 320 and the third shut-off valve 322 as shown in FIG. 27, for example, the there are two conditions when the valve device 316 is placed in the third state. In the first condition, the valve device 316 in the third state permits flows of the fluid from the pump 314 to both of the front and rear wheel brake cylinders 304, 306. In the second condition, the valve device 316 in the third state permits a flow of the fluid from the pump 314 to only the front wheel brake cylinder. The valve device may include the pressure reducing valve device 324 as well as the second and third shut-off valves 320, 322. In this case, there are three conditions which consist of the above-indicated first and second conditions, and a third condition in which the valve device permits the flow of the fluid from the pump 314 to only the rear wheel brake cylinder 306.

In the hydraulic braking system according to the ninth aspect of this invention, the amount of the fluid in the reservoir is estimated on the basis of the pressure reducing time during which the valve device is placed in the first state, and the operating time of the pump.

The amount of flow of the fluid discharged from the front and rear wheel brake cylinders into the reservoir increases with an increase in the pressure reducing time, while the amount of flow of the fluid pumped up from the reservoir by the pump increases with an increase in the operating time of the pump. Accordingly, the amount of the fluid stored in the reservoir can be estimated to increase with the pressure reducing time and decrease with the operating time of the pump.

The pressure reducing time is a time during which the valve device is placed in the first state which permits the fluid to be discharged from the front wheel brake cylinder. When the valve device is placed in the second state, the valve device does not permit the flow of the fluid from the front wheel brake cylinder. On the other hand, the flow of the fluid from the rear wheel brake cylinder is permitted when the valve device is placed in the first state and when the valve device is placed in the second state. If the flow of the fluid from the front wheel brake cylinder is permitted, it means that the valve device is placed in the first state and that the flow of the fluid from the rear wheel brake cylinder is also permitted. Accordingly, by detecting the time during which the flow of the fluid from the front wheel brake cylinder is permitted, it is possible to detect the time during which the valve device is placed in the first state, that is, the pressure reducing time during which the fluid pressures in the front and rear wheel brake cylinders are reduced. Unlike the known reservoir fluid amount estimating means, the present reservoir fluid amount estimating means does not require detecting the times during which the valve device is placed in two or more different states, respectively. That is, the reservoir fluid amount estimating of the present braking system requires the detection of only the pressure reducing time during which the valve device is placed in the first state.

Further, the present braking system requires only the detection or determination as to whether the flow of the fluid from the front wheel brake cylinder is permitted or not, irrespective of whether the anti-lock pressure control means is currently active for only the front wheel or for both of the front and rear wheels. The present braking system does not require the determination as to whether the flow of the fluid from the rear wheel brake cylinder is permitted or not.

The present braking system does not take into account a time during which the valve device is placed in the second state, namely, a time during which the flow of the fluid from only the rear wheel brake cylinder is permitted. This is primarily because the capacity of the rear wheel brake cylinder is smaller than that of the front wheel brake cylinder, and the amount of the fluid discharged from the rear wheel brake cylinder is smaller than that from the front wheel brake cylinder. There is another reason why the present system does not use the time during which the flow of the fluid from only the rear wheel brake cylinder is permitted. That is, it is desirable that the estimated amount of the fluid flow into the reservoir be smaller than the actual amount, rather than larger than the actual amount.

In the present hydraulic braking system, the amount of the fluid which has been discharged from the front and rear wheel brake cylinders into the reservoir is estimated on the basis of the detected pressure reducing time, while the amount of the fluid which has been discharged from the reservoir is estimated on the basis of the operating time of the pump, as described above. Accordingly, the anti-lock pressure control means is not required to perform complication operations to estimate the amounts of the fluid flows into and from the reservoir, whereby the estimation of the reservoir fluid amount is facilitated according to the present ninth aspect of this invention.

It is also noted that the amount of the fluid in the reservoir is estimated on the basis of the operating time of the pump, and not on the basis of the pressure increasing times of the front and rear wheel brake cylinders. Thus, the anti-lock pressure control means is not required to detect the pressure increasing times of the two wheel brake cylinders.

According to a first preferred form of the braking system of the ninth aspect of this invention, the reservoir fluid amount estimating means comprises deceleration obtaining means for obtaining a deceleration value of a body of the vehicle, and estimates the amount of the fluid stored in the reservoir on the basis of the deceleration value obtained by the deceleration obtaining means, the pressure reducing time and the operating time of the pump.

In this preferred form of the braking system, the reservoir fluid amount is estimated on the basis of the vehicle deceleration value obtained by the deceleration obtaining means, as well as the pressure reducing time and the operating time of the pump. An overall braking force to be applied to the motor vehicle increases with the vehicle deceleration value, and the pressures in the front and rear wheel brake cylinders can be estimated to increase with an increase in the vehicle deceleration value.

At least the rate of flow of the fluid into the reservoir (amount of the fluid flow into the reservoir per unit time) can be estimated to increase with an increase in the brake cylinder pressures. Further, the rate of flow of the fluid from the reservoir by operation of the pump (amount of the fluid from from the reservoir per unit time) may be considered to decrease with an increase in the wheel brake cylinder pressures.

When the fluid is discharged from the wheel brake cylinder (or cylinders) into the reservoir, the rate of the fluid flow from the wheel brake cylinder increases with an increase in a difference between the pressure in the wheel brake cylinder and the pressure in the reservoir. However, the fluid pressure in the reservoir is held substantially constant, and therefore the rate of the fluid flow into the reservoir increases with an increase in the wheel brake cylinder pressure.

When the fluid pumped up from the reservoir by the pump is delivered to the wheel brake cylinder, the operating speed and the delivery rate of the pump generally decrease with an increase in the wheel brake cylinder pressure. In most case, the rate of the fluid flow from the reservoir decreases with an increase in the wheel brake cylinder pressure.

According to a second preferred form of the braking system of the ninth aspect of this invention, the reservoir fluid amount estimating means comprises flow-in amount estimating means for estimating an amount of flow of the fluid into the reservoir on the basis of the pressure reducing time, and this flow-in amount estimating means comprises deceleration obtaining means for obtaining a deceleration value of a body of the vehicle, and is adapted to estimate the amount of flow of the fluid into the reservoir on the basis of the deceleration value obtained by the deceleration obtaining means and the pressure reducing time.

When the vehicle deceleration is relatively high, the fluid pressures in the front and rear wheel brake cylinders are estimated to be relatively high, and the amount of the fluid into the reservoir is estimated to be relatively high. The flow-in amount estimating means may estimate the amount of flow of the fluid into the reservoir such that the amount of the fluid flow into the reservoir continuously varies with the vehicle deceleration value, or such that the amount of the fluid flow into the reservoir varies in steps corresponding to a plurality of ranges of the vehicle deceleration value.

According to a third preferred form of the present ninth aspect of this invention, the reservoir fluid amount estimating means comprises flow-in amount estimating means for estimating an amount of flow of the fluid into the reservoir on the basis of the pressure reducing time, and this flow-in amount estimating means comprises a pressure detecting device for detecting at least the pressure of the fluid in the front wheel brake cylinder, and is adapted to estimate the amount of flow of the fluid into the reservoir on the basis of the pressure of the fluid in the front wheel brake cylinder and the pressure reducing time.

The use of the directly detected fluid pressure of the wheel brake cylinder or cylinders permits improved estimation of the amount of the fluid flow into the reservoir, than the use of the wheel brake cylinder pressure value or values estimated on the basis of the vehicle deceleration value.

While the fluid pressure values of both of the front and rear wheel brake cylinders may be used, the fluid pressure value of the front wheel brake cylinder is preferably used where the pressure value of only one of the front and rear wheel brake cylinders is used.

The amount of the fluid flow discharged from the front and rear wheel brake cylinders is influenced by not only the pressures in the wheel brake cylinders, but also other factors such as the capacity of each wheel brake cylinder and a flow resistance of passages leading to the reservoir. Generally, the amount of the fluid flow from the reservoir increases with an increase in the capacity of the wheel brake cylinders. Since the capacity of the front wheel brake cylinder is larger than that of the rear wheel brake cylinder, the use of the directly detected pressure of the front wheel brake cylinder is desirable.

In the case where a proportioning valve is provided for the rear wheel brake cylinder, the front wheel brake cylinder pressure is made higher than the rear wheel brake cylinder pressure after the master cylinder pressure is raised above a predetermined critical level. Usually, an anti-lock pressure control operation is initiated by the anti-lock pressure control means when the master cylinder pressure is higher than the critical level of the proportioning valve. Accordingly, the amount of the fluid discharged from the front wheel brake cylinder into the reservoir is larger than that from the rear wheel brake cylinder. In this respect, it is desirable to detect the front wheel brake cylinder pressure if the pressure of only one of the two wheel brake cylinders is used for estimating the amount of the fluid flow into the reservoir.

According to a fourth preferred form of the ninth aspect of this invention, the reservoir fluid amount estimating means comprises flow-out amount estimating means for estimating an amount of flow of the fluid from the reservoir by pumping of the fluid by the pump, on the basis of the operating time of the pump. In this case, the flow-out amount estimating means comprises deceleration obtaining means for obtaining a deceleration value of a body of the vehicle, and is adapted to estimate the amount of flow of the fluid from the reservoir on the basis of the deceleration value obtained by the deceleration obtaining means and the operating time of the pump.

When the vehicle deceleration value is relatively high, the pressures of the front and rear wheel brake cylinders are estimated to be relatively high, and the amount of the fluid from from the reservoir is estimated to be relatively small. The flow-out amount estimating means may estimate the amount of the fluid flow from the reservoir such that the amount of the fluid flow from the reservoir continuously varies with the vehicle deceleration value, or such that the amount of the fluid flow from the reservoir varies in steps corresponding to a plurality of ranges of the vehicle deceleration value.

According to a fifth preferred form of this ninth aspect of the present invention, the hydraulic braking system further comprises an electric motor for operating the pump, and the reservoir fluid amount estimating means comprises flow-out amount estimating means for estimating an amount of flow of the fluid from the reservoir by pumping of the fluid by the pump, on the basis of the operating time of the pump. In this case, the flow-out amount estimating means comprises a current detecting device for detecting an electric current flowing through the electric motor, and is adapted to estimate the amount of flow of the fluid from the reservoir on the basis of the electric current detected by the current detecting means and the operating time of the pump.

Generally, the pump motor is operated by application of a predetermined voltage. The electric current flowing through the motor (current flowing through an armature coil of the motor) increases with an increase in a load acting on the pump. However, the operating speed and delivery amount per unit time (delivery rate) of the pump decrease with an increase in the pump load. The electric current of the motor decreases and the speed and delivery rate of the pump increase with a decrease in the pump load. Accordingly, the delivery rate of the pump can be estimated on the basis of the current flowing through the pump motor, whereby the amount of the fluid flow from the reservoir can be estimated on the basis of the motor current.

The flow-out amount estimating means may estimate the amount of the fluid flow from the reservoir such that the amount of the fluid flow from the reservoir continuously varies with the motor current, or such that the amount of the fluid flow from the reservoir varies in steps corresponding to a plurality of ranges of the motor current.

According to a sixth preferred form of the ninth aspect of the invention, the valve device comprises a second shut-off valve disposed in a front wheel reservoir passage connecting the front wheel brake cylinder and the reservoir, and a third shut-off valve disposed in a portion of a rear wheel reservoir passage connecting the rear wheel brake cylinder and the reservoir, which portion also functioning as a portion of the front wheel reservoir passage. In this case, the pump has a delivery port connected to a portion of the front wheel reservoir passage between the front wheel brake cylinder and the second shut-off valve.

In one advantageous arrangement of the above form of the braking system, the valve device further comprises a pressure reducing device disposed in a portion of the front wheel reservoir passage between the front wheel brake cylinder and the second shut-off valve. The pressure reducing device is constructed to permit a flow of the fluid therethrough in a first direction from the front wheel brake cylinder toward the reservoir and inhibit a flow of the fluid therethrough in a second direction opposite to the first direction when the pressure of the fluid on one side of the pressure reducing device on the side of the front wheel brake cylinder is not higher than that on the other side of the pressure reducing valve device by more than a predetermined valve opening pressure difference. In this instance, the pump has a delivery port connected to a portion of the front wheel reservoir passage between the pressure reducing device and the second shut-off valve.

When the third shut-off valve is placed in the open state and the second shut-off valve is also in the open state, the front and rear wheel brake cylinders are both communicated with the reservoir, permitting the fluid to be discharged from the front and rear wheel brake cylinders into the reservoir. Namely, the valve device is placed in the first state for reducing the fluid pressures in the front and rear wheel brake cylinders.

When the third shut-off valve is placed in the open state and the second shut-off valve is placed in the closed state, the rear wheel brake cylinder is communicated with the reservoir while the front wheel brake cylinder is disconnected from the reservoir, permitting the fluid to be discharged from only the rear wheel brake cylinder. Namely, the valve device is placed in the second state for reducing only the fluid pressure in the rear wheel brake cylinder.

When the third shut-off valve is placed in the closed state, the front and rear wheel brake cylinders are both disconnected from the reservoir. When the second shut-off valve is closed while the third shut-off valve is closed, the delivery port of the pump is communicated with the front wheel brake cylinder and disconnected from the rear wheel brake cylinder. When the second shut-off valve is open while the third-shut-off valve is closed, the delivery port is communicated with both of the front and rear wheel brake cylinders. Namely, the valve device is placed in the third state in which the second shut-off valve is either open is closed while the third shut-off valve is closed.

In the latter case, that is, when the third shut-off valve is in the closed state while the second shut-off valve is in the open state, the pressurized fluid delivered from the pump is supplied to both of the front wheel brake cylinders or to only the rear wheel brake cylinder. If the pressure reducing device indicated above is not provided, the former case applies. If the pressure reducing valve is provided, either the former case or the latter case applies. In the braking system according to the above-described sixth preferred form, the valve device which includes the second and third shut-off valves may or may not include the pressure reducing device.

In the above-described advantageous arrangement of the sixth preferred form of the braking system, the valve device includes the pressure reducing device in addition to the second and third shut-off valves. When the valve device is placed in the third state, that is, when the second shut-off valve is placed in the open state with the third shut-off valve being placed in the closed state, therefore, the pressurized fluid delivered from the pump is supplied directly to the rear wheel brake cylinder, while it is supplied to the front wheel brake cylinder via the pressure reducing valve. However, the pressure reducing device is adapted to inhibit the flow of the fluid from the second shut-off valve to the front wheel brake cylinder when the difference between the pressures on the opposite sides of the pressure reducing device is not larger than the predetermined valve opening pressure difference. The fluid delivered from the pump is supplied to the rear wheel brake cylinder but is not supplied to the front wheel brake cylinder when the pressure difference is not larger than the predetermined valve opening value. When the pressure difference exceeds the valve opening value, the fluid delivered from the pump is supplied also to the front wheel brake cylinder, but the pressure of the front wheel brake cylinder is made lower than that of the rear wheel brake cylinder by an amount corresponding to the predetermined valve opening value.

Where the valve device includes the pressure reducing device as well as the second and third shut-off valves, as described above, the fluid delivered from the pump is permitted to be supplied to only the rear wheel brake cylinder or both of the front and rear wheel brake cylinders, when the second shut-off valve is in the open state while the third shut-off valve is in the closed state.

When the third and second shut-off valves are both placed in the open state, the fluid is discharged from both of the front and rear wheel brake cylinders, and the pressures therein are reduced. When the second shut-off valve is alternately opened and closed while the third shut-off valve is held in the open state, the discharge flow of the fluid from the front wheel brake cylinder and the supply flow of the fluid into the front wheel brake cylinder are alternately permitted. The front wheel brake cylinder pressure is maintained if the ratio of a time during which the supply flow is permitted to a time during which the discharge flow is permitted is equal to a pressure holding value which is substantially equal to "1". The front wheel brake cylinder pressure is reduced and increased if the above ratio is smaller and larger than the pressure holding value, respectively.

In either case, when the second shut-off valve is placed in the open state wherein the discharge flows of the fluid from the front and rear wheel brake cylinders are permitted but the discharge flow of the fluid into the front wheel brake cylinder is not continuously permitted, it may be considered that the valve device is not placed in its first state. However, in a sense that the discharge flow of the fluid from the front wheel brake cylinder is permitted by some small, the valve device may be considered to be placed in the first state. In the former case, the pressure reducing time is detected by measuring a time during which the pressure reducing mode is established for the front wheel brake cylinder. In the latter case, the pressure reducing time is detected by measuring a time during which the second and third shut-off valves are both placed in the open state (the time during which the seventh pressure control mode is established in the braking system of FIG. 27). In either of these cases, the pressure reducing time is detected by measuring a time duration of an appropriate specific condition of the valve device.

In the former case, the reservoir fluid amount estimating means may include means for measuring, as the pressure reducing time, the time during which the pressure reducing mode is established for the front wheel brake cylinder. In the latter case, the reservoir fluid amount estimating means may include means for measuring, as the pressure reducing time, the time during which the second and third shut-off valves are both placed in the open state.

According to a seventh preferred form of the ninth aspect of this invention, the anti-lock pressure control means comprises means for holding the pump in an operated state during during an anti-lock pressure control operation for at least one of the front and rear wheel brake cylinders such that the slip is maintained at the substantially optimum value.

During the anti-lock pressure control operation, the pump motor may be held operated, or operated when needed, for example, when the wheel brake cylinder pressure is increased. However, the motor is preferably held operated.

The amount of the fluid which has been pumped up by the pump between the moments of the last and present estimations is estimated on the basis of the operating time of the pump. In the present preferred form of the braking system, the operating time of the pump is equal to a time period between the above-indicated moments. When the amount of the fluid discharged from the reservoir during a period from the moment of initiation of the anti-lock pressure control operation to the moment of the present estimation is estimated, the operating time of the pump is equal to the above-indicated period. Thus, if the pump is held on throughout the anti-lock pressure control operation, the operating time of the pump can be easily detected, and the operation of the pump is stabilized, leading to improved accuracy of estimation of the amount of the fluid flow from the reservoir.

According to an eighth preferred form of the present ninth aspect of the invention, the braking system further comprises valve control means for switching the first shut-off valve from the disconnecting state to the connecting state when the amount of the fluid stored in the reservoir estimated by the reservoir fluid amount estimating means is reduced below a predetermined lower limit.

The present preferred form of the braking system does not suffer from shortage of the fluid, since the first shut-off valve is switched to the connecting state when the amount of the fluid in the reservoir becomes smaller than the predetermined lower limit. The lower limit may be zero.

According to a ninth preferred form of the ninth aspect of this invention, the braking system further comprises pump control means for turning off the pump when the amount of the fluid stored in the reservoir estimated by the reservoir fluid amount estimating means is reduced below a predetermined lower limit.

When the reservoir becomes empty, the pump races without a substantive load. To avoid this, the pump motor is turned off when the fluid amount in the reservoir becomes smaller than the lower limit, whereby the operating noise of the motor can be reduced.

According to a tenth preferred form of the ninth aspect of the invention, the braking system further comprises an electric motor for operating the pump, and the anti-lock pressure control means comprises current control means for controlling an electric current to be supplied to the electric motor.

The delivery of the pump increases with an increase in the electric current to be supplied to the pump motor. If the braking system is adapted to return the fluid delivered from the pump to the master cylinder, the amount of the fluid returned to the master cylinder can be reduced and the rate of reduction of the fluid amount in the reservoir can be lowered, if the electric current to be supplied to the pump motor is controlled on the basis of the estimated amount of the fluid required for the wheel brake cylinder (on the basis of the estimated desired value of the brake cylinder pressure).

The amount of the fluid pumped up from the reservoir by the pump can be estimated on the basis of the electric current to be supplied from the current control means to the electric motor for operating the pump. Where the electric current is controlled so as to control the duty ratio of the motor, the operating time of the pump can be determined on the basis of the duty ratio.

If the electric current to be supplied to the pump motor is controlled such that the operating speed of the pump is held substantially constant, the delivery rate of the pump is held substantially constant irrespective of the wheel brake cylinder pressures, whereby the accuracy of estimation of the amount of the fluid from from the reservoir can be improved.

In the above-indicated fifth preferred form of the braking system according to this ninth aspect of the invention, the delivery rate of the pump is estimated on the basis of the electric current flowing through the pump motor (on the basis of the motor load) while the voltage applied to the motor is held constant. In the present ninth preferred form of the braking system, the electric current supplied to the motor is positively controlled so as to control the delivery rate of the pump.

BRIEF DESCRIPTION OF THE DRAWINGS

The above and optional objects, features, advantages and technical significance of the present invention will be better understood by reading the following detailed description of presently preferred embodiments of the invention, when considered in conjunction with the accompanying drawings, in which:

FIG. 15 is a view indicating a data map for determining fluid flow-in coefficients, which data map is stored in the read-only memory in the embodiment of FIG. 11;

FIG. 16 is also a view indicating a data map for determining the fluid flow-in coefficients, which data map is stored in the read-only memory in the embodiment of FIG. 11;

FIG. 20 is a flow chart of a routine for estimating a pressure reducing gradient in the embodiment of FIG. 11;

DETAILED DESCRIPTION OF THE PREFERRED EMBODIMENTS

Figure 1:
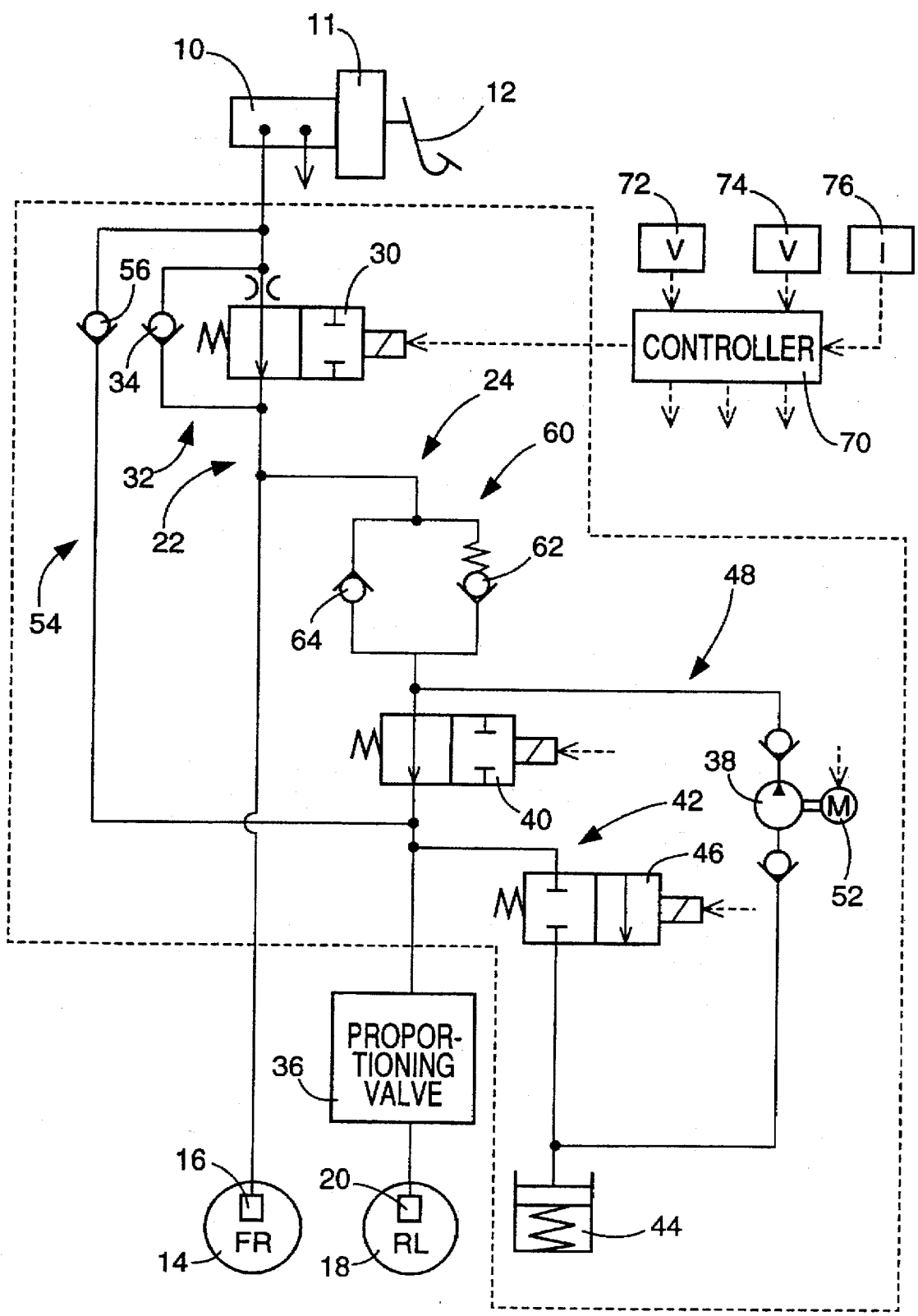
FIG. 1 is a schematic view illustrating an anti-lock braking system including a hydraulic pressure control apparatus constructed according to one embodiment of this invention.

Referring first to FIG. 1, there is shown an anti-lock braking system of diagonal or X-crossing type for a motor vehicle. In the figure, reference numeral 10 denotes a master cylinder which functions as a hydraulic pressure source. The master cylinder 10 is of a tandem type in which two mutually independent fluid pressurizing chambers are disposed in series. The master cylinder 10 is linked with a brake operating member in the form of a brake pedal 12 through a booster 11. Upon operation or depression of the brake pedal 12 by the driver or operator of the motor vehicle, equal pressures of a working brake fluid are mechanically generated in the two pressurizing chambers of the master cylinder 10.

One of the two pressurizing chambers of the master cylinder 10 is connected to brake cylinders 16, 20 of hydraulically operated brakes for a front right wheel 14 and a rear left wheel 18 of the vehicle, while the other pressurizing chamber is connected to brake cylinders (not shown) of hydraulically operated brakes for a front left wheel and a rear right wheel (not shown) of the vehicle. These brake cylinders are hereinafter referred to as "wheel brake cylinders". Thus, the braking system has two mutually independent pressure application sub-systems, one of which has the front right wheel brake cylinder 16 and the rear left wheel brake cylinder 20, and the other of which has the front left wheel brake cylinder and the rear right wheel brake cylinder. Since the two pressure application sub-systems are identical in construction with each other, only one of these two sub-systems is illustrated in FIG. 1 and will be hereinafter described.

In each pressure application sub-system, the corresponding pressurizing chamber of the master cylinder 10 is connected to the front wheel brake cylinder 16 through a front brake cylinder passage (primary fluid passage) 22. A rear brake cylinder passage (secondary fluid passage) 24 is connected at one end thereof to the front wheel brake cylinder passage 22 and at the other end to the rear wheel brake cylinder 20.

A normally-open first solenoid-operated shut-off valve in the form of a cut-off valve 30 is disposed in a portion of the front brake cylinder passage 22 between the master cylinder 10 and a point of connection of the front and rear wheel brake cylinder passages 22, 24. Further, a by-pass return passage 32 is provided in parallel with the first shut-off valve 30, so as to by-pass the cut-off valve 30. The by-pass return passage 32 is provided with a check valve 34, which inhibits a flow of the brake fluid in a first direction from the master cylinder 10 toward the front wheel brake cylinder 16, and permits a flow of the brake fluid in a second direction opposite to the first direction. Namely, the brake fluid is permitted to flow through the check valve 34 in the second direction when the pressure downstream of the cut-off valve 30 (on the side of the front wheel brake cylinder 16) is higher than the pressure upstream of the cut-off valve 30 (on the side of the master cylinder 10), by more than a predetermined difference (hereinafter referred to as "valve opening pressure difference"). However, this valve opening pressure difference of the check valve 34 is substantially zero. The by-pass return passage 32 and check valve 34 are provided to return the fluid from the front wheel brake cylinder 16 to the master cylinder when the depressed brake pedal 12 is moved toward the fully retracted position.

Described in detail, the by-pass return passage 32 and check valve 34 have not only a function of rapidly returning the fluid from the front wheel brake cylinder 16 to the master cylinder 10 upon releasing of the brake pedal 12 during a normal braking operation (not in an anti-lock control fashion), but also a function of returning the fluid from the front wheel brake cylinder 16 to the master cylinder upon releasing of the brake pedal 12 when a controller 70 of the braking system is placed in an anti-lock pressure control mode wherein the fluid pressures in the front and rear wheel brake cylinders 16, 20 are automatically controlled so as to avoid excessive amounts of slip of the front and rear wheels 14, 18. In the present embodiment, the cut-off valve 30 is usually held closed throughout an anti-lock pressure control operation, and the fluid cannot be returned from the front wheel brake cylinder 16 to the master cylinder 10 through the cut-off valve 30 in the anti-lock pressure control operation, as described below. To return the fluid from the front wheel brake cylinder 16 to the master cylinder 10 in the anti-lock pressure control mode, the by-pass return passage 32 and the check valve 34 are provided in the present embodiment.

A proportioning valve or P valve 36 is provided in the rear brake cylinder passage 24. This proportioning valve 36 (hereinafter referred to as "P valve 36") is constructed as well known in the art, and a detailed description of the P valve 36 is deemed unnecessary. Briefly described, the P valve 36 functions such that its output pressure to be applied to the rear wheel brake cylinder 20 is equal to its input pressure when the input pressure is not higher than a predetermined critical point, while its output pressure is lowered at a predetermined ratio with respect to its input pressure when the input pressure is higher than the critical point, in order to avoid locking of the rear wheel 18 due to an excessive pressure in the rear wheel brake cylinder 20.

During a normal braking operation, the P valve 36 receives the pressurized fluid from the master cylinder 10. During an anti-lock pressure control operation, however, the P valve 36 receives the pressurized fluid delivered from a pump 38. In the former case, the input pressure of the P valve 36 is equal to the pressure in the master cylinder 10 (hereinafter referred to as "master cylinder pressure"). In the latter case, the input pressure is equal to the delivery pressure of the pump 38.

Figure 2:
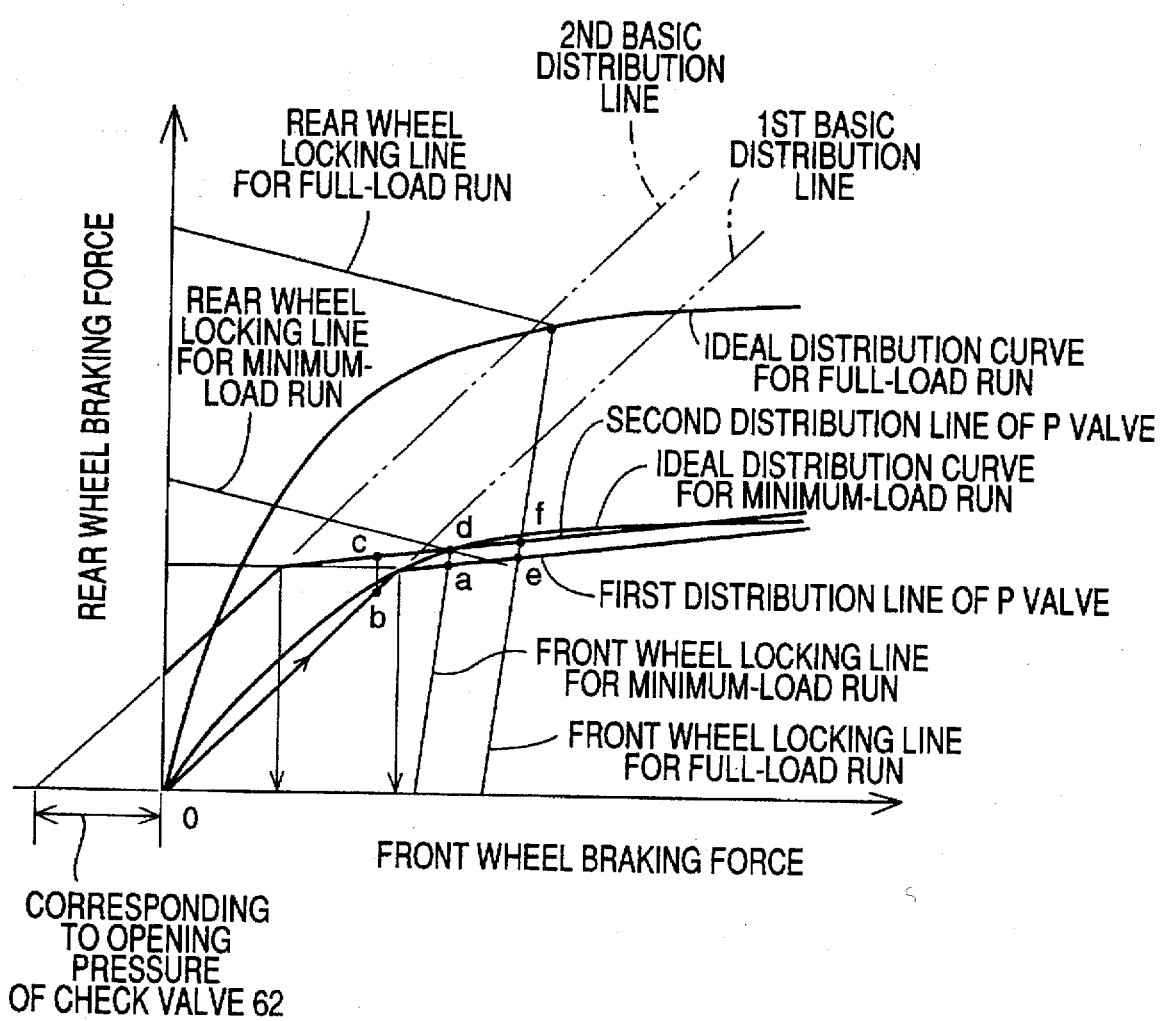
FIG. 2 is a graph explaining a relationship between the braking forces of the front and rear wheels as controlled in the braking system of FIG. 1.

During the normal braking operation, the point of distribution of front and rear braking forces generated by the front and rear wheels 16, 20 moves with an increase in the master cylinder pressure, along a first basic distribution line as indicated by two-dot chain line in the graph of FIG. 2. After the master cylinder pressure exceeds the critical point, the distribution point moves along a first distribution line of the P valve 36 indicated by solid line. The lower portions of the first basic distribution line and the first distribution line of the P valve 36 up to the critical point of the master cylinder pressure coincide with each other. The first distribution line of the P valve 36 is the actual line of distribution of the front and rear braking forces. The first distribution line of the P valve 36 should be distinguished from a second distribution line of the P valve 36 which is applicable when the hydraulic pressure source is the pump 38, which will be described.

As shown in FIG. 1, a normally-open second solenoid-operated shut-off valve in the form of a pressure increasing and reducing valve 40 is disposed in a portion of the rear brake cylinder passage 24 between the P valve 36 and the point of connection of the front and rear brake cylinder passages 22, 24. A pressure reducing passage in the form of a reservoir passage 42 is connected at one end thereof to a portion of the rear brake cylinder passage 24 between the P valve 36 and the pressure increasing and reducing valve 40, and at the other end to a reservoir 44. A normally-closed third solenoid-operated shut-off valve in the form of a pressure reducing valve 46 is provided in the reservoir passage 42.

A pressure increasing passage in the form of an pump passage 48 is connected at one end thereof to the reservoir 44 and at the other end to the rear brake cylinder passage 24. The pump 38 indicated above is provided in the pump passage 48, for pressurizing the brake fluid pumped up from the reservoir 44 and delivering the pressurized fluid to the front and rear wheel brake cylinders 16, 20. The pump 38 is driven by a motor 52. The delivery or output port of the pump 38 is connected to a portion of the rear brake cylinder passage 24 between the pressure increasing and reducing valve 40 and the point of connection to the front brake cylinder passage 22.

The pump 38 is of a plunger type driven by the motor 52 such that the delivery of the pump 38 increases substantially in proportion to the rotating speed of the motor 52. Accordingly, the delivery of the pump 38 can be estimated on the basis of the rotating speed of the motor 52.

A return passage 54 is connected at one end thereof to a portion of the rear brake cylinder passage 24 between the P valve 36 and the pressure increasing and reducing valve 40, and at the other end to a portion of the front brake cylinder passage 22 between the master cylinder 10 and the cut-off valve 30. A check valve 56 is provided in the return passage 54. This check valve 56 inhibits a flow of the working fluid in a direction from the master cylinder 10 toward the rear wheel brake cylinder 20, and permits a flow of the brake fluid in the reverse direction with the valve opening pressure difference being substantially zero. Like the by-pass return passage 32 and check valve 34, the return passage 54 and check valve 56 are provided to rapidly return the fluid from the rear wheel brake cylinder 20 to the master cylinder 10.

A pressure reducing valve device 60 is disposed in a portion of the rear brake cylinder passage 24 between the point of connection of the rear brake cylinder passage 24 and the pump passage 48 and the point of connection of the front and rear brake cylinder passages 22, 24. This pressure reducing valve device 60 includes a first check valve 62 whose opening pressure difference is not substantially zero, and a second check valve 64 whose opening pressure difference is substantially zero. The first and second check valves 62, 64 are disposed in parallel with each other and have opposite directions in which the brake fluid is permitted to flow. The first check valve 62 is so oriented as to inhibit a flow of the fluid in a direction from the front wheel brake cylinder 16 toward the pressure increasing and reducing valve 40, and permits a flow of the fluid in the reverse direction when the pressure of the fluid delivered from the pump 38 is higher than the pressure in the front wheel brake cylinder 16 by more than a preset or predetermined opening pressure difference of the check valve 62. Like the return passage 32 and check valve 34, the second check valve 64 is provided to rapidly return the fluid from the rear wheel brake cylinder 20 toward the master cylinder 10.

Figure 3:
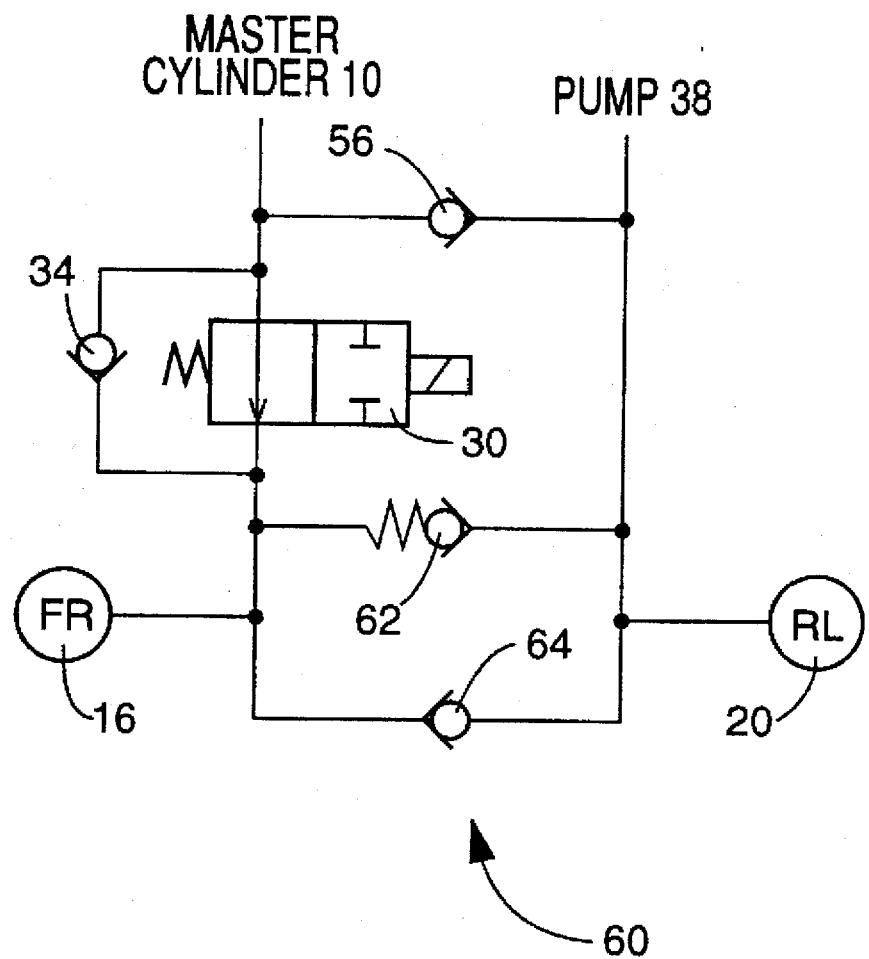
FIG. 3 is a hydraulic circuit diagram schematically showing flows of a brake fluid to and from a master cylinder, a pump and front and rear wheel brake cylinders in the braking system of FIG. 1.

Referring next to FIG. 3, there will be described flows of the brake fluid to and from the master cylinder 10, pump 38 and front and rear wheel brake cylinders 26, 20.

During a normal operation of the present braking system upon depression of the brake pedal 12 without an operation of the pump 38, the working fluid pressurized by the master cylinder 10 is supplied to the front wheel brake cylinder 16 through the first shut-off valve or cut-off valve 30, and to the rear wheel brake cylinder 20 through the cut-off valve 30 and the second check valve 64 of the pressure reducing valve device 60. Since the opening pressure difference of the second check valve 64 is substantially zero, almost the same braking pressures are applied to the front and rear wheel brake cylinders 16, 20.

When the depressed brake pedal 12 is released, the fluid in the front wheel brake cylinder 16 is returned to the master cylinder 10 through the check valve 34, while the fluid in the rear wheel brake cylinder 20 is returned to the master cylinder 10 through the check valve 56.

When an anti-lock pressure control operation is initiated, the pump 38 is operated. When the cut-off valve 30 is closed, the fluid delivered from the pump 38 is supplied to the rear wheel brake cylinder 20 without flowing through the first check valve 62, and is supplied to the front wheel brake cylinder 16 through the first check valve 62. Since the opening pressure difference of the first check valve 62 is not substantially zero, the braking pressure in the front wheel brake cylinder 16 is made lower than that in the rear wheel brake cylinder 20 by an amount corresponding to the preset opening pressure difference of the first check valve 62.

Thus, the master cylinder 10 serves as the hydraulic pressure source during the normal operation of the braking system without an operation of the pump 38, and substantially the same braking pressures are applied to the front and rear wheel brake cylinders 16, 20, whereby substantially same braking forces act on the front and rear wheels 14, 18. During the anti-lock pressure control operation, on the other hand, the pump 38 serves as the hydraulic pressure source source, and the braking pressures to be applied to the front and rear wheel brake cylinders 16, 20 are regulated such that the braking pressure in the front wheel brake cylinder 16 is lower than that in the rear wheel brake cylinder 20 by an amount corresponding to the predetermined opening pressure difference of the first check valve 62, whereby the braking force acting on the rear wheel 18 is accordingly larger than that acting on the front wheel 14. A second basic distribution line indicated by two-dot chain line in FIG. 2 represents the distribution of the front and rear braking forces when the pump 38 serves as the hydraulic pressure source.

The mechanical components of the braking system described above, which are within a broken-line block in FIG. 1, constitute a unit installed on a front part of the motor vehicle. As a result, the portion of the secondary fluid passage or rear brake cylinder passage 24 which is between the pressure increasing and reducing valve 40 within the unit and the P valve 36 outside the unit is comparatively long and has a comparatively large resistance to the flows of the fluid therethrough. Accordingly, the fluid discharged from the front wheel brake cylinder 16 during the anti-lock pressure control operation is unlikely to be introduced into the rear wheel brake cylinder 20 through the rear brake cylinder passage 24.

The present braking system is controlled by the controller 70 indicated above. The controller is principally constituted by a computer and A/D converters. The computer incorporates a central processing unit (CPU), a read-only memory (ROM), a random-access memory (RAM) and a bus. The controller 70 has an input interface adapted to receive output signals of wheel speed sensors 72, 74 for detecting the rotating speeds of the front right wheel 14 and rear left wheel 18, respectively, wheel speed sensors for detecting the rotating speeds of the front left wheel and rear right wheel (not shown), and an ammeter 76 for detecting an electric current flowing through the motor 52. The controller 70 also has an output interface to which there are connected through respective drivers (not shown) the solenoid coils of the first, second and third shut-off valves 30, 40, 46 and the motor 52.

Figure 4:
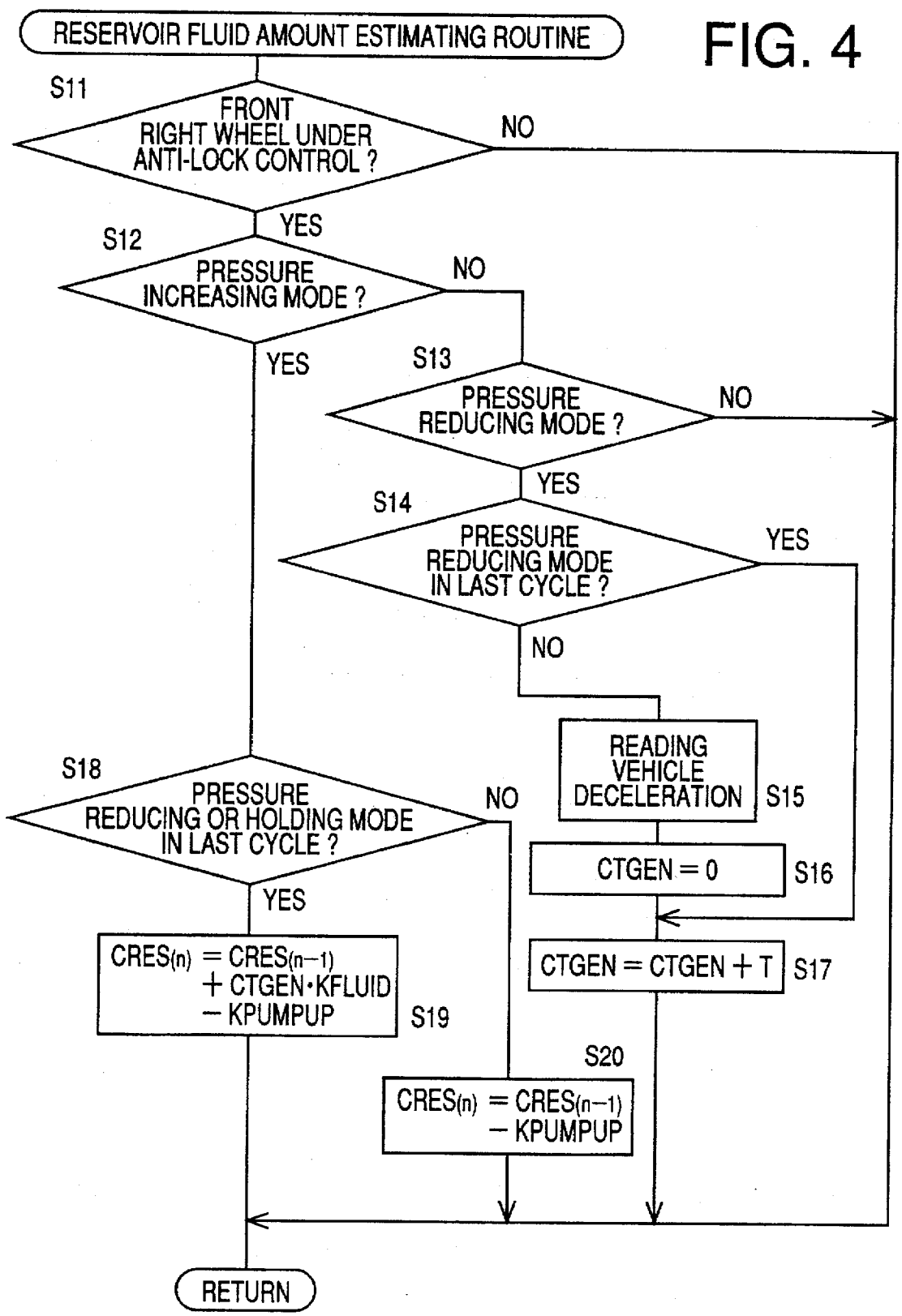
FIG. 4 is a flow chart illustrating a routine for estimating an amount of a working fluid in a reservoir of the braking system of FIG. 1, according to a control program stored in a read-only memory of a controller of the braking system.
Figure 5:
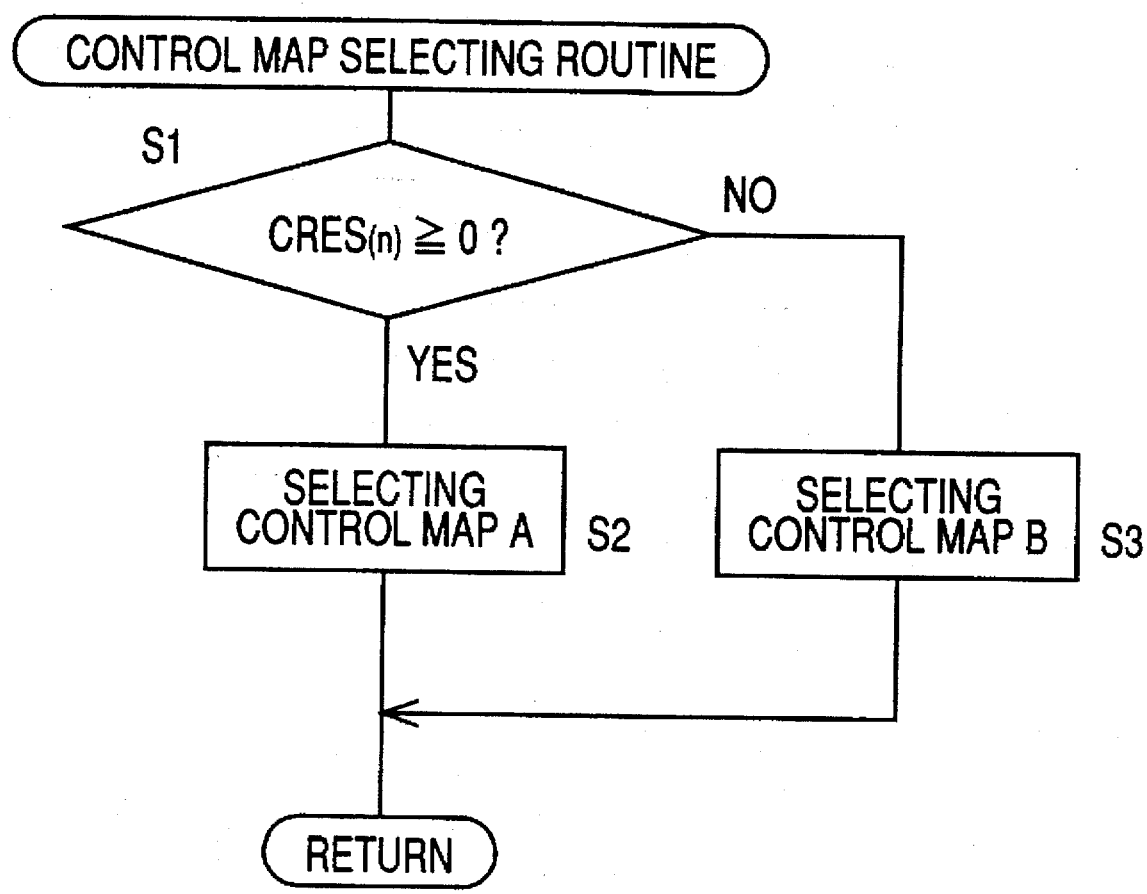
FIG. 5 is a flow chart illustrating a routine for selecting a control map for controlling fluid pressures in wheel brake cylinders of the braking system, according to a control program also stored in the read-only memory.

The ROM of the controller 70 stores various control programs including: a control program for executing a routine for estimating an amount of the fluid stored in the reservoir 44, as illustrated in the flow chart of FIG. 4; a control program for executing a routine for selecting a control map as illustrated in the flow chart of FIG. 5; and control programs for executing a routine for estimating a running speed of the vehicle, a routine for controlling an anti-lock pressure control operation, and a routine for estimating an amount of the fluid which has been pumped up by the pump 38. The ROM also stores various data maps such as a control map A, a control map B, and data map for determining a coefficient KFLUID.

The controller 70 operates to estimate the vehicle running speed according to the vehicle speed estimating routine and on the basis of the output signals of the wheel speed sensors 72, 74, and obtains the vehicle deceleration by dividing the estimated vehicle running speed. Further, the controller 70 operates to obtain the slip ratios of the wheels 14, 18, etc. on the basis of the output signals of the wheel speed sensors 72, 74 and the estimated vehicle running speed.

In the anti-lock pressure control routine, the controller 70 selects one of the seven pressure control modes indicated in TABLE 1, according to the control map A shown in TABLE 2 or control map B shown in TABLE 3, on the basis of the estimated vehicle running speed, the obtained vehicle deceleration and the obtained slip ratios of the wheels, so that the solenoid coils of the shut-off valves 30, 40, 46 and the pump motor 52 are controlled through the drivers, in the selected pressure control mode. The motor 52 is activated upon initiation of an anti-lock pressure control operation, and is held on throughout the anti-lock pressure control operation. The motor 52 is held on for a suitable time even after the termination of the anti-lock pressure control operation, so that the fluid stored in the reservoir 44 is entirely returned to the master cylinder 10. Therefore, no fluid is stored in the reservoir 44 upon initiation of an anti-lock pressure control operation.

In the present embodiment, one of the control maps A and B of TABLES 2 and 3 is selected according to the control map selecting routine illustrated in the flow chart of FIG. 5. This control map selecting routine is initiated when the reservoir fluid amount has been estimated by the estimating routine of FIG. 4, so that the control map A or B is selected depending upon the estimated reservoir fluid amount. The control map selecting routine of FIG. 5 is initiated with step S1 to determine whether a reservoir fluid amount CRES(n) which has been estimated is equal to zero or larger than zero. If an affirmative decision (YES) is obtained in step S1, the control flow goes to step S2 to select the control map A. If the estimated reservoir fluid amount CRES(n) is a negative value, a negative decision (NO) is obtained in step S1. In this case, the control flow goes to step S3 to select the control map B. In other words, the control map A is selected if the fluid is stored in the reservoir 44, and the control map B is selected when the fluid is not stored in the reservoir 44.

It is noted that the estimated reservoir fluid amount CRES(n) is cleared upon initialization of the controller 70 which takes place when the ignition switch of the vehicle is turned on. The estimated reservoir fluid amount CRES(n) is also cleared upon termination of each anti-lock pressure control operation of the braking system. Consequently, the estimated amount CRES(n) is zero upon initiation of each anti-lock pressure control operation. The routine to obtain the estimated reservoir fluid amount CRES(n) will be described later.

There will be described an anti-lock pressure control operation according to the control map A indicated in TABLE 2.

In TABLE 2, the symbols "↑", "↑sl", "↓" and "→" in the parentheses indicate a normally increasing state, a slowly increasing state, a decreasing state and a constant state of the fluid pressures in the front and rear wheel brake cylinders 16, 20, respectively. The symbol before "/" indicate the pressure changing state of the front wheel brake cylinder 16, while the symbol after "/" indicates the pressure changing state of the rear wheel brake cylinder 20.

An anti-lock pressure control operation may be initiated for the front right wheel 14 before initiation of

TABLE 2

CONTROL MAP A
Selected when the fluid is stored in the reservoir 44

| Front Wheel Brake Cylinder 16 | Rear Wheel Brake Cylinder 20 | | | |
|---|---|---|---|---|
| | No Control | Slip Increasing | Slip Decreasing | Slip Removed |
| No Control | 1st Mode (↑/↑) | 3rd Mode (↑/↓) | 2nd Mode (↑/→) | Alternate 1st and 2nd modes(↑/↑sl) |
| Slip Incr. | 7th Mode (↓/↓) | 7th Mode (↓/↓) | 7th Mode (↓/↓) | 7th Mode (↓/↓) |
| Slip Decr. | 4th Mode (→/↑) | Alternate 6th and 7th Modes (→/↓) | Alternate 5th and 7th Modes (→/→) | 4th Mode (→/↑) |
| Slip Removed | Alternate 4th and 5th Modes (↑sl/↑sl) | 6th Mode (↑/↓) | 5th Mode (↑/→) | Alternate 4th and 5th Modes (↑sl/↑sl) | an anti-lock pressure control operation for the rear left wheel 18, or vice versa, or alternatively initiated concurrently for the front right and rear left wheels 14, 18, depending upon the road surface condition and the braking forces currently acting on these wheels 14, 18. For easier explanation, there will first be described the anti-lock pressure control operation in the case where it is initiated for the rear left wheel 18.

When the rear left wheel 18 has an excessive slipping or locking tendency before the front right wheel 14, the third pressure control mode is selected, and the cut-off valve 30 and the pressure reducing valve 46 are opened while the pressure increasing and reducing valve 40 is closed. As a result, the fluid is discharged from only the rear wheel brake cylinder 20 and stored in the reservoir 44. Since the cut-off valve 30 is open, the fluid pressurized by the master cylinder 10 is supplied to the front wheel brake cylinder 16. Thus, the fluid pressure in the rear wheel brake cylinder 20 is reduced while the fluid pressure in the front wheel brake cylinder 16 is increased. That is, a pressure reducing mode is established for the rear wheel brake cylinder 20, while a pressure increasing mode is established for the front wheel brake cylinder 16.

When the slipping tendency of the rear left wheel 18 is in the process of decreasing, the second pressure control mode is selected, and the pressure increasing and reducing valve 40 and the pressure reducing valve 40 are both closed while the cut-off valve 40 is held open. Accordingly, the fluid pressure in the front wheel brake cylinder 16 is increased while the fluid pressure in the rear wheel brake cylinder 20 is maintained.

When the slipping tendency of the rear left wheel 18 has been removed, the first and second pressure control modes are alternately established. In this condition, the pressure increasing and reducing valve 40 is alternately placed in the open and closed states, while the cut-off valve 30 and the pressure reducing valve 46 are held open and closed, respectively. As a result, the pressure in the rear wheel brake cylinder 20 is alternately increased and held, whereby the pressure is slowly increased. In this embodiment, this slowing increasing mode by the alternate establishment of the first and second modes is considered as a pressure increasing mode.

If the slipping or locking tendency of the front right wheel 14 becomes excessive during the anti-lock pressure control operation for the rear left wheel 18 only, an anti-lock pressure control operation is initiated also for the front right wheel 14. In this instance, one of the fourth pressure control mode through the seventh pressure control mode is suitably selected.

As indicated above, the first, second and third pressure control modes are selectively established and the cut-off valve 30 is held open, when the anti-lock pressure control operation is effected for the rear left wheel 18 only. When the anti-lock pressure control operation is effected for the front right wheel 14 only or for both of the front and rear wheels 14, 18, the braking system is controlled in principle so as to selectively establish the fourth through seventh pressure control modes, with the cut-off valve 30 being closed. Although the cut-off valve 30 may be opened and closed in these cases, this undesirably causes a kick-back phenomenon of the brake pedal 12, and is likely to cause a large variation in the wheel brake cylinder pressure. In this respect, it is desirable to hold the cut-off valve 30 when the pressure in the front wheel brake cylinder 16 is controlled in the anti-lock fashion.

For example, an anti-lock pressure control operation is initiated for the rear left wheel 18 before initiation of an anti-lock pressure control operation for the front right wheel 14, if the front wheel 14 lies on an area of an uneven friction-coefficient road surface which area has a relatively high friction coefficient while the rear wheel 18 lies on an area of the road surface which has a relatively low friction coefficient. In this case, it is preferable to maximize the pressure in the front wheel brake cylinder 16 while preventing the locking of the front wheel 16, so that the relatively high friction coefficient of the road surface area is utilized by the front wheel 14 to reduce the required braking distance of the vehicle. In the light of this fact, the present embodiment is adapted such that when an anti-lock pressure control operation is performed for the rear left wheel 18 only, the first, second and third pressure control modes are selectively established to hold the cut-off valve open, for permitting the front wheel brake cylinder 16 to be supplied with the pressurized fluid from the master cylinder 10.

There will next be described an anti-lock pressure control operation where it is initiated for the front right wheel 14 before the rear left wheel 18.

When the front right wheel 14 has an excessive slipping or locking tendency, the seventh pressure control mode is selected, and the cut-off valve 30 is closed while the pressure increasing and reducing valve 40 and the pressure reducing vale 46 are both opened, so that the front and rear wheel brake cylinders 16, 20 are communicated with the reservoir 44. As a result, the fluid discharged from the front wheel brake cylinder 16 is introduced into the reservoir 44 through the second check valve 64 of the pressure reducing valve device 60 and the valves 40, 46. At the same time, the fluid charged from the rear wheel brake cylinder 20 is introduced into the reservoir 44 through the pressure reducing valve 46.

In the present braking system, the seven pressure control modes available do not include a mode for reducing only the pressure in the front wheel brake cylinder 16, as is apparent from TABLE 1. Therefore, the seventh pressure control mode is selected to reduce the pressures in both of the front and rear wheel brake cylinders 16, 20. That is, the pressure in the rear wheel brake cylinder 20 is also reduced, irrespective of the slipping condition of the rear wheel 18. Thus, a pressure reducing mode is established for both of the front and rear wheel brake cylinders 16, 20.

However, since the portion of the secondary fluid passage or rear brake cylinder passage 24 between the pressure increasing and reducing valve 46 and the P valve 36 is relatively long and has a relatively large fluid flow resistance, the fluid is less likely to be discharged from the rear wheel brake cylinder 20, so that the fluid is rapidly discharged from the front wheel brake cylinder 16.

When the slipping tendency of the front right wheel 14 turns to be decreasing by reducing the pressure into the front wheel brake cylinder 16 in the seventh pressure control mode, the fourth pressure control mode is established to open the pressure increasing and reducing valve 40 and close the pressure reducing valve 46. As a result, the front and rear wheel brake cylinders 16, 20 are disconnected from the reservoir 44, and are communicated with the delivery port of the pump 38. At this point of time, some amount of the fluid is stored in the reservoir 44, and the fluid is pumped up from the reservoir 44 and pressurized by the pump 38. The pressurized fluid is delivered from the pump 38 to the rear wheel brake cylinder 20 through the pressure increasing and reducing valve 40 and the P valve 36, whereby the pressure in the rear wheel brake cylinder 20 is increased. The pressurized fluid delivered from the pump 38 is supplied to the front wheel brake cylinder 16 through the first check valve 62 of the pressure reducing valve device 60, only after the pressure difference between the delivery pressure of the pump 38 and the pressure in the front wheel brake cylinder 16 reaches the predetermined opening pressure of the first check valve 62. Up to this point of time, the pressure in the front wheel brake cylinder 16 is held constant, while the pressure in the rear wheel brake cylinder 20 is increased. Thus, a pressure holding mode is established for the front wheel brake cylinder 16 while a pressure increasing mode is established for the rear wheel brake cylinder 20.

In the fourth pressure control mode established following the seventh pressure control mode, the fluid pressurized by the pump 38 is supplied to the rear wheel brake cylinder 20, to rapidly increase the pressure in the rear wheel brake cylinder 20 which has been unnecessarily reduced in the seventh pressure control mode.

The fluid pressurized by the pump 38 is supplied to the front wheel brake cylinder 16 through the first check valve 62 if the fourth pressure control mode is established for a comparatively long time, or if the fluid pressure in the rear wheel brake cylinder 20 at the time the fourth pressure control mode is established is not so low. In this case, therefore, the pressure in the front wheel brake cylinder 16 may be considered to be normally increased or slowly increased. In the present embodiment, however, the fourth pressure control mode is selected for the purpose of maintaining the pressure in the front wheel brake cylinder 16. In this sense, the fourth pressure control mode may be considered as a pressure holding mode for the front wheel brake cylinder 16.

When the slipping tendency of the front right wheel 14 has been removed, the fourth and fifth pressure control modes are alternately established. That is, the pressure increasing and reducing valve 40 is alternately opened and closed while the pressure reducing valve 46 is held closed. When the pressure increasing and reducing valve 40 is in the closed state, the front and rear wheel brake cylinders 16, 20 are both disconnected from the reservoir 44, while the delivery port of the pump 38 is communicated with the front wheel brake cylinder 16. The fluid delivered from the pump 28 is not supplied to the rear wheel brake cylinder 20, but is supplied to only the front wheel brake cylinder 16. When the valve 40 is in the open state, the fluid pressurized by the pump 38 is supplied primarily to the rear wheel brake cylinder 20.

With the fourth and fifth pressure control modes alternately established, the pressure in the front wheel brake cylinder 16 is alternately held and increased, and is slowly increased. On the other hand, the pressure in the rear wheel brake cylinder 20 is alternately increased and held while the pressure in the rear wheel brake cylinder 20 is alternately held and increased, respectively, whereby the pressure in the front wheel brake cylinder 16 is also slowly increased.

Thus, the seventh, fourth and fifth pressure control modes are selectively established depending upon the slip ratio of the front right wheel 14, when the anti-lock pressure control operation is effected for only the front right wheel 14. In the seventh pressure control mode, the pressures in the front and rear wheel brake cylinders 16, 20 are both currently reduced, as described above. Therefore, if the anti-lock pressure control operation is initiated first for the front right wheel 14, the anti-lock pressure control operation tends to be unlikely to be initiated for the rear left wheel 18, since the pressure in the rear wheel brake cylinder 20 has been reduced in the seventh pressure control mode and the rear wheel 18 is less likely to have an excessive slipping tendency.

In the case where the fourth pressure control mode is established following the seventh pressure control mode, and the fourth and fifth pressure control modes are then alternately established, the pressure in the rear wheel brake cylinder 20 is increased, and the rear wheel 18 may possibly have an excessive slipping tendency. In this case, an anti-lock pressure control operation is initiated also for the rear left wheel 18.

The above case is an example of the cases where the anti-lock pressure control operation is initiated for the rear left wheel 18 during the anti-lock pressure control operation for the front right wheel 14. However, the anti-lock pressure control operation may be initiated for the rear left wheel 18 during the anti-lock pressure control operation for the front right wheel 14, in other situations depending upon the road surface condition, for example.

In rare cases, the anti-lock pressure control operations are initiated simultaneously for the front and rear wheels 14, 18.

There will be described the anti-lock pressure control operations performed simultaneously for the front right and rear left wheels 14, 18. It is noted that the seventh pressure control mode is established to reduce the fluid pressures in both of the front and rear wheel brake cylinders 16, 20, as described above, if at least the front right wheel 14 has an excessive slipping tendency, namely, if both of the front right and rear left wheels 14, 18 have excessive slipping tendencies or if only the front right wheel 14 has an excessive slipping tendency.

If the slipping tendency of the front right wheel 14 is decreasing while the slipping tendency of the rear left wheel 18 is still excessive, the sixth and seventh pressure control modes are alternately established. In the sixth pressure control mode, the pressure increasing and reducing valve 40 is closed while the pressure reducing valve 46 is opened, so that only the rear wheel brake cylinder 20 is communicated with the reservoir 44, to reduce the pressure in this cylinder 20. The fluid delivered from the pump 38 is supplied to the front wheel brake cylinder 16 through the first check valve 62 of the pressure reducing valve device 60. When the seventh pressure control mode is established, the front and rear wheel brake cylinders 16, 20 are both communicated with the reservoir 44, as described above. Thus, by alternately establishing the sixth and seventh pressure control modes, the pressure in the front wheel brake cylinder 16 is alternately increased and reduced, and is consequently held constant. On the other hand, the pressure in the rear wheel brake cylinder 20 is reduced. Thus, a pressure holding mode is established for the front wheel brake cylinder 16 while a pressure reducing mode is established for the rear wheel brake cylinder 20.

If the slipping tendency of the front right wheel 14 has been removed while the slipping tendency of the rear left wheel 18 is still excessive, the sixth pressure control mode is established to reduce the pressure in the rear wheel brake cylinder 20 and increase the pressure in the front wheel brake cylinder 16. Thus, a pressure increasing mode is established for the front wheel brake cylinder 16 while a pressure reducing mode is established for the rear wheel brake cylinder 20.

If the slipping tendencies of the front and rear wheels 14, 18 are both in the processing of decreasing, the fifth and sixth pressure control modes are alternately established to alternately open and close both of the pressure increasing and reducing valve 40 and the pressure reducing valve 46. As a result, the pressure in the front wheel brake cylinder 16 is alternately increased and reduced, while the pressure in the rear wheel brake cylinder 20 is alternately held and reduced. The valves 40, 46 are alternately opened and closed for the purpose of holding the pressure in the front wheel brake cylinder 16. IN this case, therefore, the pressure in the rear wheel brake cylinder 20 is slowly reduced.

If the slipping tendency of the front right wheel 14 has been removed while the slipping tendency of the rear left wheel 18 is in the process of decreasing, the fifth pressure control mode is established to close both of the valves 40, 46. As a result, the pressure in the front wheel brake cylinder 16 is increased while the pressure in the rear wheel brake cylinder 20 is held. Thus, a pressure increasing mode and a pressure holding mode are established for the front and rear wheel brake cylinders 16, 20, respectively.

If the slipping tendency of the front right wheel 14 is in the process of decreasing while the slipping tendency of the rear left wheel 18 has been removed, the fourth pressure control mode is established. If the slipping tendencies of the front and rear wheels 14, 18 have been removed, the fourth and fifth pressure control modes are alternately established.

During an anti-lock pressure control operation, the pump 38 is held on. If the amount of the fluid delivered by the pump 38 becomes excessive, the fluid is returned to the master cylinder 10 through the by-pass return passage 32. In other words, the pressure in the front wheel brake cylinder 16 cannot be made higher than the pressure in the master cylinder 10. Thus, the check valve 34 also functions as a pressure relief valve.

It is noted that since the cut-off valve 30 is held closed throughout an anti-lock pressure control operation or operations (for only the front right wheel 14 or for both of the front right and rear left wheels 14, 18) according to the control map A of TABLE 2, the reservoir 44 may be empty during the anti-lock pressure control operation or operations. If this event, the pressurized fluid cannot be supplied to the front and rear wheel brake cylinders 16, 20, and the pressures in these cylinders 16, 20 cannot be increased. In the light of this fact, the present braking system is adapted to estimate the amount of the fluid stored in the reservoir 44, and to effect the anti-lock pressure control operations according to the control map B indicated in TABLE 3.

TABLE 3

CONTROL MAP B
Selected when the reservoir 44 is substantially empty

| Front Wheel Brake Cylinder 16 | Rear Wheel Brake Cylinder 20 | | | |
|---|---|---|---|---|
| | No Control | Slip Increasing | Slip Decreasing | Slip Removed |
| No Control | 1st Mode | 3rd Mode | 2nd Mode | Alternate 1st and 2nd |
| Slip Incr. | 7th Mode | 7th Mode | 7th Mode | 7th Mode |
| Slip Decr. | 4th Mode | Alternate 6th and 7th Modes | Alternate 5th and 7th Modes | 4th Mode |
| Slip | Successive | 3rd and 6th | 2nd and 5th | Successive |

TABLE 3-continued

CONTROL MAP B
Selected when the reservoir 44 is substantially empty

| Front Wheel | Rear Wheel Brake Cylinder 20 | | | |
| --- | --- | --- | --- | --- |
| Brake Cylinder 16 | No Control | Slip Increasing | Slip Decreasing | Slip Removed |
| Removed | 1st, 4th, 2nd and 5th Modes | Modes | Modes | 1st, 4th, 2nd and 5th Modes |

There will be described the anti-lock pressure control operation according to the control map B. The control map B of TABLE 3 is different from the control map A after the slipping tendency of the front right wheel 14 has been removed (after the slipping tendencies of the front and rear wheels 14, 18 have been both removed). In the other cases, the control maps A and B are identical with each other.

The control map B is formulated in view of a fact that the reservoir 44 does not become substantially empty, except in the case where the slipping tendency of the front right wheel 14 has been removed.

If an anti-lock pressure control operation is not performed for the front right wheel 14, the first, second and third pressure control modes are selectively established depending upon the slipping condition of the rear left wheel 18. In these cases, the cut-off valve 30 is held open, and the reservoir 44 will not become empty. If the front right wheel 14 has an excessive slipping tendency, the pressure in the front wheel brake cylinder 16 is reduced, and the amount of the fluid in the reservoir 44 is increased.

If the slipping tendency of the front right wheel 14 is in the process of decreasing, on the other hand, the fourth through seventh pressure control modes are selectively established, and the pressures in the front wheel brake cylinder 16 are increased in some conditions. However, the pressure in the front wheel brake cylinder 16 is held in the fourth pressure control mode, or alternately increased and decreased by alternate establishment of the sixth and seventh pressure control modes or the fifth and seventh pressure control modes, so that the amount of the fluid in the reservoir 44 will not be reduced to a large extent. The pressure in the rear wheel brake cylinder 20 is alternately held and reduced by alternate establishment of the sixth and seventh pressure control modes or the fifth and seventh pressure control modes, so that the amount of the fluid in the reservoir 44 will be increased. In the fourth pressure control mode, the pressure in the front wheel brake cylinder 16 is maintained while the pressure in the rear wheel brake cylinder 20 is increased, whereby the amount of the fluid in the reservoir 44 will be reduced. However, the fourth pressure control mode necessarily immediately follows the seventh pressure control mode, that is, immediately after the amount of the fluid in the reservoir 44 has been increased. Further, the volume of the rear wheel brake cylinder 20 for the rear wheel 18 is comparatively small, and the amount of the fluid required to suitably increase the pressure in the rear wheel brake cylinder 20 is relatively small. Therefore, the reservoir 44 will not become empty in the fourth pressure control mode.

Therefore, the only opportunity where the reservoir 44 may become substantially empty with the cut-off valve 30 being closed is after the slipping tendency of the front right wheel 14 has been removed. In other words, the reservoir 44 may become substantially empty when the pressure increase mode is established for at least the front wheel brake cylinder 16, namely, for the front wheel brake cylinder 16 or for both of the front and rear wheel brake cylinders 16, 20. In view of this fact, the present braking system is adapted to estimate the amount of the fluid in the reservoir 44 only when the pressure increase mode is established for the front wheel brake cylinder 16.

If the slipping tendency of the front right wheel 14 has been removed while an anti-lock pressure control operation is performed for only the front right wheel 14, the fourth and fifth pressure control modes are alternately established according to the control map A described above. According to the control map B, however, the first, fourth, second and fifth pressure control modes are successively established repeatedly. That is, the cut-off valve 30 and the pressure increasing and reducing valve 40 are both alternately opened and closed while the pressure reducing valve 40 is held closed. When the cut-off valve 30 is open, the fluid pressurized by the master cylinder 10 is supplied to the front and rear wheel brake cylinders 16, 20, so that the reservoir 44 is prevented from becoming empty.

If the slipping tendency of the front right wheel 14 has been decreased while the slipping tendency of the rear left wheel 18 is still excessive during anti-lock pressure control operations for both of the front and rear wheels 14, 18, the third and sixth pressure control modes are alternately established. In this case, the cut-off valve is alternately opened and closed while the pressure increasing and reducing valve 40 and the pressure reducing valve 46 are held open. When the cut-off valve 30 is open, the fluid is supplied from the master cylinder 10 to the front wheel brake cylinder 16.

If the slipping tendency of the front right wheel 14 has been removed while the slipping tendency of the rear left wheel 18 is in the process of decreasing, the fifth and second pressure control modes are alternately established. In this instance, the cut-off valve 30 is alternately opened and closed while the pressure increasing and reducing valve 40 and the pressure reducing valve 46 are both held closed. Consequently, the fluid is supplied from the master cylinder 10 to the front wheel brake cylinder 16.

If the slipping tendencies of the front and rear wheels 14, 18 have both been removed, the control is the same as in the above-described case where the slipping tendency of the front right wheel 14 has been removed while an anti-lock pressure control operation is performed for only the front right wheel 14.

Referring to the graph of FIG. 2, there will be explained a relationship between the front and rear braking forces which act on the front and rear wheels during brake application to the vehicle.

During normal braking of the vehicle, the master cylinder 10 functions as the hydraulic pressure source, as described above. The first, second and third shut-off valves 30, 40, 46 are normally placed in the original positions or states of FIG. 1. Upon depression of the brake pedal 12, in this condition, the fluid pressurized by the master cylinder 10 is supplied to the front and rear wheel brake cylinders 16, 20. As the depressing force acting on the brake pedal 10 increases, a point of distribution of the front and rear wheel braking forces is moved from the origin "0" along the first distribution line of the P valve 36. When the front right wheel 14 is about to lock during running of the vehicle with a light load, for example, in an unloaded state (without a passenger or passengers except the driver, or a cargo), the distribution point of the front and rear wheel braking forces is located at intersection point "a" between the first distribution line of the P valve 36 and a front wheel locking line for minimumload run of the vehicle, as indicated in FIG. 2. If the brake pedal 12 is further depressed in this condition, the pressure in the front wheel brake cylinder 16 is increased, and the slipping tendency of the front right wheel 14 becomes excessive. As a result, an anti-lock pressure control operation is initiated for the front wheel 14. That is, the seventh pressure control mode is established, to reduce the pressures in the front and rear wheel brake cylinders 16, 20, whereby the distribution point of the front and rear wheel braking forces is moved to the left from the intersection point "a" to a point "b" on the first distribution line of the P valve 36.

The slipping tendency of the front right wheel 14 subsequently turns to be decreasing, and the fourth pressure control mode is established, so that the distribution point of the front and rear wheel braking forces is moved up to a point "c" indicated in FIG. 2.

With the pressure increasing and reducing valve 40 and the pressure reducing valve 46 being opened and closed, respectively, in the fourth pressure control mode, the fluid in the reservoir 44 is pumped up and pressurized by the pump 38, and is delivered to the rear wheel brake cylinder 20. However, the pressurized fluid delivered from the pump 38 is not supplied to the front wheel brake cylinder 16 until the first check valve 62 of the pressure reducing valve device 60 has been opened. That is, only the pressure in the rear wheel brake cylinder 20 is increased while the pressure in the front wheel brake cylinder 16 is held constant.

The point "c" is located on a second distribution line of the P valve 36, which is translated to the left from the first distribution line by an amount corresponding to the opening pressure of the first check valve 62.

The second distribution line of the P valve 36 has a lower portion which coincides with the corresponding lower portion of a second basic distribution line indicated by two-dot chain line in FIG. 2. The second distribution line of the P valve 36 is bent at a critical point with respect to the second basic distribution line. The second basic distribution line is translated from the first basic distribution line by an amount corresponding to the opening pressure of the first check valve 62, in the direction that causes the front wheel braking force to be reduced. When the pump 38 is the hydraulic power source, the P valve 36 receives the pressurized fluid which is not supplied from the master cylinder 10 but is delivered from the pump 38. Therefore, like the second basic distribution line, the second distribution line of the P valve 36 is translated from the first distribution line of the same. The point at which the second distribution line of the P valve 36 is bent corresponds to the critical input pressure level of the P valve 36, namely, the pressure in the front wheel brake cylinder 16 which pressure is determined by the delivery pressure of the pump 38. The critical delivery pressure of the pump 38 corresponding to the critical input pressure level of the P valve 36 is the same as the critical pressure in the master cylinder 10 where the master cylinder 10 is the hydraulic pressure source.

The distribution point of the front and rear wheel braking forces is moved from the point "c" along the second distribution line of the P valve 36 to a point "d" of intersection with a rear wheel locking line for full-load run of the vehicle indicated in FIG. 2. Then, the anti-lock pressure control operation is performed so as to control the slip ratio of the rear left wheel 18 at a substantially optimum value.

When the vehicle is running in a loaded state, for example, in a full load state, depression of the brake pedal 12 causes the distribution point of the front and rear wheel braking forces to move along the first distribution line of the P valve 36. When the front right wheel 14 is about to lock, the distribution point is located at a point "e". Further depression of the brake pedal 12 in this condition initiates an anti-lock pressure control operation in the seventh pressure control mode, in which the distribution point is moved to the left as in the case described above.

If the slipping tendency of the front wheel 14 turns to be decreasing, and the fourth pressure control mode is established, the distribution point is moved up from the point on the first distribution line of the P valve 36 to a point on the second distribution line of the P valve 36, and is further moved to the right along the second distribution line. Subsequently, the distribution point is moved to an intersection point "f" between the second distribution line of the P valve 36 and a front wheel locking line for full-load run of the vehicle. Then, the anti-lock pressure control operation is performed so as to control the slip ratio of the front right wheel 14 at a substantially optimum value.

In the present braking system wherein the pressurized fluid delivered from the pump 38 is supplied to the front wheel brake cylinder 16 through the pressure reducing valve device 60, it is possible to rapidly increase the rear wheel braking force at a comparatively early point of time in the anti-lock pressure control operation. Further, an increase in the rear wheel braking force relative to the front wheel braking force can be achieved in such a manner effective to prevent locking of the rear wheel 18 with higher stability than in the conventional braking system. In addition, since the distribution point of the front and rear wheel braking forces can be moved along the second distribution line of the P valve 36 during an anti-lock pressure control operation, the actual distribution curve of the front and rear wheel braking forces can be made closer to an ideal distribution curve for full-load run of the vehicle indicated in FIG. 2.

There will next be described the routine for estimating the amount of the fluid stored in the reservoir 44.

The reservoir fluid amount is estimated on the basis of an estimated cumulative amount of the fluid which has been introduced into the reservoir 44, and an estimated cumulative amount of the fluid which has been pumped up by the pump 38. The cumulative amount of the fluid which has been introduced into the reservoir 44 (hereinafter referred to as "cumulative fluid flow-in amount") is estimated on the basis of a pressure reducing time during which a pressure reducing mode is established for the front wheel brake cylinder 16, and on the basis of a deceleration value of the vehicle at which the pressure reducing mode is established (at which the fluid in the front wheel brake cylinder 16 beings to be reduced). The cumulative amount of the fluid which has been pumped up (hereinafter referred to as "cumulative fluid flow-out amount") is estimated according to a suitable routine.

The cumulative fluid flow-in amount is estimated on the basis of a product of the pressure reducing time and an amount of the fluid which is discharged from the front and rear wheel brake cylinders 16, 20 into the reservoir 44 per unit time, namely, a rate of flow of the fluid into the reservoir 44.

The pressure reducing time is a period of time during which the pressure reducing mode is established for the front wheel brake cylinder 16, namely, a period of time during which the fluid is discharged from the front and rear wheel brake cylinders 16, 20 into the reservoir 44. In the present embodiment, no pressure control modes are provided for reducing only the pressure in the front wheel brake cylinder 16. If the pressure reducing mode is established for the front wheel brake cylinder 16, the pressure in the rear wheel brake cylinder 20 is controlled in the same pressure reducing mode. The pressure reducing time during which the pressure reducing mode is established for only the rear wheel brake cylinder 20 is not considered in estimating the cumulative fluid flow-in amount, for the following reasons.

Firstly, an anti-lock pressure control operation is generally initiated when the pressure in the master cylinder 10 has been raised to the critical pressure level of the P valve 36 indicated above. At this time, the pressure in the rear wheel brake cylinder 20 is lower than the pressure in the front wheel brake cylinder 16.

The amount of the fluid which is discharged from the front or rear wheel brake cylinder 16, 20 into the reservoir 44 increases with an increase in the pressure difference between the wheel brake cylinder and the reservoir 44. However, the pressure in the reservoir 44 is held substantially constant. Therefore, the amount of the fluid discharged from the rear wheel brake cylinder 20 is smaller than the amount of the fluid discharged from the front wheel brake cylinder 16.

Secondly, the volume of the rear wheel brake cylinder 20 is smaller than that of the front wheel brake cylinder 16.

The amount of the fluid discharged from the front or rear wheel brake cylinder 16, 20 during reduction of the fluid therein is determined by various factors such as the above-indicated pressure difference, volume of the cylinder, and a flow resistance between the wheel brake cylinder and the reservoir 44. Generally, the amount of the fluid discharged from a cylinder having a comparatively small volume is smaller than the amount of the fluid discharged from a cylinder having a comparatively large volume. Therefore, the amount of the fluid discharged from the rear wheel brake cylinder 20 into the reservoir 44 is smaller than that discharged from the front wheel brake cylinder 16 into the reservoir 44.

Another reason for ignoring the pressure reducing time of the rear wheel brake cylinder 20 lies in that a pressure reducing mode is only infrequently established for the rear wheel brake cylinder 20.

As shown in FIG. 2, the intersection points between the first distribution line of the P valve 36 and the front wheel locking lines are spaced from the intersection points between the first distribution line of the P valve 36 and the rear wheel locking lines, in a direction that causes the wheel braking forces to be reduced. Usually, therefore, an anti-lock pressure control operation is initiated for the front wheel before it is initiated for the rear wheel. Thus, an anti-lock pressure control operation is only infrequently initiated first for the rear left wheel 18, that is, in special instances, for example, during running of the vehicle on an uneven friction-coefficient road surface or during turning of the vehicle. Accordingly, the pressure reducing mode is only infrequently selected during an anti-lock pressure control operation for the rear wheel brake cylinder 20.

In the present embodiment, the pressure reducing time is the time during which a pressure reducing mode is established for the front wheel brake cylinder 16, as explained above, and not the time during which the seventh pressure control mode is established for this cylinder 16. This arrangement is based on the fact that the pressure reducing time used for estimating of the cumulative fluid flow-in amount is a continuous time during which the fluid is discharged from the front and rear wheel brake cylinders 16, 20 in one pressure reducing action. When the seventh pressure control mode and the other pressure control mode are alternately established, the time during which the seventh pressure control mode is established is considerably short, and the amount of the fluid discharged from the front and rear wheel brake cylinders 16, 20 during this short time is accordingly small and can be ignored as the pressure reducing time used for the estimation. Further, an estimated cumulative fluid flow-in amount smaller than the actual amount is preferable than an estimated cumulative fluid flow-in amount larger than the actual amount. If the estimated amount is larger than the actual amount, this may result in a failure to supply the fluid from the master cylinder 10 to the reservoir 10 when no fluid is actually present in the reservoir 44. In this event, the pressures in the wheel brake cylinder cannot be increased even when a pressure increasing mode is established, and the required braking distance of the vehicle is undesirably increased. If the estimated amount is smaller than the actual amount, on the other hand, it simply means that the actual amount of the fluid in the reservoir 44 is larger than estimated, and does not have a significantly adverse influence. Ignoring the pressure reducing time during which the seventh pressure control mode is selected during alternate establishment of this mode and the other mode will result in reducing the estimated cumulative fluid flow-in amount as compared with the actual amount, due to the use of a shorter pressure reducing time than the actual pressure reducing time. This is also the reason for ignoring the time during which the pressure reducing mode is established for only the rear wheel brake cylinder 20.

Figure 6:
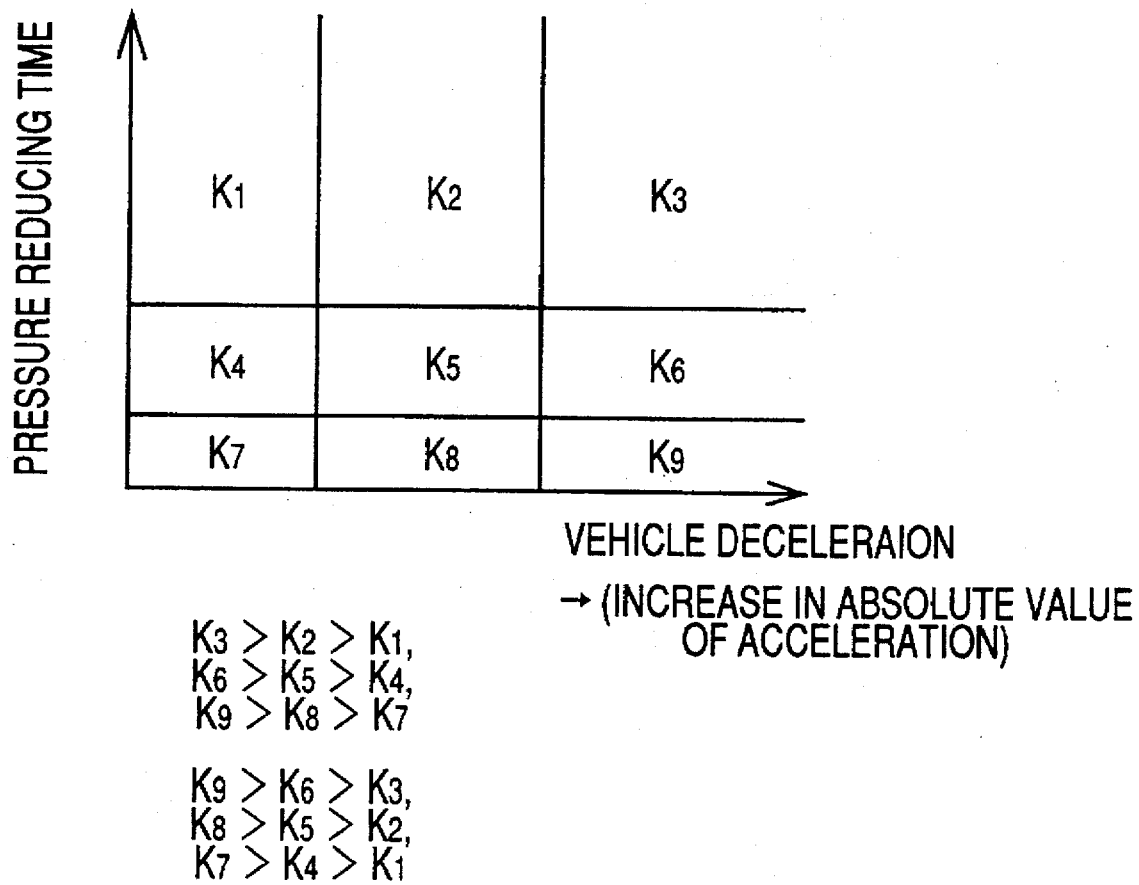
FIG. 6 is a view indicating a data map stored in the read-only memory, for determining a coefficient used by the controller.

The rate of flow of the fluid from the front wheel brake cylinder 16, 20 into the reservoir 44 is estimated according to a data map illustrated in FIG. 6, on the basis of the vehicle deceleration value. The rate of flow of the fluid into the reservoir 44 is not constant, but increases with an increase in the vehicle deceleration and decreases with the pressure reducing time. In the present embodiment, it is assumed, for easier estimation of the cumulative fluid flow-in amount, that the rate of flow of the fluid into the reservoir 44 varies as a function of the pressure reducing time and the vehicle deceleration. Based on this assumption, the present embodiment uses a data map representative of a predetermined relationship among the pressure reducing time, the vehicle deceleration and a coefficient KFLUID, so that the coefficient KFLUID is determined according to this relationship and on the basis of the pressure reducing time and vehicle deceleration. As is apparent from FIG. 6, the coefficient KFLUID increases with an increase in the vehicle deceleration and decreases with an increase in the pressure reducing time.

In the present embodiment, the vehicle deceleration is detected when a pressure reducing mode is established for the front wheel brake cylinder 16. When the vehicle deceleration is relatively large, it means that the overall braking force applied to the vehicle body is accordingly large, and that the pressures in the front and rear wheel brake cylinders 16, 20 are accordingly high. In other words, this embodiment is adapted such that the pressures in the front and rear wheel brake cylinders 16, 20 are estimated based on the vehicle deceleration.

During the pressure reducing time, the fluid is discharged from both of the front and rear wheel brake cylinders 16, 20 and stored in the reservoir 44. However, it is cumbersome to estimate the amounts of the fluid discharged from the two wheel brake cylinders 16, 20 into the reservoir 44, independently of each other. Further, the amounts of the fluid discharged from the two wheel brake cylinders usually have a substantially proportional relationship with each other. In this respect, the need to estimate the amounts of the fluid discharged from the two wheel brake cylinders 16, 20 independently of each other is not so high. While the rate of flow of the fluid discharged from each wheel brake cylinder into the reservoir 44 increases with an increase in the pressure difference between the wheel brake cylinder and the reservoir, the rate of flow of the fluid discharged from the wheel brake cylinder is proportional with the wheel brake cylinder pressure since the pressure in the reservoir is held substantially constant. Hence, there is a certain relationship between the vehicle deceleration and the rate of flow of the fluid into the reservoir 44.

It is also noted that the rate of flow of the fluid into the reservoir 44 decreases with an increase in the pressure reducing time. As the total amount of the fluid which has been discharged from the wheel brake cylinder increases in the period of one pressure reducing operation of the wheel brake cylinder, the pressure in the wheel brake cylinder is lowered whereby the rate of flow of the fluid from the wheel brake cylinder is reduced.

The cumulative fluid flow-out amount, that is, the cumulative amount of the fluid which has been pumped up by the pump 38 is estimated on the basis of a product of an operating time of the pump 38 and a delivery rate of the pump (rate of flow of the fluid delivered from the pump 38). The delivery rate of the pump 38 is estimated on the basis of the output signal of the ammeter 76 or the vehicle deceleration.

Since the pump 38 is kept operated through an anti-lock pressure control operation in the present embodiment, the operating time of the pump 38 is usually a time interval between the last and present cycles of estimation of the cumulative fluid flow-out amount. In the first estimation cycle after initiation of the anti-lock pressure control operation, the operating time of the pump 38 is a time length from the moment of initiation of the anti-lock pressure control operation and the moment of estimation in the present estimation cycle. The cumulative fluid flow-out amount increases with an increase in the operating time of the pump 38.

The delivery rate of the pump 38 decreases with an increase in the electric current flowing through the motor 52 (more precisely, an electric current flowing through the armature coil of the motor 52).

The motor 52 is held energized with a constant voltage. Therefore, the electric current flowing through the motor 52 increases with an increase in the load acting thereon. Accordingly, the rotating speed of the motor 52 and the delivery rate of the pump 38 decrease with an increase in the load on the motor 52. Conversely, as the load on the motor 52 decreases, the electric current of the motor 52 decreases and the rotating speed of the motor 52 increases, while the delivery rate of the pump 38 increases.

The delivery rate of the pump 38 decreases with an increase in the vehicle deceleration. The delivery pressure of the pump 38 decreases with an increase in the pressure in the wheel brake cylinder to which the fluid delivered from the pump 38 is supplied. In other words, the delivery pressure of the pump 38 increases with a decrease in the wheel brake cylinder pressure. Accordingly, the delivery rate of the pump 38 decreases with an increase in the vehicle deceleration, which means an increase in the front and rear wheel brake cylinder 16, 20. An influence of the wheel brake cylinder pressure on the delivery rate of the pump 38 increases with an increase in the amount of change of the wheel brake cylinder pressure.

However, the accuracy of estimation of the delivery rate of the pump 38 based on the vehicle deceleration is usually lower than that based on the electric current of the motor 52. In the light of this fact, the present embodiment is adapted to estimate the delivery rate of the pump 38 based on the electric current of the motor 52 as detected by the ammeter 76, which is provided for this purpose. Since the electric current flowing through the motor 52 is influenced by the vehicle deceleration as indicated above, the electric current of the motor 52 may be considered as one parameter relating to the vehicle deceleration, but cannot be considered as a parameter representative of the vehicle deceleration.

Referring to the flow chart of FIG. 4, the routine for estimating the reservoir fluid amount will be explained.

The routine is initiated with step S11 to determine whether an anti-lock pressure control operation is performed for the front right wheel 14. If an affirmative decision (YES) is obtained in step S11, the control flow goes to step S12 to determine whether a pressure increasing mode is established for the front wheel brake cylinder 16. If step S12 is implemented for the first time, namely, if the affirmative decision (YES) is obtained in step S11 for the first time, a negative decision (NO) is obtained in step S12 in most cases, since it is usually required to establish a pressure reducing mode to reduce the pressure in the front wheel brake cylinder 16 soon after the initiation of the anti-lock pressure control operation. If the negative decision (NO) is obtained in step S12, step S13 is implemented to determine whether a pressure reducing mode is established for the front wheel brake cylinder 16.

If a pressure reducing mode rather than a pressure holding mode is established for the front wheel brake cylinder 16 immediately after the initiation of the anti-lock pressure control operation, an affirmative decision (YES) is obtained in step S13, and the control flow goes to step S14 to determine whether a pressure reducing mode was established also in the last control cycle of the present routine. An affirmative decision (NO) is obtained in step S14 if the pressure reducing mode is established for the first time after the initiation of the anti-lock pressure control operation, or if the pressure reducing mode is established after a pressure increasing or holding mode was established. An affirmative decision (YES) is obtained in step S14 if the pressure reducing mode was already established in the last control cycle.

Immediately after the initiation of the anti-lock control operation, the negative decision (NO) is usually obtained in step S14, and the control flow goes to step S15 to read the vehicle deceleration value, and to step S16 to reset a pressure reducing time CTGEN to zero. Then, step S17 is implemented to increment or update the pressure reducing time CTGEN by adding the cycle time of this routine to the present pressure reducing time CTGEN (which is reset to zero in this specific case). Thus, one cycle of execution of the routine is terminated.

As long as the pressure reducing mode is established for the front wheel brake cylinder 16, the affirmative decision (YES) is obtained in steps S11 and S13, and the negative decision (NO) is obtained in step S12. If the pressure reducing mode was established also in the last control cycle, the affirmative decision (YES) is obtained in step S14, and the control flow goes to step S17 while skipping steps S15 and S16. In step S17, the pressure reducing time CTGEN is incremented by addition of the cycle time T. Steps S11–S14 and S17 are repeatedly implemented to measure the pressure reducing time, as long as the pressure reducing mode is continuously established.

If a pressure holding mode is established for the front wheel brake cylinder 16, the negative decision (NO) is obtained in step S13, and the control flow returns to step S11.

Thus, steps S11–S17 are repeatedly implemented to determine whether the pressure reducing mode is established for the front wheel brake cylinder 16 and measure the pressure reducing time CTGEN.

If a pressure increasing mode is established for the front wheel brake cylinder 16, an affirmative decision (YES) is obtained in step S12. In this case, the reservoir fluid amount is estimated. As described above, the present embodiment is adapted such that the reservoir fluid amount is estimated only when there is a possibility of the reservoir 44 becoming empty with the cut-off valve 30 held closed. On the estimated reservoir fluid amount, the control map A or B is selected. In the other cases, there is no possibility of the reservoir 44 becoming empty, and the pressure control operation according to the control map B is not necessary. Therefore, the reservoir fluid amount is not estimated.

If the affirmative decision (YES) is obtained in step S12, the control flow goes to step S18 to determine whether a pressure reducing or holding mode was established in the last control cycle. If the pressure increasing mode is established for the first time, the pressure holding mode or pressure reducing mode was established in the last control cycle in most cases. That is, an affirmative decision (YES) is obtained in step S18 in most cases where the pressure increasing mode is established for the first time. In this instance, the control flow goes to step S19 to estimate an amount CRES(n) of the fluid currently stored in the reservoir 44, according to the following equation:

CRES(n)=CRES(n-1)+CTGEN·KFLUID-KPUMPUP

In the above equation, "n" and "n-1" represent the present and last control cycles, respectively, and CTGEN·KFLUID represents the cumulative fluid flow-in amount, which is an amount of the fluid which is estimated to have been introduced into the reservoir 44 during the pressure reducing time CTGEN. As described above, the coefficient KFLUID is determined according to the data map indicated in FIG. 6, and on the basis of the vehicle deceleration read in step S15 and the pressure reducing time CTGEN measured in step S17. Further, KPUMPUP represents the cumulative fluid flow-out amount, which is an amount of the fluid which has been pumped up by the pump 38 and discharged from the reservoir 44 during a time period between the moments of estimation in the last and present control cycles. The cumulative fluid flow-out amount KPUMPUP according to the appropriate routine.

When step S19 is implemented for the first time after the initiation of the anti-lock pressure control operation, the reservoir fluid amount CRES(n-1) in the last control cycle is zero, since the entire amount of the fluid in the reservoir 44 is returned to the master cylinder 10 and the reservoir fluid amount CRES is zeroed after termination of each anti-lock pressure control operation.

If the pressure increasing mode was established in the last control cycle, that is, if the negative decision (NO) is obtained in step S18, the control flow goes to step S20 to estimate the reservoir fluid amount CRES(n) according to an equation CRES(n)=CRES(n-1)-KPUMPUP. Since no amount of fluid has been introduced into the reservoir 44 during a time period between the moments of estimation in the last and present control cycles, the cumulative fluid flow-in amount CTGEN·KFLUID is not included in the above equation. That is, the above equation is formulated to obtain the present reservoir fluid amount CRES(n) by simply subtracting the cumulative fluid flow-out amount KPUMPUP from the last reservoir fluid amount CRES(n-1).

In the braking system constructed according to the present embodiment of the invention, the cumulative fluid flow-in amount CRES(n) is estimated on the basis of the pressure reducing time CTGEN and the vehicle deceleration value, whereby the estimation accuracy is improved over that of the conventional estimating means. Further, the cumulative fluid flow-out amount KPUMPUP is estimated depending upon the electric current of the motor 52 which corresponds to the vehicle deceleration, whereby the estimation accuracy is improved. Accordingly, the overall accuracy of estimation of the reservoir fluid amount CRES is improved. In addition, since the wheel brake cylinder pressure estimated depending upon the vehicle deceleration value, the present arrangement eliminates a hydraulic pressure sensor which would be otherwise necessary and which would increase the cost of manufacture of the braking system. Moreover, the present system wherein the vehicle deceleration is estimated by differentiating the estimated vehicle speed does not require any sensor for obtaining the vehicle deceleration, except the wheel speed sensors 72, 74 which are necessary to perform the anti-lock pressure control operations.

If the estimated reservoir fluid amount CRES(n) is smaller than zero, the control mode is switched from the control mode according to the control map A is switched to the control mode according to the control map B. Consequently, the present arrangement is effective to prevent a shortage of the pump-delivered fluid necessary to increase the wheel brake cylinder pressure, making it possible to avoid insufficient wheel braking forces.

It is also noted that the operating time of the pump 38 is obtained as the time during which an anti-lock pressure control operation is continuously performed. This arrangement tends to cause the estimated cumulative fluid flow-out amount KPUMPUP to be larger than the estimated cumulative fluid flow-in amount CTGEN·KFLUID. Further, the pressure reducing time is obtained as the time during which a pressure reducing mode is established for the front wheel brake cylinder 14. This arrangement tends to cause the estimated cumulative fluid flow-in amount CTGEN·KFLUID to be smaller than the actual amount. As a result, the estimated reservoir fluid amount CRES(n) tends to be smaller than the actual amount, making it possible to prevent the shortage of the pump-delivered fluid with high stability.

Although one reservoir 44 is assigned to the two wheel brake cylinders 16, 20, it is not necessary to estimate the pressure reducing times during which the pressure reducing mode is established for the front and rear wheel brake cylinders 16, 20, respectively, and therefore it is possible to easily estimate the cumulative fluid flow-in amount. That is, the cumulative fluid flow-in amount is estimated on the vehicle deceleration and the pressure reducing time during which the pressure reducing mode is established for only the front wheel brake cylinder 16. Since the cumulative fluid flow-out amount is estimated on the basis of the operating time of the pump 38, it is not necessary to detect the pressure increasing times during which the pressure increasing mode is established for the front and rear wheel brake cylinders 16, 20, respectively. This arrangement facilitates not only the estimation of the cumulative fluid flow-out amount, but also the estimation of the reservoir fluid amount.

The reservoir fluid amount estimating routine of FIG. 4 is formulated such that the determinations in steps S12, S13 and S14 are effected on the basis of the mode of control (pressure increasing, reducing mode or holding mode) currently established for the front wheel brake cylinder 16. However, the determinations may be effected on the basis of the currently established one of the seven pressure control modes indicated in TABLE 1, which seven modes correspond to the respective combinations of the operating states of the three shut-off valves 30, 40, 46. In the illustrated embodiment, the alternate establishment of the sixth and seventh pressure control modes or the alternate establishment of the fourth and seventh pressure control modes is considered as the pressure holding mode for the front wheel brake cylinder 16. Therefore, the pressure reducing time during which the seventh pressure control mode is established is not taken into account to obtain the pressure reducing time CTGEN. Where the determinations in steps S12–S14 are effected on the basis of the currently established one of the seven pressure control modes, as described above, the pressure reducing time in the seventh pressure control mode is taken into account to obtain the pressure reducing time CTGEN, whereby the accuracy of estimation of the cumulative fluid flow-in amount CTGEN·KFLUID can be improved.

While the reservoir fluid amount estimating routine of FIG. 4 is formulated to estimate the reservoir fluid amount CRES(n) only when a pressure increasing mode is established for the front wheel brake cylinder 16, it is possible to estimate the reservoir fluid amount also when a pressure reducing or holding mode is established for the front wheel brake cylinder 16. Where the reservoir fluid amount is estimated when the pressure reducing mode is established, the estimation may be effected according to the following equation:

CRES(n)=CRES(n−1)+CTGEN·KFLUID−KPUMPUP

Where the reservoir fluid amount is estimated when the pressure holding mode is established, the estimation may be effected according to the following equation:

CRES(n)=CRES(n−1)−KPUMPUP

When the pressure reducing mode is established, the amount of the fluid introduced into the reservoir 44 is added to the last obtained reservoir fluid amount CRES(n−). When the pressure holding mode is established, the amount of the fluid pumped up by the pump 38 is subtracted from the last obtained reservoir fluid amount CRES(n−1).

In the above modified form, the control map selecting routine of FIG. 5 to select the control map A or B is executed not only when the pressure increasing mode is established, but also when the pressure reducing or holding mode is established.

When the pressure holding mode is established, the present reservoir fluid amount CRES(n) may be determined to be the same as the last reservoir fluid amount CRES(n−1).

The reservoir fluid amount estimating routine may be modified such that the reservoir fluid amount CRES is estimated on the basis of the cumulative fluid flow-in amount and the cumulative fluid flow-out amount during a time period from the moment of initiation of an anti-lock pressure control operation for the front wheel brake cylinder 16 and the moment of estimation of the reservoir fluid amount CRES. In this case, the cumulative fluid flow-in amount CRESIN may be estimated according to the following equation, for example:

CRESIN(n)=CRESIN(n−1)+CTGEN·KFLUID

The cumulative fluid flow-in amount is a total amount of the fluid which has been introduced into the reservoir 44 in the pressure reducing mode during the time period between the moment of initiation of the anti-lock pressure control operation and the moment of estimation of the reservoir fluid amount CRES.

On the other hand, the cumulative fluid flow-out amount CRESOUT(n) is a total amount of the fluid which has been pumped up from the reservoir 44 by the pump 38 during a time period between the moment of initiation of the anti-lock pressure control operation and the moment of estimation of the reservoir fluid amount. In this case, the operating time of the pump 38 is equal to the time length of the anti-lock pressure control operation.

Therefore, the reservoir fluid amount CRES is estimated according to the following equation:

CRES(n)=CRESIN(n)−CRESOUT(n)

When the cumulative fluid flow-out amount is estimated, the electric current flowing through the motor 52 need not be considered. Further, a hydraulic pressure sensor for detecting the pressure in the front wheel brake cylinder 16 and a deceleration sensor for directly detecting the vehicle deceleration may be provided to improve the accuracy of estimation of the cumulative fluid flow-in amount.

In the above embodiment, the control map selecting routine of FIG. 5 is formulated to switch the control map A to the control map B when the estimated reservoir fluid amount is smaller than zero. However, the lower limit of the reservoir fluid amount may be any suitable value other than zero.

While the above embodiment uses the control map selecting routine stored in the ROM of the controller 70, this routine may be replaced by a routine for controlling the cut-off valve 30. For example, this routine may be formulated to change the operating state of the cut-off valve 30 from the closed state to the open state when the estimated reservoir fluid amount becomes smaller than a predetermined lower limit. The cut-off valve 30 may be held open only while a pressure reducing valve is established for the front wheel brake cylinder 16, or during a predetermined time period irrespective of the established pressure control mode. In any case, the cut-off valve placed in the open state permits the fluid from the master cylinder to a portion of the system between the cut-off valve 30 and the reservoir 44, whereby the reservoir 44 is effectively prevented from being empty.

The control maps are not limited to the details of the control maps A and B used in the above embodiment, wherein the fifth and seventh pressure control modes are alternately established if the slipping tendencies of the front and rear wheels 14, 18 are in the process of decreasing, for example. However, the fourth and seventh pressure control modes may be alternately established in the above condition. In this modified arrangement, the pressure in the rear wheel brake cylinder 20 is alternately increased and reduced, while the pressure in the front wheel brake cylinder 16 is alternately held and reduced. Like the alternate establishment of the fifth and seventh pressure control modes, the alternate establishment of the fourth and seventh pressure control modes is effected to prevent or reduce a change of the fluid pressure in the front and rear wheel brake cylinders 16, 20. In this case, therefore, the front and rear wheel brake cylinders 16, 20 are considered to be controlled in a pressure holding mode.

It is possible to estimate the cumulative amount of the fluid from the front wheel brake cylinder 16 into the reservoir 44, and the cumulative amount of the fluid from the rear wheel brake cylinder 20 into the reservoir 44, independently of each other.

It is also possible to estimate the cumulative fluid flow-out amount on the basis of the vehicle deceleration.

While the hydraulic pressure control apparatus described above takes the form of the braking system having the specific arrangement according to the above embodiment of this invention, the principle of the invention is equally applicable to other types of braking system. For instance, the pressure increasing and reducing valve 46 and the pressure reducing valve 46 may be replaced by a single 3-position directional control valve. The pressure reducing valve device 60 and the P valve 36 are not essential to practice the present invention.

Figure 7:
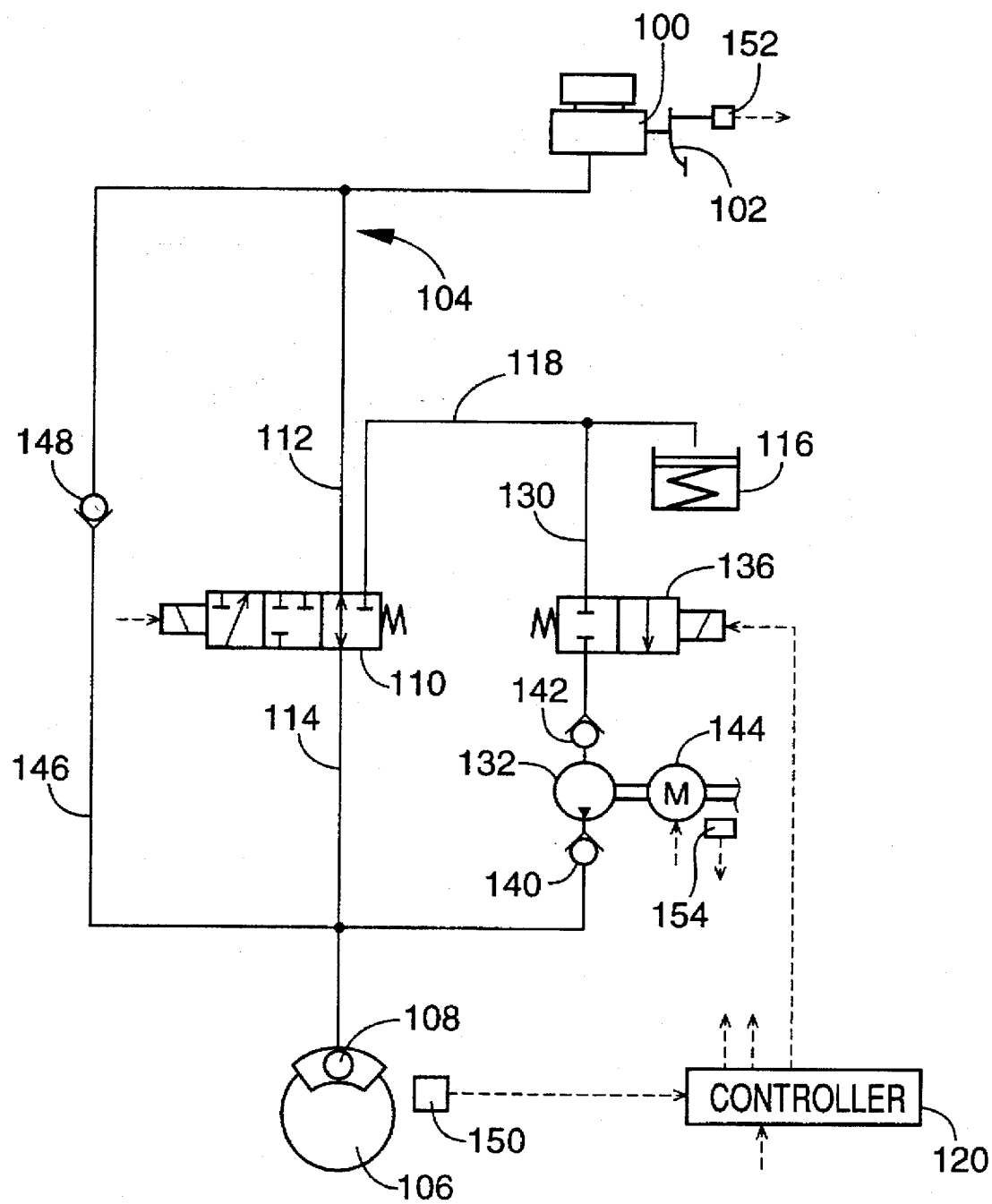
FIG. 7 is a schematic view illustrating an anti-lock braking system including a hydraulic pressure control apparatus constructed according to another embodiment of this invention.

Further, the principle of this invention is applicable to a hydraulic pressure control apparatus in a braking system as shown in FIG. 7, in which one reservoir and one pump are provided for one wheel brake cylinder.

In FIG. 7, reference numerals 100 and 102 denote a master cylinder and a brake pedal, respectively. A pressurizing chamber of the master cylinder 100 is connected through a primary fluid passage 104 to a wheel brake cylinder 106 for a vehicle wheel 106. In the primary fluid passage 104, there is provided a solenoid-operated control valve 110, which has not only a function of a pressure reducing valve, but also a function of a cut-off valve.

The solenoid-operated control valve 110 is a 3-port 3-position valve. To the three ports of this valve 110, there are connected a master cylinder side portion 112 and a wheel cylinder side portion 114 of the primary fluid passage 104, and a pressure reducing passage 118 connected to a reservoir 116.

In a first operating state of FIG. 7 of the control valve 110, the wheel cylinder side portion 114 is communicated with the master cylinder side portion 112, and is disconnected from the pressure reducing passage 118. In this first operating state, the fluid pressurized by the master cylinder 10 may be supplied to the wheel brake cylinder 108.

The control valve 110 is switched to a second operating state by application of a relatively small electric current. In this second operating state, the wheel brake cylinder 108 is disconnected from both of the master cylinder 100 and the reservoir 116. The control valve 110 is switched to a third operating state by application of a relatively large electric current. In this third operating state, the wheel brake cylinder 108 is communicated with the reservoir 116, and is disconnected from the master cylinder 110. The solenoid of the control valve 110 is connected through a suitable driver (not shown) to a controller 120, so that the control valve 110 is controlled by the controller 120 through the driver.

To the reservoir 116, there is connected a pump-up passage 130 in which there is provided a pump 132. The delivery or output port of the pump 132 is connected to the wheel brake cylinder 108. A normally closed, solenoid-operated shut-off valve in the form of a pump-up control valve 136 is provided in a portion of the pump-up passage 130 between the reservoir 116 and the suction or input port of the pump 132.

The pump-up control valve 136 has a open state for connecting the reservoir 116 and the pump 132, and a closed state for disconnecting the reservoir 116 and the pump 132 from each other. When the pump 132 is operated with the pump-up control valve 136 placed in the open state, the fluid is pumped up from the reservoir 116 and pressurized by the pump 132, and the pressurized fluid is delivered to the wheel brake cylinder 108. When the pump-up control valve 132 is placed in the closed state, the pump 132 if operated simply races, and the fluid in the reservoir 116 is not pumped up by the pump 132. The pump-up control valve 132 is normally placed in the closed state, and is brought to the connecting state when a pressure increasing mode is established for the wheel brake cylinder 108 during an anti-lock pressure control operation.

Two check valves 140, 142 are provided in the pump-up passage 130, one on the delivery side of the pump 132, and the other on the suction side of the pump 132. The check valves 140, 142 permit a flow of the fluid therethrough in a direction from the reservoir 116 toward the wheel brake cylinder 108, and inhibits a flow of the fluid in the reverse direction. These check valves 140, 142 prevent the fluid from flowing from the wheel brake cylinder 108 toward the reservoir 116.

The pump 132 is driven by an electric motor 144, which is controlled through a driver (not shown) by the controller 120. In the present embodiment, the motor 144 is held on through an anti-lock pressure control operation.

A by-pass passage 146 is provided for connecting the wheel brake cylinder 108 and the master cylinder 100, while by-passing the solenoid-operated control valve 110. A check valve 148 is provided in the by-pass passage 146. This check valve 148 permits a flow of the fluid in a direction from the wheel brake cylinder 108 toward the master cylinder 100, and inhibits a flow of the fluid in the reverse direction. The by-pass passage 146 and the check valve 148 are provided to return the fluid from the wheel brake cylinder 108 to the master cylinder 100 when the brake pedal 102 is released.

The controller 120 is principally constituted by a computer incorporating a central processing unit (CPU), a read-only memory (ROM), a random-access memory (RAM), an input interface and an output interface. To the input interface, there are connected a wheel speed sensor 150 for detecting the rotating speed of the vehicle wheel 106, a brake switch 152 for detecting an operation of the brake pedal 102, and an ammeter 154 for detecting an electric current flowing through the pump motor 144. To the output interface of the controller 120, there are connected the drivers for the motor 144 and the solenoids of the control valve 110 and pump-up control valve 136. The ROM of the controller 120 stores various programs such as those for calculating the vehicle running speed and deceleration, and those for executing an anti-lock pressure control routine, a reservoir fluid amount estimating routine illustrated in the flow chart of FIG. 8, a control map selecting routine illustrated in the flow chart of FIG. 9, a fluid flow-out amount estimating routine, and other control routines. The ROM also stores various data maps such as control maps A and B indicated in TABLES 4 and 5, and a data map for determining a coefficient KFLUID.

In a normal braking operation of the hydraulic pressure control apparatus of FIG. 7, the solenoid-operated control valve 110 is placed in the first operating state of FIG. 7. The fluid pressurized by the master cylinder 100 depending upon an amount of depression of the brake pedal 102 is supplied to the wheel brake cylinder 108. When the brake pedal 102 is released, the fluid is discharged from the wheel brake cylinder 108 and returned to the master cylinder 100 through the by-pass return passage 146 and check valve 148, or through the control valve 110 placed in the first operating state.

When the slipping tendency of the vehicle wheel 106 becomes excessively large, an anti-lock pressure control operation is initiated for the wheel brake cylinder 108. This anti-lock pressure control operation is performed according to the control map A indicated in TABLE 4.

When the pressure reducing mode is established, the control valve 110 is placed in the third operating state for connecting the wheel brake cylinder 108 to the reservoir 116. In this state, the fluid is discharged from the wheel brake cylinder 108 into the reservoir 116. In the pressure

TABLE 4

| | Control Valve 110 | Control Valve 136 |
| --- | --- | --- |
| Pressure Reducing Mode | Third State | Closed State |
| Pressure Holding Mode | Second State | Closed State |
| Pressure Increasing Mode | Second State | Open State | reducing mode, the pump-up control valve 136 is placed in the closed state, and the fluid in the reservoir 116 is not pumped up by the pump 132.

When the pressure holding mode is established, the control valve 110 is switched to the second operating state while the pump-up control valve 136 is switched to the open state. As a result, the fluid in the reservoir 116 is pumped up and pressurized by the pump 132, and the pressurized fluid is delivered to the wheel brake cylinder 108.

Figure 8:
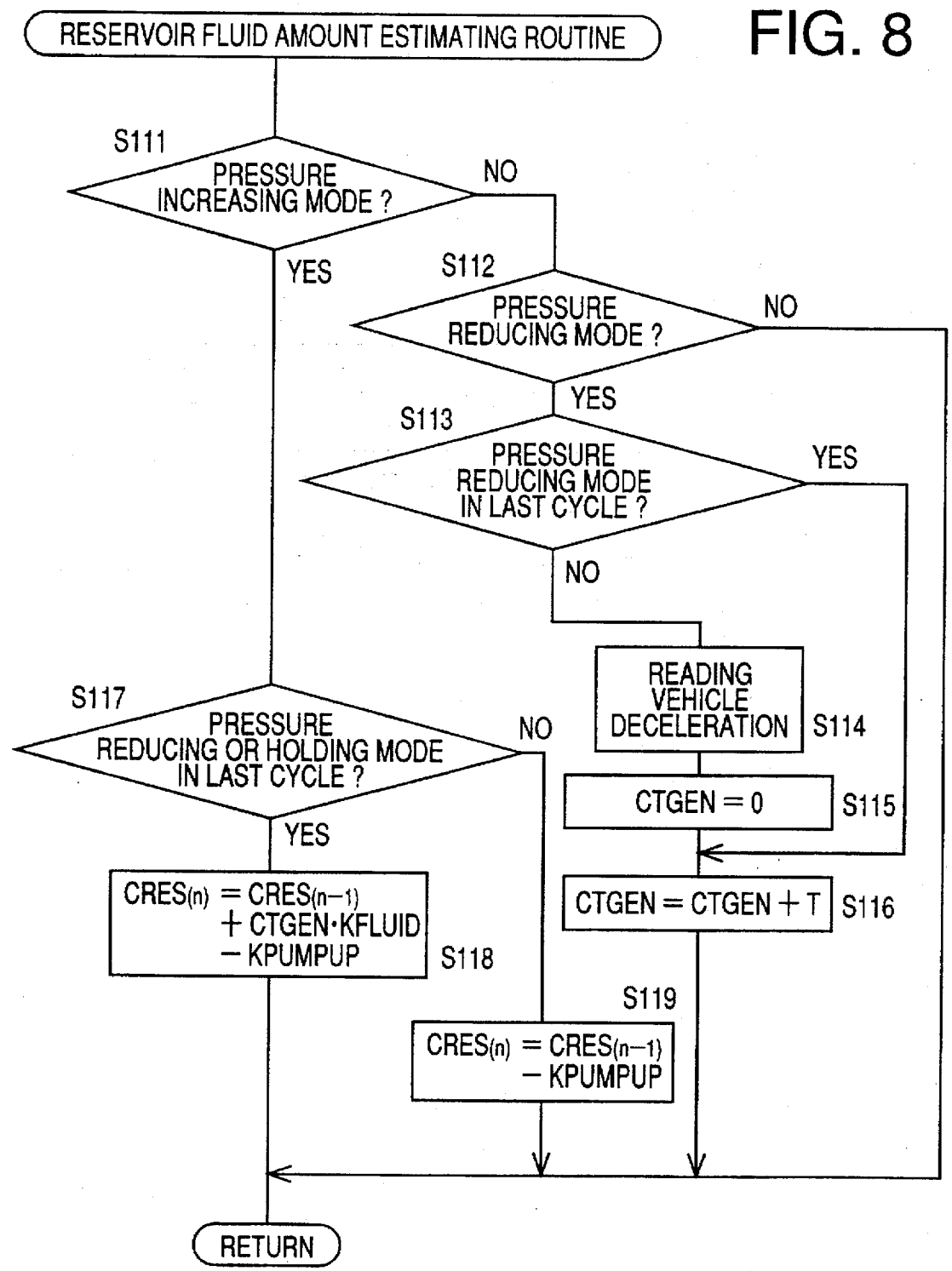
FIG. 8 is a flow chart illustrating a reservoir fluid amount estimating routine executed according to a control program stored in the read-only memory of the controller of the braking system of FIG. 7.
Figure 9:
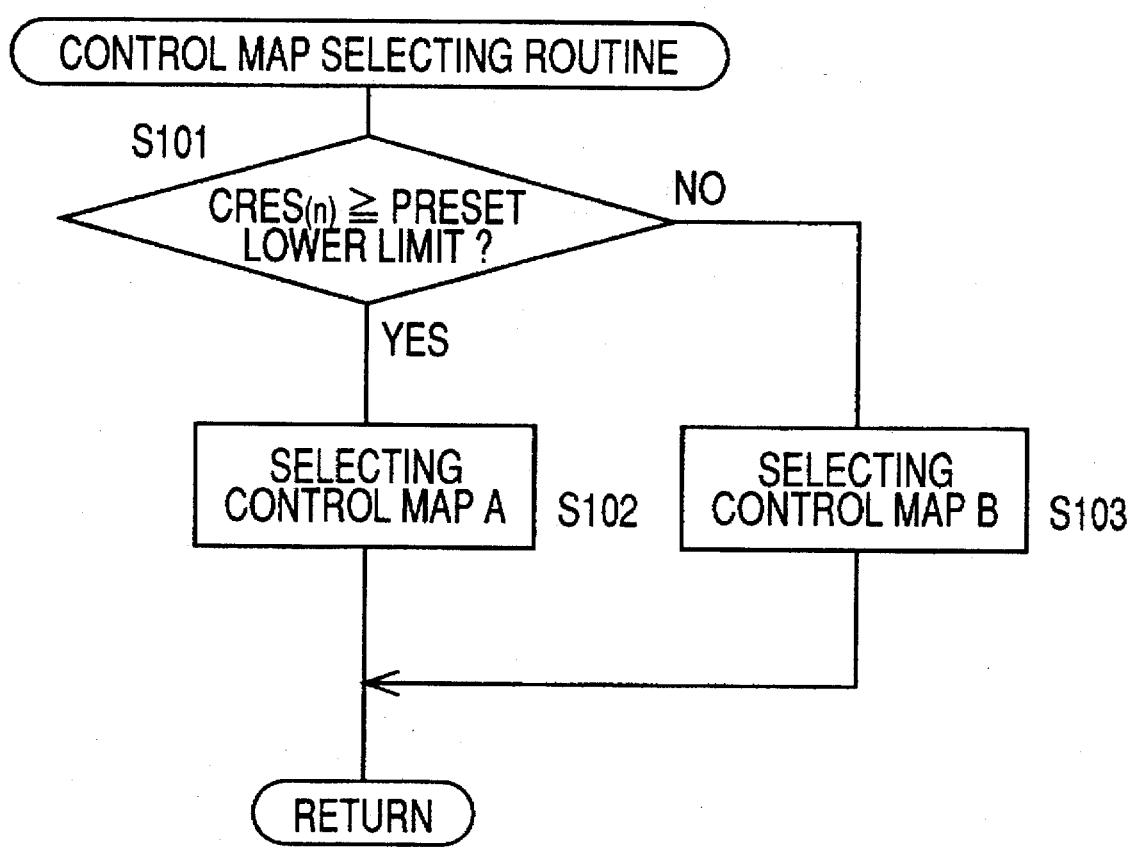
FIG. 9 is a flow chart illustrating a control map selecting routine executed according to a control program also stored in the read-only memory of the controller of the braking system of FIG. 7.

The control map used for the anti-lock pressure control operation is switched from the control map A to the control map B, when the reservoir fluid amount estimated according to the routine illustrated in the flow chart of FIG. 8 is reduced below a predetermined lower limit (larger than zero), during the anti-lock pressure control operation according to the control map A. That is, step S101 of the routine of FIG. 9 is implemented to determine whether the estimated reservoir fluid amount CRES(n) is equal to or larger than the predetermined lower limit. If the estimated amount CRES(n) is equal to or larger than the lower limit, an affirmative decision (YES) is obtained in step S101, and step S102 is implemented to select the control map A. If a negative decision (NO) is obtained in step S101, that is, if the estimated reservoir fluid amount CRES(n) is reduced below the lower limit, step S103 is implemented to select the control map B. While the lower limit of the reservoir fluid amount CRES(n) is zero in the first embodiment, the lower limit is a suitably determined positive value in the present second embodiment.

TABLE 5

| | Control Valve 110 | Control Valve 136 |
| --- | --- | --- |
| Pressure Reducing Mode | Third State | Closed State |
| Pressure Holding Mode | Second State | Closed State |
| Pressure Increasing Mode | Alternate Second and First States | Closed State |

The control map B is different from the control map A, when the pressure increasing mode is established. According to the control map B in TABLE 5, the control valve 110 is alternately placed in the first and second states, while the pump-up control valve 136 is held in the closed state. While it is possible to hold the control valve 110 in the first operating state when the pressure increasing mode is established, the control valve 110 is alternately placed in the first and second states in the second embodiment, so as to control the pressure increasing gradient of the wheel brake cylinder 108. Further, the pump-up control valve 136 is closed since the pressurized fluid is supplied from the master cylinder 100 to the wheel brake cylinder 108, and it is not necessary to supply the pressurized fluid from the reservoir 116 to the wheel brake cylinder 108 by operation of the pump 132.

The reservoir fluid amount estimating routine illustrated in the flow chart of FIG. 8 is almost identical with the routine illustrated in the flow chart of FIG. 4 in the first embodiment. That is, the routine of FIG. 8 does not include a step corresponding to step S11 of the routine of FIG. 4, because the reservoir 116 is used for only one wheel brake cylinder 108.

Like the first embodiment, the present second embodiment is adapted to estimate the cumulative fluid flow-in amount on the basis of the pressure reducing time (during which the pressure reducing mode is established for the wheel brake cylinder 108) and the vehicle deceleration (which corresponds to the pressure in the wheel brake cylinder 108). The use of the vehicle deceleration as well as the pressure reducing time permits higher accuracy of estimation of the cumulative fluid flow-in amount, than the use of only the pressure reducing time. In the present embodiment, the pressure reducing time during which the pressure reducing mode is established for the wheel brake cylinder 108 is equal to the time during which the control valve 110 is placed in the third operating state. In this respect, the latter time may be used for estimating the cumulative fluid flow-in amount.

The cumulative fluid flow-out amount KPUMPUP may be estimated according to a suitable routine. In the first embodiment, the amount KPUMPUP is estimated on the basis of the operating time of the pump 38 and the electric current of the motor 52 (corresponding to the wheel brake cylinder pressure). In the present second embodiment, however, the amount KPUMPUP is estimated on the basis of the pressure increasing time during which the pump-up control valve 136 is placed in the open state, and the electric current of the motor 144. While the motor 144 is held on throughout the anti-lock pressure control operation, the fluid in the reservoir 166 is pumped up by the pump 132 for only a time period during which the pump-up control valve 136 is held open.

Unlike the first embodiment, the present second embodiment is not adapted to estimate the cumulative fluid flow-in amount and flow-out amount such that the estimated reservoir fluid amount tends to be smaller than the actual amount. That is, while the lower limit of the estimated reservoir fluid amount for switching the control map A to the control map B is smaller than zero in the first embodiment, the lower limit is a positive value in the second embodiment.

In the present hydraulic pressure control apparatus of FIG. 7 wherein one reservoir 116 and one pump 132 are provided for one wheel brake cylinder 108, the cumulative fluid flow-in amount can be estimated with considerably higher accuracy, by using the vehicle deceleration as well as the pressure reducing time. Accordingly, the accuracy of estimation of the reservoir fluid amount can be significantly improved in the present second embodiment. Further, the switching of the control map A to the control map B upon reduction of the estimated reservoir fluid amount below the predetermined lower limit is effective to prevent a shortage of the pressurized fluid to be delivered from the reservoir 116 to the wheel brake cylinder 108 by operation of the pump 132. In addition, the use of the vehicle deceleration to estimate the pressure in the wheel brake cylinder 108 eliminates a hydraulic pressure sensor, contributing to reduction of the cost of manufacture of the pressure control apparatus while assuring high accuracy of estimation of the reservoir fluid amount.

The principle of this invention is also applicable to a hydraulic pressure control apparatus in a braking system having two pressure application sub-systems, one for the front right and left wheels, and the other for the rear right and left wheels. In this third embodiment, the hydraulic control device takes the form of the pressure application sub-system which includes two brake cylinders for the front right and left wheels. In this pressure control apparatus or pressure application sub-system, one reservoir and one pump are provided for the two brake cylinders for the front right and left wheels. Unlike the first embodiment, however, the present third embodiment is capable of performing anti-lock pressure control operations for the right and left wheels (two front wheels) independently of each other.

Figure 10:
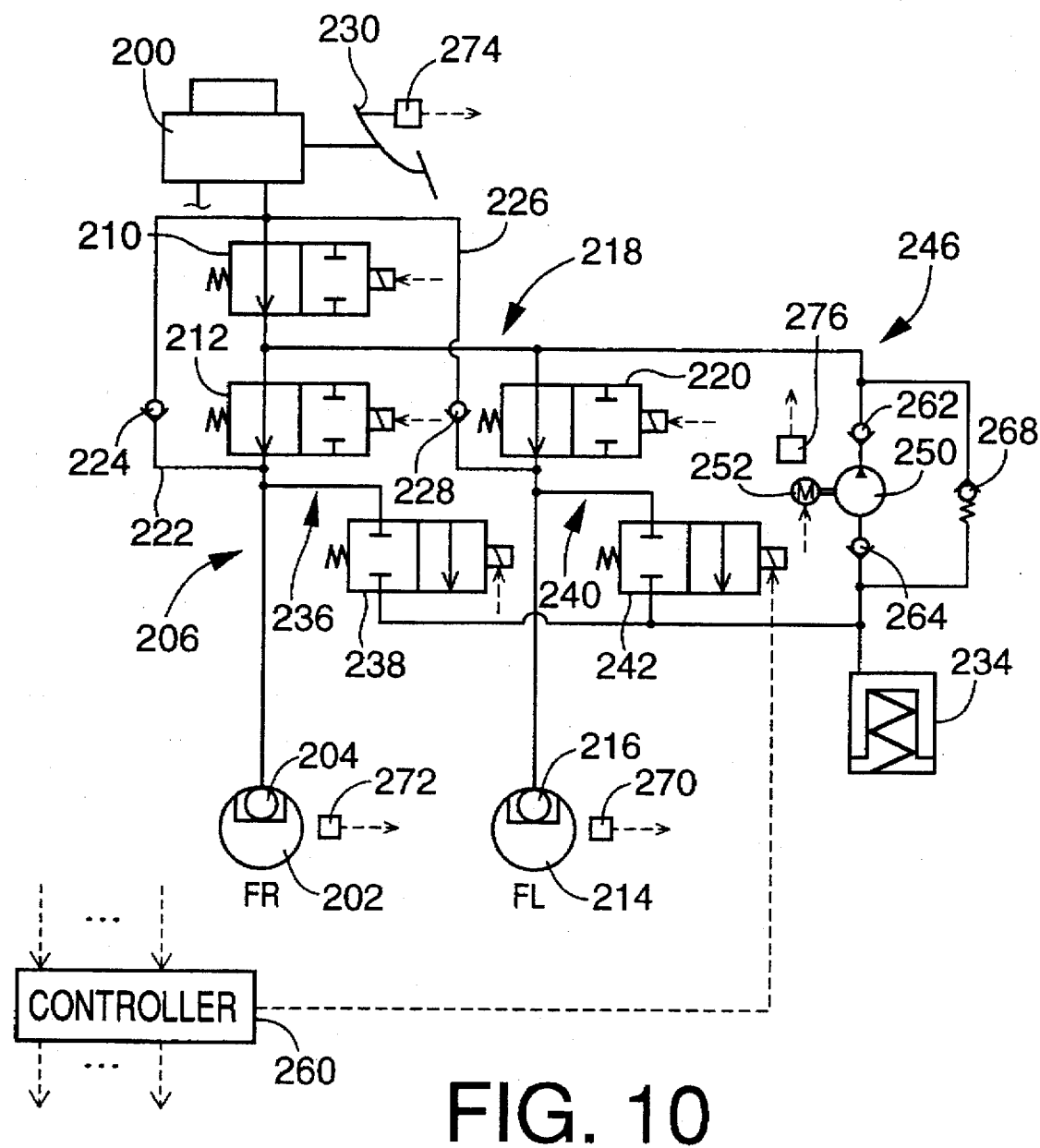
FIG. 10 is a schematic view illustrating an anti-lock braking system including a hydraulic pressure control apparatus constructed according to a further embodiment of the present invention.

In FIG. 10, reference numeral 200 denotes a master cylinder 200. In a primary fluid passage 206 connecting the master cylinder 200 and a brake cylinder 204 for a front right wheel 202, there are provided a solenoid-operated cut-off valve 210 and a solenoid-operated pressure increasing valve 212. To a portion of the primary fluid passage 206 between the cut-off valve 210 and the pressure increasing valve 212, there is connected a secondary fluid passage 218 which is connected at one end thereof to a brake cylinder 216 for a front left wheel 214. A solenoid-operated pressure increasing valve 220 is provided in the secondary fluid passage 218.

The cut-off valve 210 is normally placed in the open state, and is held in the closed state during an anti-lock pressure control operation. As described below, this cut-off valve 210 is alternately opened and closed during the anti-lock pressure control operation when the estimated reservoir fluid amount is smaller than a predetermined lower limit.

The primary fluid passage 206 is provided with a by-pass passage 222 which by-passes the cut-off valve 210 and pressure increasing valve 212. A check valve 224 is provided in the by-pass passage 222. This check valve 224 permits a flow of the fluid in a direction from the wheel brake cylinder 204 toward the master cylinder 200, but inhibits a flow of the fluid in the reverse direction. There is provided another by-pass passage 226 connecting the primary and secondary fluid passages 206, 218 and by-passing the cut-off and pressure increasing valves 210, 220. In this by-pass passage 226, there is provided a check valve 228. These by-pass passages 222, 226 and check valves 224, 228 are provided to return the fluid from the wheel brake cylinders 204, 216 to the master cylinder 200 when a depressed brake pedal 230 is released.

The front right wheel brake cylinder 204 and the reservoir 234 are connected by a pressure reducing passage 236. A pressure reducing valve 238 is provided in the pressure reducing passage 236. Similarly, the front left wheel brake cylinder 216 and the reservoir 234 are connected by a pressure reducing passage 240 in which is provided a pressure reducing valve 242.

The pressure reducing valves 238, 242 are normally placed in their closed state, and are brought to the open state when the pressure reducing mode is established for the respective wheel brake cylinders 204, 216, so that these wheel brake cylinders 204, 216 are communicated with the reservoir 234.

A pressure increasing passage 246 is connected at one end thereof to the reservoir 234. A pump 250 is provided in the pressure increasing passage 246. The pump 250 is operated by an electric motor 252, which is controlled by a controller 260 through a driver circuit (not shown).

Two check valves 262, 264 are provided in the pressure increasing passage 246. The check valve 262 is located on the delivery side of the pump 250, while the check valve 264 is located on the suction side of the pump 250. A pressure relief valve 268 is provided in a passage which by-passes the pump 250. This pressure relief valve 268 permits a flow of the fluid in a direction from the delivery port of the pump 250 toward the suction port, when the pressure difference on the delivery and suction sides of the pump 250 exceeds a predetermined value. The pressure in the reservoir 234 is close to the atmospheric pressure and is held substantially constant. Therefore, the fluid delivered from the pump 250 is returned to the reservoir 234 through the pressure relief valve 268 when the delivery pressure of the pump 250 exceeds the predetermined value.

The controller 260 is principally constituted by a computer incorporating a central processing unit (CPU), a read-only memory (ROM), a random-access memory (RAM), an input interface and an output interface. To the input interface, there are connected wheel speed sensors 270, 272 for detecting the rotating speeds of the front right and left wheels 202, 214, wheel speed sensors (not shown) for detecting the rotating speeds of the rear right and left wheels, a brake switch 274 for detecting an operation of the brake pedal 230, an ammeter 276 for detecting the electric current flowing through the motor 252. To the output interface of the controller 260, there are connected through respective drivers the motor 252 and the solenoid coils of the cut-off valve 210, pressure increasing valves 212, 220 and pressure reducing valves 238, 242. The ROM stores various control programs such as those for executing an anti-lock pressure control routine, a control map selecting routine and a reservoir fluid amount estimating routine, and also stores various data maps such as control maps A and B of TABLES 6 and 7, and a data map for determining the coefficient KFLUID.

During a normal braking operation, the cut-off valve 210, pressure increasing valves 212,220, and pressure reducing valves 238, 242 are placed i the positions of FIG. 10. In this condition, the fluid pressurized by the master cylinder 200 depending upon the operating amount of the brake pedal 230 is supplied to the wheel brake cylinders 204, 216. When the depressed brake pedal 230 is released, the fluid is discharged from the wheel brake cylinders 204, 216 and returned to the master cylinder 200, through the by-pass passages 222, 226, or through the pressure increasing valve 212 and cut-off valve 310, and the pressure increasing valve 220 and cut-off valve 210, which are all placed in the open state.

When the slipping tendency of at least one of the front right and left wheel 202, 214 becomes excessive, an anti-lock pressure control operation is initiated. Throughout this pressure control operation, the motor 252 is held on, and the cut-off valve 210 is held closed. Normally, the anti-lock pressure control operation is performed according to the control map A of TABLE 6. However, the control map A is switched to the control map B of TABLE 7 when the reservoir fluid amount estimated according to a suitable routine becomes smaller than a predetermined lower limit.

TABLE 6

|  | Cut-off Valve 210 | Pressure Valve 212 | Pressure Valve 238 |
| --- | --- | --- | --- |
| Pressure Reducing Mode | Closed | Closed | Open |
| Pressure Holding Mode | Closed | Closed | Closed |
| Pressure Increasing Mode | Closed | Open | Closed |

TABLE 7

|  | Cut-off Valve 210 | Pressure Valve 212 | Pressure Valve 238 |
| --- | --- | --- | --- |
| Pressure Reducing Mode | Closed | Closed | Open |
| Pressure Holding Mode | Closed | Closed | Closed |
| Pressure Increasing Mode | Alternate Closed/Open | Open | Closed |

There will be described an anti-lock pressure control operation for the front right wheel 202 (for the wheel brake cylinder 204), by way of example. An anti-lock pressure control operation for the front left wheel 214 (for the wheel brake cylinder 216) is the same as that for the front right wheel 202.

When the pressure reducing mode is established for the wheel brake cylinder 204 during an anti-lock pressure control operation according to the control map A, the pressure increasing valve 212 is closed while the pressure reducing valve 238 is opened. As a result, the wheel brake cylinder 204 is disconnected from the pump 250 and connected to the reservoir 234, so that the fluid is discharged from the wheel brake cylinder 204 into the reservoir 234, whereby the pressure in the wheel brake cylinder 204 is reduced.

When the pressure holding mode is established, the pressure increasing and reducing valves 212, 238 are both closed, so that the wheel brake cylinder 204 is disconnected from both the reservoir 234 and the pump 250, and the pressure in the wheel brake cylinder 204 is maintained.

When the pressure increasing mode is established, the pressure increasing valve 212 is opened while the pressure reducing valve 238 is closed, so that the wheel brake cylinder 204 is disconnected from the reservoir 234 and communicated with the pump 250. As a result, the pressurized fluid is delivered from the pump 250 to the wheel brake cylinder 204, and the pressure in this cylinder 204 is increased.

The control map is switched from the control map A to the control map B if the reservoir fluid amount estimated according to the estimating routine is reduced below the predetermined lower limit during the anti-lock pressure control operation according to the control map A.

The control map B is different from the control map A, when the pressure increasing mode is established. According to the control map B in TABLE 7, the cut-off 210 is alternately opened and closed when the pressure increasing mode is established. In this mode, the pressure in the wheel brake cylinder 204 is increased primarily by the pressurized fluid supplied from the master cylinder 200. While any amount of the fluid is stored in the reservoir 234, the fluid in the reservoir 234 is pumped up and pressurized by the pump 250 and is delivered to the wheel brake cylinder 204. However, the amount of the pressurized fluid supplied from the pump 250 is smaller than that supplied from the master cylinder 200. When the reservoir 234 is evacuated or becomes empty, the pump 250 simply races without an actual pumping action, and only the fluid pressurized by the master cylinder 200 is supplied to the wheel brake cylinder 204.

In the present third embodiment wherein the anti-lock pressure control operations can be performed for the front right and left wheels 202, 214, independently of each other, the reservoir fluid amount estimating routine similar to that of FIG. 8 is executed for the front right and left wheel brake cylinders 204, 216, independently of each other. That is, an amount FRin of the fluid which has been discharged from the front right wheel brake cylinder 204 and introduced into the reservoir 234 is estimated, and an amount FRout of the fluid which has been supplied from the reservoir 234 to the wheel brake cylinder 204 by the pump 250 is also estimated. An amount CRESFR(n) of the fluid which is now stored in the reservoir 234 as a result of the fluid flows to and from the wheel brake cylinder 204 is estimated on the basis of the estimated amounts FRin and FRout (cumulative fluid flow-in amount FRin and cumulative fluid flow-out amount FRout) associated with the wheel brake cylinder 204. Similarly, an amount FLin of the fluid which has been discharged from the front left wheel brake cylinder 216 and introduced into the reservoir 234 is estimated, and an amount FLout of the fluid which has been supplied from the reservoir 234t the wheel brake cylinder 216 by the pump 250 is estimated. An amount CRESFL(n) of the fluid which is now stored in the reservoir 234 as a result of the fluid flows to and from the wheel brake cylinder 216 is estimated on the basis of the estimated amounts FLin and FLout (cumulative fluid flow-in amount FLin and cumulative fluid flow-out amount FLout) associated with the wheel brake cylinder 216. Then, the reservoir fluid amount CRES(n) is obtained as a sum of the amounts CRESFR(n) and CRESFL(n).

The cumulative fluid flow-out amounts FRout and FLout are estimated on the basis of the electric current of the motor 252 and the pressure increasing time during which the pressure increasing valves 212, 220 are held open, as in the second embodiment. In the present third embodiment, the cumulative fluid flow-out amounts FRout, FLout are not the fluid amount pumped up by the pump 250, but are the fluid amounts supplied to the two front wheel brake cylinders 204, 216, respectively, because the pressurized fluid delivered from the pump 250 is returned to the reservoir 234 through the pressure relief valve 268 when the delivery pressure of the pump 250 exceeds the predetermined level.

When the anti-lock pressure control operations are performed for both of the front right and left wheels 202, 214, the reservoir fluid amount estimating routine is executed for the wheel brake cylinders 204, 216 independently of each other as described above, and the fluid amounts CRESFR(n) and CRESFL(n) are estimated, and the reservoir fluid amount CRES(n) is estimated as the sum of these two amounts CRESFR(n) and CRESFL(n). If the reservoir fluid amount CRES(n) is reduced below the predetermined lower limit, the control map A is replaced by the control map B.

Usually, the anti-lock pressure control operations are initiated simultaneously for the front right and left wheels 202, 214, or with a short time delay between the two operations. However, the anti-lock pressure control operation may be performed for only one of the two front wheels 202, 214, while the vehicle is running on an uneven friction-coefficient road surface.

If, for example, the anti-lock pressure control operation is performed for the front right wheel 202 while it is not performed for the front left wheel 214, the pressure increasing mode is established for the front left wheel brake cylinder 216 for which the anti-lock pressure control operation is not performed. That is, the pressure increasing valve 220 is held open while the pressure reducing valve 242 is held closed, so that the fluid pumped up from the reservoir 234 by the pump 250 is always supplied to the wheel brake cylinder 216, without the fluid being discharged from this wheel brake cylinder 216. Thus, the cumulative fluid flow-in amount FLin estimated on the basis of the pressure reducing time (during which the pressure reducing valve 242 is held closed) and the vehicle deceleration is zero, while the cumulative fluid flow-out amount FLout estimated on the basis of the pressure increasing time (during which the pressure increasing valve 220 is held open) and the electric current of the motor 252 is considerably large. Therefore, the amount CRESFL(n) estimated on the fluid flow-in amount FLin and fluid flow-out amount FLout is a negative value, and the reservoir fluid amount CRES(n) which is the sum of the amounts CRESFL(n) and the amount CRESFR(n) is likely to be smaller than the predetermined lower limit. That is, the control map B is likely to be selected.

When the control map B is selected, however, the fluid pressurized by the master cylinder 200 is supplied to the wheel brake cylinder 216, there arises no shortage of the pressurized fluid to increase the pressure in the wheel brake cylinder 216.

As in the braking system according to the first embodiment, one reservoir 234 and one pump 232 are provided for the two wheel brake cylinders 204, 216 in the present braking system. In this third embodiment, too, the cumulative fluid flow-in amount can be estimated with high accuracy, owing to the use of the vehicle deceleration as well as the pressure reducing time.

Referring to FIGS. 11–25, there will be described a fourth embodiment of the present invention, which is different from the first embodiment of FIGS. 1–6, in the control programs stored in the controller.

That is, the ROM of the controller 70 in the present fourth embodiment stores various control programs such as those for executing routines illustrated in the flow charts of FIGS. 11–14, 19–21, 23 and 25, and various data tables such as data maps for determining fluid flow-in coefficients as indicated in FIGS. 15 and 16. As in the first embodiment, the ROM in the present fourth embodiment also stores the control maps A and B of TABLES 2 and 3 and the control map selecting routine illustrated in the flow chart of FIG. 5.

Since the mechanical arrangement of the present braking system is identical with that of FIG. 1, there will be described a control arrangement of the braking system, particularly, the manner of estimating the amount of fluid stored in the reservoir 44. The estimation of the fluid amount in a reservoir in the other pressure application sub-system including brake cylinders for a front left wheel and a rear right wheel is the same as that for the reservoir 44 in the sub-system including the front right wheel brake cylinder 16 and the rear left wheel brake cylinder 20.

Figure 11:
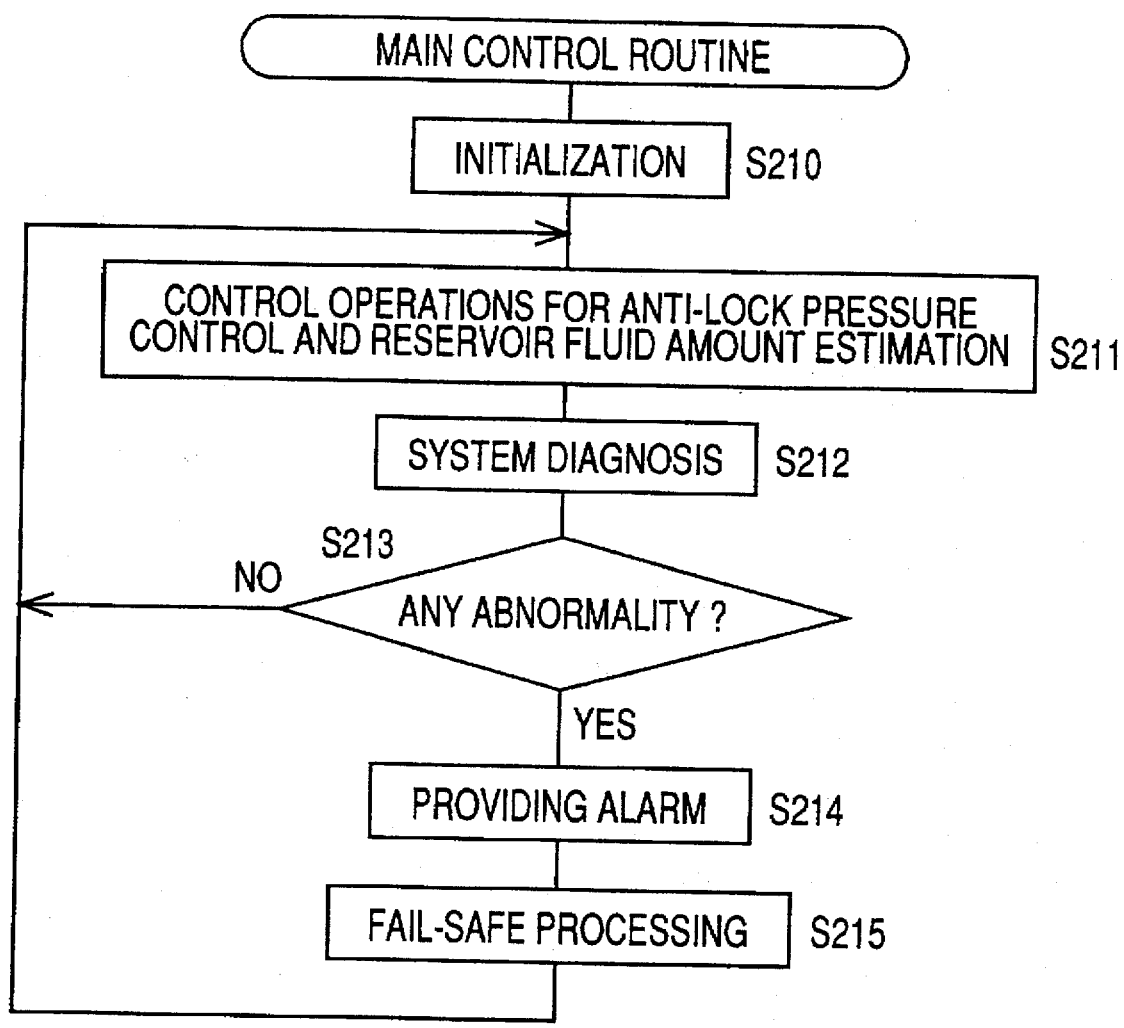
FIG. 11 is a flow chart illustrating a main routine executed according to a control program stored in the read-only memory of a controller used in a still further embodiment of this invention.

When the ignition switch of the vehicle is turned on, a main control routine illustrated in the flow chart of FIG. 11 is executed. This main control is initiated with step S210 to initialize various control variables and flags. Step S210 is followed by step S11 to perform control operations for controlling anti-lock pressure control operations and estimating the amount of the fluid currently stored in the reservoir 44 (hereinafter referred to as "reservoir fluid amount"). Then, the control flow goes to step S212 to diagnose the hydraulic pressure control apparatus for any abnormality, for example, check the controller 70 and the wheel speed sensors 72, 74 and other sensors for any abnormality or defect. If any abnormality is detected as a result of the diagnosis in step S212, an affirmative decision (YES) is obtained in step S213 following step S212, and the control flow goes to step S214 to provide a suitable alarm indication, and to step S215 to effect a suitable fail-safe processing for safe operation of the braking system. If a negative decision (NO) is obtained in step S213, the control flow returns to step S211. Thus, step S211 is repeatedly implemented controlling the anti-lock pressure control operations and reservoir fluid amount estimation, in the absence of any abnormality in the braking system.

Even after an anti-lock pressure control operation is terminated, the motor 52 is held on for a suitable time to return the fluid from the reservoir 44 to the master cylinder 10. This operation time of the motor 52 is slightly longer than a time which is expected to be required for the pump 38 to return the entire amount of the fluid stored in the reservoir 44 upon termination of the anti-lock pressure control operation.

Figure 12:
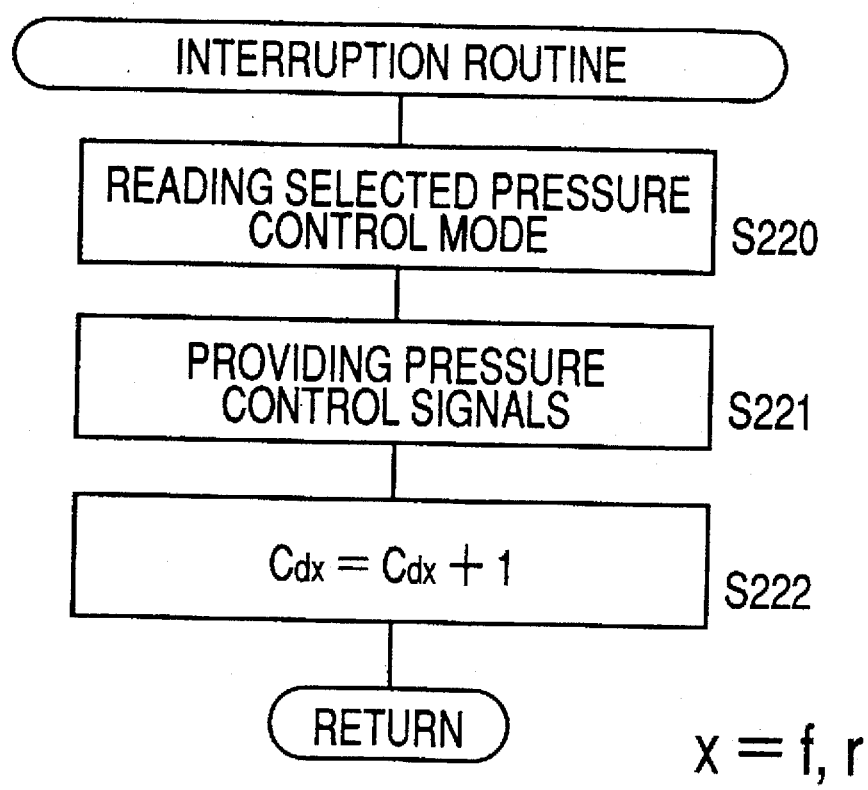
FIG. 12 is a flow chart illustrating an interruption routine executed according to a control program stored in the read-only memory of the controller in the embodiment of FIG. 11.

During an anti-lock pressure control operation and estimation of the reservoir fluid amount according to the main control routine of FIG. 11, an interruption routine illustrated in the flow chart of FIG. 12 is executed. This routine is initiated with step S220 to read the pressure control mode (pressure increasing, reducing or holding mode) currently established for the wheel brake cylinder 16, 20 in question. Step S220 is followed by step S221 in which the controller 70 applies control signals to the cut-off valve 30, pressure increasing and reducing valve 40 and pressure reducing valve 46 for placing these valves in the suitable states according to the pressure control mode currently established in step S11 of the main control routine. Then, the control goes to step S222 in which a pressure reducing time counter Cdx (x=f, r) is incremented to measure a pressure reducing time tdx if the pressure reducing mode is currently established. The pressure reducing time tdx is a time during which the pressure reducing mode is established for the wheel brake cylinder in question in an estimating period between the last and present cycles of estimation of the reservoir fluid amount in step S211. That is, the pressure reducing time tdx is a time during which the fluid discharged from the wheel brake cylinder is introduced into the reservoir 44, between the last and present cycles of estimation of the reservoir fluid amount (more specifically, between the moments of two successive implementations of step S262 of the reservoir fluid amount estimating routine). In this respect, it is noted that in the first embodiment, the reservoir fluid amount is estimated in step S19 or S20 when the pressure increasing mode is established. In the present fourth embodiment, the reservoir fluid amount is estimated each time step S211 is implemented. The interruption routine of FIG. 12 is executed with a cycle time of 1 ms, to control the valves 30, 40, 46 for all the wheel brake cylinders in the selected pressure control modes. The time counter Cdx for each wheel is cleared after the estimation of the reservoir fluid amount in step S211 in each cycle of execution of the main control routine (more specifically, in step S264 after the reservoir fluid amount CRES(n) has been calculated in step S262). However, the time counter Cdx is incremented with the cycle time of the interruption routine of FIG. 12, if and as long as the pressure reducing mode is established in the next cycle of execution of the main control routine (in the next period of estimation of the reservoir fluid amount).

Figure 13A:
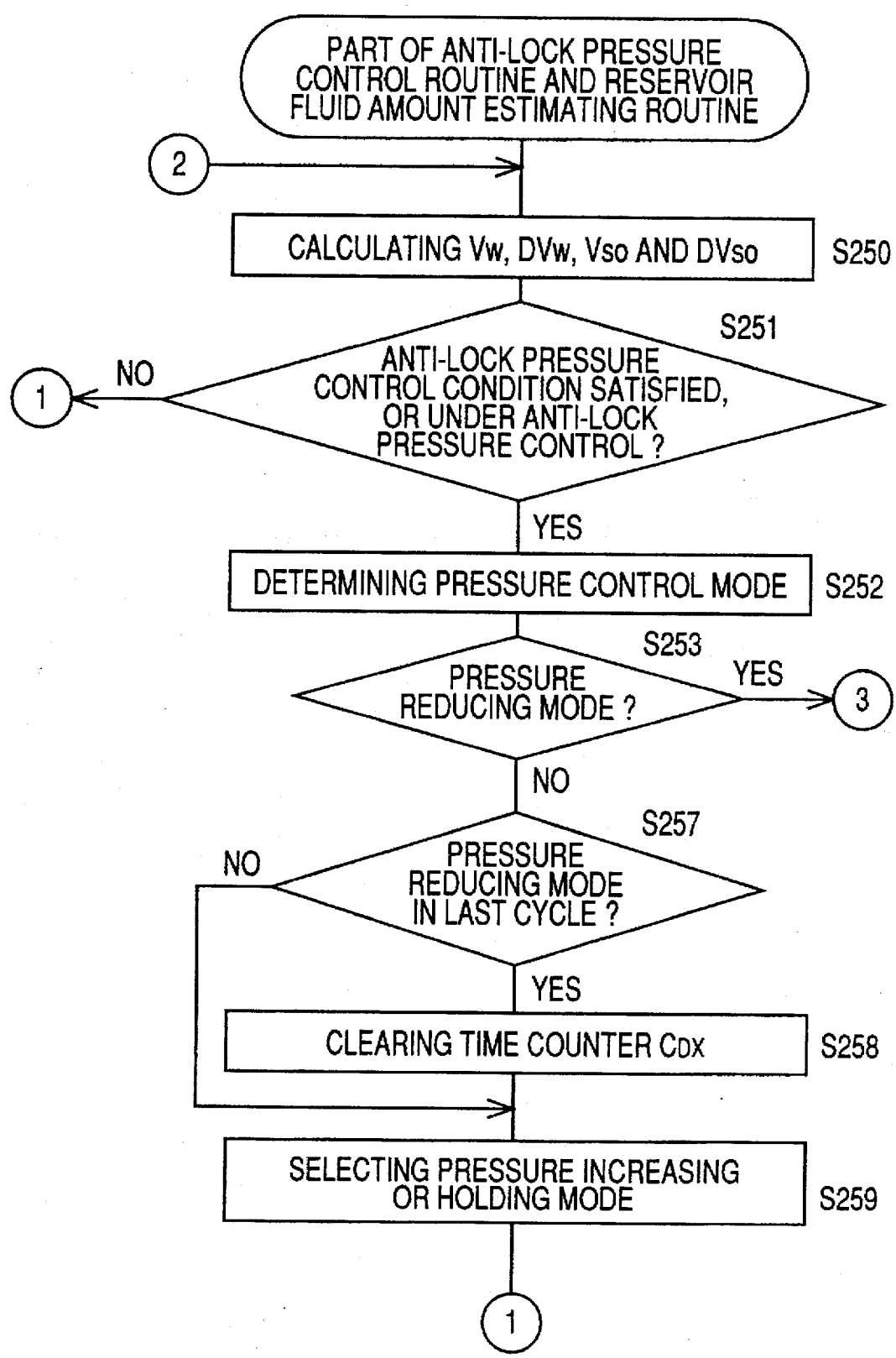
FIGS. 13(a) and 13(b) are flow charts illustrating a part of an anti-lock pressure control routine and a reservoir fluid amount estimating routine, which are executed according to control programs stored in the read-only memory in the embodiment of FIG. 11.
Figure 13B:
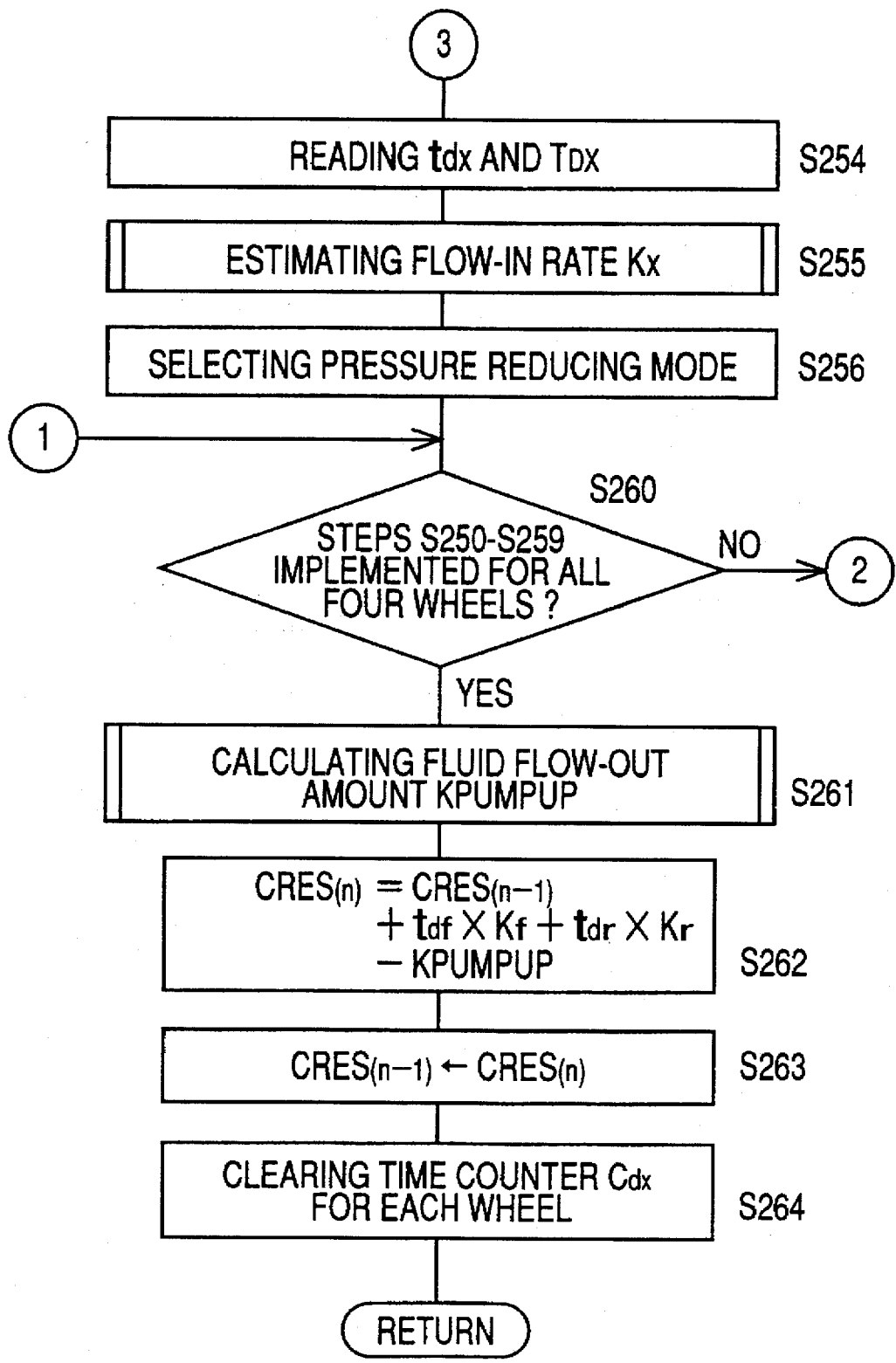

A part of the anti-lock pressure control routine and the reservoir fluid amount estimating routine which are executed in step S211 of the main control routine of FIG. 11 are illustrated in the flow charts of FIGS. 13(a) and 13(b). These routines are executed as long as an anti-lock pressure control operation is performed for at least one of the wheel brake cylinders, and is terminated when the anti-lock pressure control operation is terminated for all of the rear wheel brake cylinders. Upon termination of the anti-lock pressure control operation, the estimated reservoir fluid amount CRES is zeroed.

Steps S250–S259 shown in FIG. 13(a) are implemented for the four wheel brake cylinders independently of each other. After these steps are implemented for all of the four wheel brake cylinders, the control flow goes to step S261 of FIG. 13(b) and subsequent steps for estimating the reservoir fluid amount.

In the first embodiment, the reservoir fluid amount estimating routine is executed only when the pressure increasing mode is established for the front right wheel 14 (front right wheel brake cylinder 16). In the present fourth embodiment, however, the reservoir fluid amount estimating routine is executed after steps S250–S259 have been implemented for all of the four wheel brake cylinders. In the first embodiment, the amount of the fluid introduced into the reservoir 44 is estimated on the basis of the amount of the fluid discharged from both of the front and rear wheel brake cylinders 16, 20, and the amount of the fluid discharged from the rear wheel brake cylinder 20 alone is not considered. In the present fourth embodiment, this amount of the fluid discharged from the rear wheel brake cylinder 20 alone is also considered. In the first embodiment, the rate of flow of the fluid into the reservoir 44 is estimated on the basis of the pressure reducing time and the vehicle deceleration upon establishment of the pressure reducing mode. In the present embodiment, the rate of flow of the fluid into the reservoir 44 is estimated on the basis of the vehicle deceleration upon execution of the reservoir fluid amount estimating routine of FIG. 13, a continuous pressure reducing time TDX from the moment of initiation of the pressure reduction of the wheel brake cylinder to the moment of estimation of the reservoir fluid amount, and a pressure change index P (which will be described). When the reservoir fluid amount estimating routine is executed for the first time after the pressure reducing mode is established, an overshoot-equivalent amount Q (which will be described) is also taken into account to estimate the rate of flow of the fluid into the reservoir 44.

In the first embodiment, the amount of the fluid discharged from the reservoir 44 is estimated on the basis of the operating time of the pump 38 and the electric current of the motor 52. In the present fourth embodiment, the amount of the fluid discharged from the reservoir 44 is estimated on the vehicle deceleration as well as the operating time of the pump 38 and the electric current of the motor 52.

The anti-lock pressure control routine of FIG. 13(a) is initiated with step S250 to calculate the rotating speed Vw and acceleration DVw of the wheel in question, estimate the running speed Vso of the vehicle, and calculate the deceleration DVso of the vehicle. The control flow then goes to step S251 to determine whether a predetermined condition to initiate the anti-lock pressure control operation for the front wheel 14 has been satisfied, or the front wheel 14 is in the process of anti-lock pressure control operation. If a negative decision (NO) is obtained in step S251, the control flow goes to step S260. If an affirmative decision (YES) is obtained in step S251, that is, if the condition to initiate the anti-lock pressure control operation for the front wheel 14 or this wheel is already under the anti-lock pressure control operation, step S252 is implemented to determine the pressure control mode, namely, select one of the pressure increasing, holding and reducing modes, for the front wheel 14.

If the wheel in question is the rear wheel 18, similar determination is effected in step S251. In addition, similar determination is effected for the front wheel 14 which belongs to the same pressure application sub-system as the rear wheel 18 in question. That is, step S251 is implemented for the front right wheel 14 if the rear wheel 18 in question is the rear left wheel, and for the front left wheel if the rear wheel in question is the rear right wheel. The affirmative decision (YES) is obtained in step S251 if the predetermined condition to initiate the anti-lock pressure control operation for at least one of the front and rear wheels of the same pressure application sub-system has been satisfied or the anti-lock pressure control operation has been initiated for at least one of these front and rear wheels. In this case, step S252 is implemented. If the seventh pressure control mode is selected to reduce the pressure in the front wheel brake cylinder 16 according to the control map A of TABLE 2, that is, if the pressure reducing mode is selected for the front wheel 14, the pressure reducing mode (seventh pressure control mode) is also selected for the rear wheel 18 even when the condition to initiate the anti-lock pressure control operation for the rear wheel 18 has not been satisfied. Thus, step S252 is implemented for effecting the anti-lock pressure control operation for the front wheel 14 even when the anti-lock pressure control operation for the rear wheel 18 is not necessary.

If the affirmative decision (YES) is obtained in step S251 for the front wheel 14, a COEFFICIENT SELECTION flag is set to "1". If the affirmative decision (YES) is obtained in step S251 for only the rear wheel 18, the COEFFICIENT SELECTION flag is reset to "0". This flag is used for selecting flow-in rate coefficients A–F in step S255 which will be described. Since the pressure reducing passage 42 has a fluid flow resistance corresponding to a certain diameter of an equivalent pressure reducing orifice, the amount of the fluid which is introduced into reservoir 44 varies depending upon whether the fluid is discharged from both of the front and rear wheel brake cylinders 16, 20 or from only the rear wheel brake cylinder 20. Where the pressure reducing mode is selected for the front wheel 14, the pressure reducing mode is also selected for the rear wheel 18. Therefore, if the COEFFICIENT SELECTION flag is set at "1", it means that the fluid is discharged from both of the front and rear wheel brake cylinders 16, 20. If this flag is set at "0", it means that the fluid is discharged from only the rear wheel brake cylinder 20. For this reason, the fluid flow-in coefficients A–F are selected depending upon the current state of the COEFFICIENT SELECTION flag.

Step S252 is followed by step S253 to determine whether the pressure control mode determined in step S252 is the pressure reducing mode or not. If an affirmative decision (YES) is obtained in step S253, the control flow goes to steps S254–S256 of FIG. 13(b) to read the pressure reducing time tdx (represented by the content of the counter Cdx and the continuous pressure reducing time $T_{DX}$ (from the moment of initiation of the pressure reduction of the wheel brake cylinder to the moment of estimation of the reservoir fluid amount), estimate a fluid flow-in rate Kx (rate of flow of the fluid into the reservoir 44), and select the pressure reducing mode, that is, to set a flag for indicating that the pressure reducing mode has been selected. This flag is read in step S220 of the interruption routine of FIG. 12. The estimation in step S255 of the fluid flow-in rate Kx will be described later by reference to the flow charts of FIGS. 14 and 19.

If the selected pressure mode is not the pressure reducing mode, that is, if the pressure increasing or holding mode has been selected in step S252, the negative decision (NO) is obtained in step S253, and the control flow goes to step S257 to determine whether the pressure reducing mode was selected in the last control cycle. If an affirmative decision (YES) is obtained in step S257, namely, if the pressure reducing mode is replaced by the pressure increasing or holding mode, step S258 is implemented to reset or clear a time counter $C_{DX}$ which functions to measure the continuous pressure reducing time $T_{DX}$ during which the pressure reducing mode has been established for the wheel in question. This time counter $T_{DX}$ is incremented in step S311 of a pressure reducing gradient estimating routine of FIG. 20 which will be described. Step S258 is followed by step S259 to select the pressure increasing or holding mode, that is, to set a flag for indicating that the pressure increasing or holding mode has been selected. This flag is read in step S220 of the interruption routine of FIG. 12.

Then, the control flow goes to step S260 to determine whether the above steps S250–S259 have been implemented for all of the four wheels. If a negative decision (NO) is obtained in step S260, the control flow goes back to step S250 to repeat the steps S250–S259 for the next wheel. If an affirmative decision (YES) is obtained in step S260, that is, steps S250–S259 have been implemented for all of the front right and left wheels and the rear right and left wheels, the control flow goes to step S261 and the subsequent steps to estimate the reservoir fluid amount CRES(n). In the present embodiment, the reservoir fluid amount CRES(n) is estimated each time the steps S250–S259 have been implemented for all of the four wheels.

Step S261 is provided to calculate the fluid flow-out amount KPUMPUP, that is, the amount of the fluid which has been pumped up and delivered from the reservoir 44 by the pump 38. Step S261 is followed by step S262 to calculate the reservoir fluid amount CRES(n) according to the following equation:

$$CRES(n) = CRES(n-1) + tdf \times Kf + tdr \times Kr - KPUMPUP$$

The reservoir fluid amount CRES(n) is estimated on the basis of the fluid flow-in amount (tdf×Kf+tdr×Kr) and the fluid flow-out amount KPUMPUP during the estimating period between the moments of two successive implementations of step S262. In the above equation, "tdf" and "tdr" represent the pressure reducing times of the front and rear wheel brake cylinders 14, 18 (for the front right wheel 14 and the rear left wheel 18), respectively, while "Kf" and "Kr" represent the rates of flow of the fluid from these wheel brake cylinders 14, 18 into the reservoir 44, respectively. The reservoir fluid amount CRES(n) for the reservoir (not shown) for the other pressure application sub-system is similarly calculated. In this sub-system, the fluid is discharged into the reservoir from the wheel brake cylinders for the front left wheel and the rear right wheel. The fluid-flow out amount KPUMPUP will be described later.

Then, the control flow goes to steps S263 and S264 to store the calculated reservoir fluid amount CRES(n) as the last reservoir fluid amount CRES(n-1), and clear or reset the time counter Cdx for each wheel.

In the present fourth embodiment, too, the control map A or TABLE 2 or the control map B of TABLE 3 is selected depending upon the reservoir fluid amount CRES(n) estimated in the routine of FIG. 13(b).

Referring to the flow chart of FIG. 14, there will be described the routine for estimating the fluid flow-in rate Kx, which routine is implemented in step S255 of FIG. 13(b).

Figure 14:
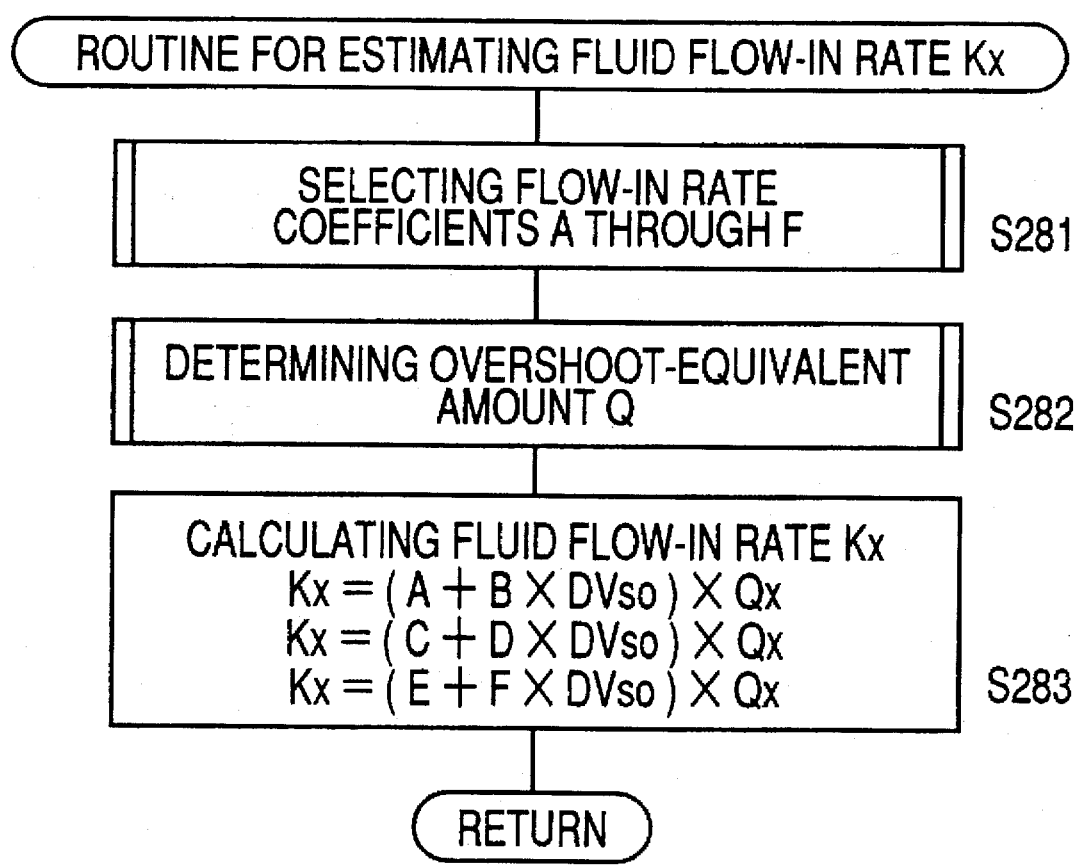
FIG. 14 is a flow chart illustrating a routine for estimating an amount of fluid flow into the reservoir, according to a control program stored in the read-only memory in the embodiment of FIG. 11.
Figure 22:
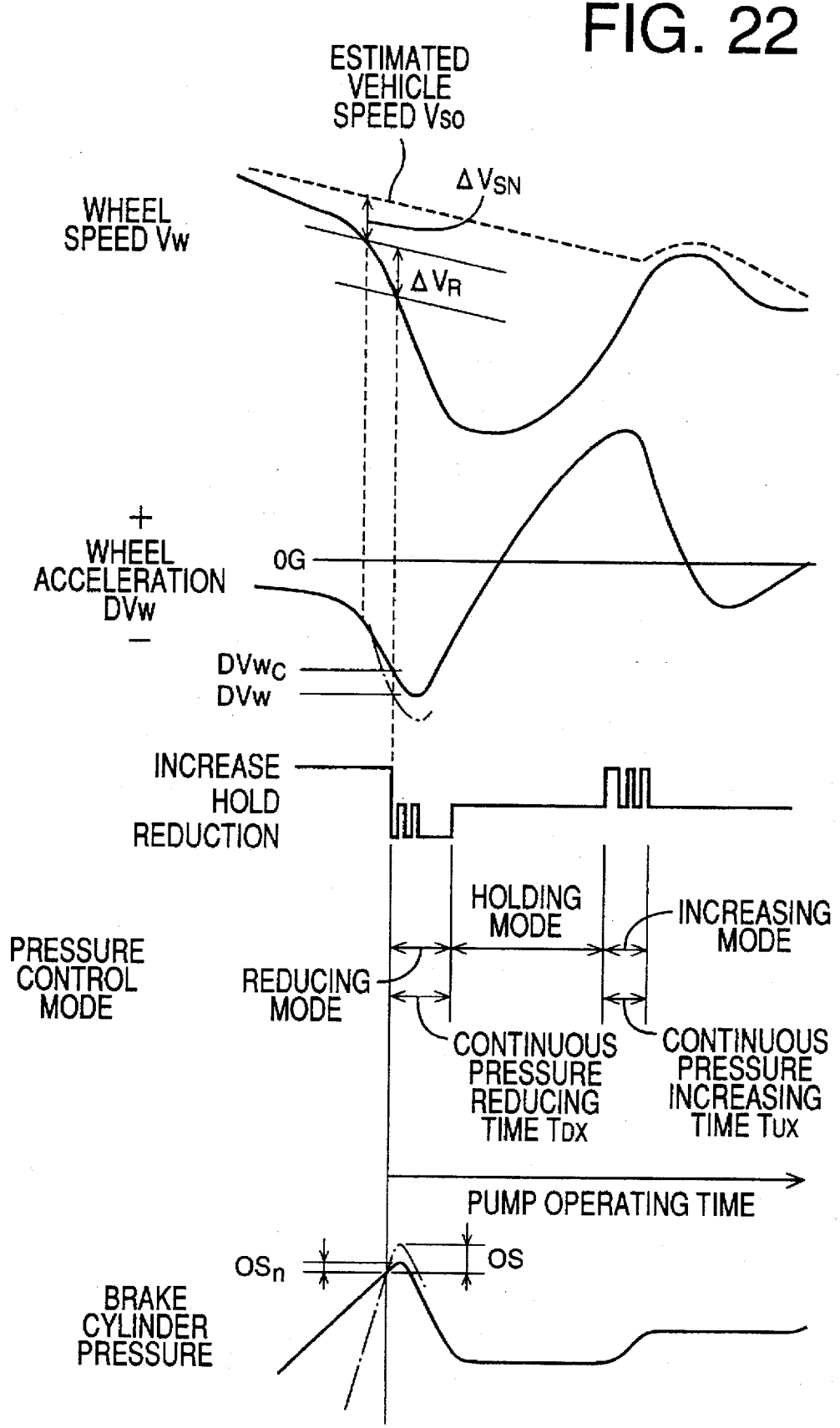
FIG. 22 is a view schematically illustrating an amount of overshoot of a wheel brake cylinder pressure upon initiation of an anti-lock pressure control operation in the embodiment of FIG. 11.

The routine of FIG. 14 is initiated with step S281 to obtain the pressure change index Px upon initiation of the pressure reduction of the wheel brake cylinder in question, and select the flow-in rate coefficients A–F on the basis of the obtained pressure change index Px and the continuous pressure reducing time TDX read in step S254 of FIG. 13(b). Step S281 is followed by step S282 to determine the overshoot-equivalent amount Qx when the pressure reducing mode was established for the first time for the wheel brake cylinder in question. The overshoot-equivalent amount Q corresponds to an amount of overshoot OS of the wheel brake cylinder pressure as indicated in the graph of FIG. 22, which will be described. The overshoot-equivalent amount Q need not be the overshoot amount OS per se, but may be any suitable amount corresponding the overshoot amount OS. After the overshoot-equivalent amount Qx immediately after the initiation of the pressure reduction of the wheel brake cylinder is obtained in step S282, the control flow goes to step S283 to estimate the fluid flow-in rate Kx according to one of the following equations:

$$Kx = (A + B \times DVso) \times Qx$$

$$Kx = (C + D \times DVso) \times Qx$$

$$Kx = (E + F \times DVso) \times Qx$$

Initially, the manner of selecting the fluid flow-in rate coefficients A–F in step S281 will be described in detail. The ROM of the controller 70 stores data maps for selecting the fluid-in rate coefficients A–F, as indicated in FIGS. 15 and 16. If the COEFFICIENT SELECTION flag is set at "1", that is, if the pressure reducing mode is established for the front wheel 14 (and the rear wheel 18), values Afr–Ffr included in the data map of FIG. 15 are selected as the flow-in rate coefficients A–F for the front wheel brake cylinder 16, and values Arf–Frf included in the data map of FIG. 16 are selected as the flow-in rate coefficients A–F for the rear wheel brake cylinder 20. If the COEFFICIENT SELECTION flag is set at "0", that is, if the pressure reducing mode is established for only the rear wheel 18, values Ar–Fr included in the data map of FIG. 16 are selected as the flow-in rate coefficients A–F for the rear wheel brake cylinder 20. The data maps of FIGS. 15 and 16 do not include the flow-in rate coefficients used in the case where the pressure reducing mode is established for only the front wheel 14, namely, where the fluid is discharged from only the front wheel brake cylinder 16. As indicated above, the braking system of FIG. 1 is adapted such that the fluid is discharged from both of the front and rear wheel brake cylinders 16, 20 when the pressure reducing mode is established for the front wheel 14. The flow-in rate coefficients in the data maps of FIGS. 15 and 16 are classified into three groups (A, B), (C, D) and (E, F). The flow-in rate coefficients (A, B) are selected if the continuous pressure reducing time $T_{DX}$ is shorter than a threshold $T_{D1}$. The coefficients (C, D) are selected if the time $T_{DX}$ is within a range between the threshold $T_{D1}$ (inclusive) and a threshold $T_{D2}$ (inclusive). The coefficients (E, F) are selected if the time $T_{DX}$ is longer than the threshold $T_{D2}$.

Assuming that the friction coefficient μ of the road surface during the anti-lock pressure control operation is the same for all wheels 14, 18, the fluid pressure in each wheel brake cylinder 16, 20 can be estimated on the basis of the vehicle deceleration. The resistance to flow of the fluid discharged from each wheel brake cylinder 16, 20 is determined by the length, diameter, cross sectional shape and other specifications of the pressure reducing passage 42 and the secondary fluid passage 24, and the specifications of the pressure reducing valve device 60 provided in the secondary fluid passage 24. The diameter of the equivalent pressure reducing orifice described above with respect to the COEFFICIENT SELECTION flag is equivalent to the flow resistance determined by the parameters of the passages 24, 42 and the specifications of the valve device 60.

Figure 17:
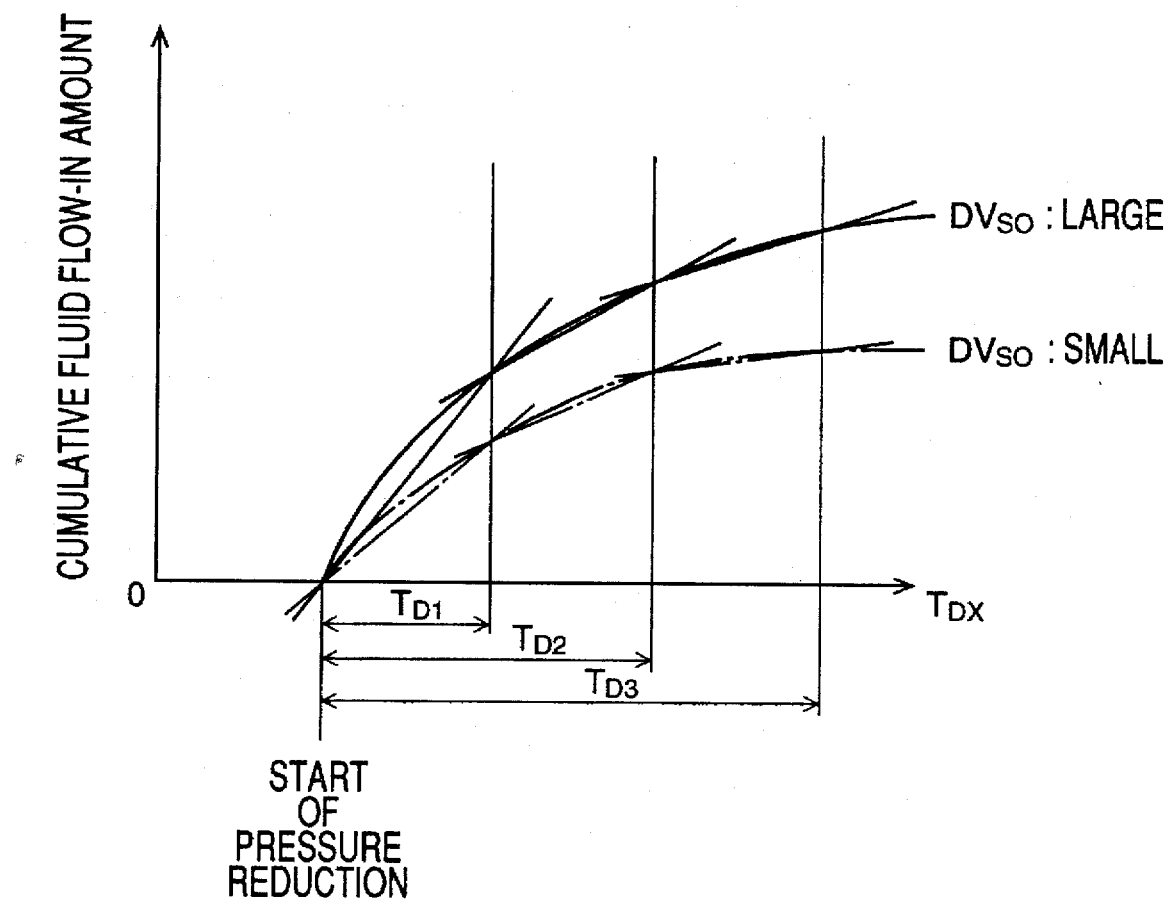
FIG. 17 is a graph indicating relationships between the cumulative amount of the fluid flow into the reservoir and the continuous pressure reducing time.
Figure 18:
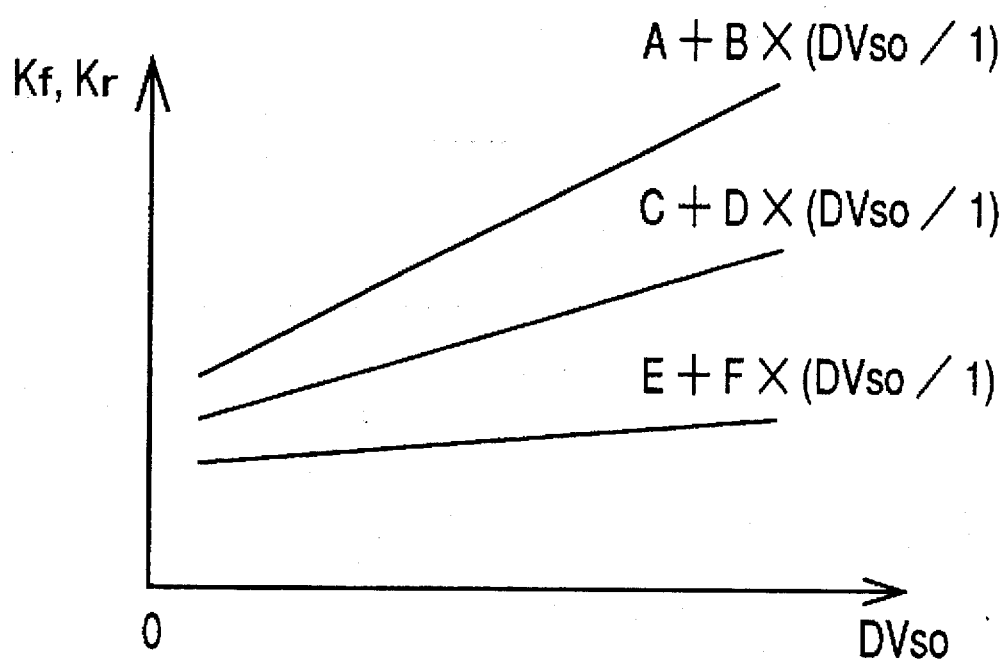
FIG. 18 is a graph indicating relationships between the fluid flow-in coefficients and acceleration of the vehicle body.

The cumulative amount of flow of the fluid into the reservoir 44 varies as indicated generally in the graph of FIG. 17, when the wheel brake cylinder pressure is continuously reduced from different values (corresponding to the different vehicle deceleration values). In this respect, it is noted that the curves of the fluid flow-in amount in the graph of FIG. 16 differ when the fluid is discharged from only the rear wheel brake cylinder 20 and when the fluid is discharged from both of the front and rear wheel brake cylinders 16, 20. Further, when the fluid is discharged from the front and rear wheel brake cylinders 16, 20, the curves of the fluid flow-in amounts from these two brake cylinders into the reservoir 44 differ from each other. Three graphs as indicated in FIG. 17 are obtained by actual measurement of the amounts of the fluid flows from the wheel brake cylinders 16, 20 into the reservoir 44. These three graphs correspond to the fluid flow from only the rear wheel brake cylinder 20, and the fluid flows from the front and rear wheel brake cylinders 16, 20, respectively, when the fluid is discharged from both of these two brake cylinders. Based on these three graphs, relationships between the vehicle deceleration DVso and the flow-in rate Kx (Kf, Kr) are represented by respective straight lines as indicated in the graph of FIG. 18. The three relationships correspond to respective ranges of the continuous pressure reducing time $T_{DX}$ defined by the threshold $T_{D1}$ and $T_{D2}$. The data map of FIGS. 15 and 16 for selecting the fluid flow-in rate coefficients A–F are formulated based on the thus obtained linear relationships.

The actual measurement of the amounts of the fluid flows from the wheel brake cylinders 16, 20 can be achieved by the outputs of two flow meters adapted to measure the amounts of the fluid flows through respective two portions of the secondary fluid passage 24 which directly communicate with the front and rear wheel brake cylinders 26, 20, respectively. The measurement is made during brake application of the vehicle for different vehicle deceleration values on a road surface whose friction coefficient is sufficiently high. More specifically, after the brake application is stabilized, the cut-off valve 30 is closed, and the pressure reducing valve 46 and the pressure increasing and reducing valve 40 are both opened to keep reducing the pressures in the front and rear wheel brake cylinders 16, 20. The outputs of the two flow meters represent the amounts of the fluid flows from these two brake cylinders 16, 20, respectively. Further, only the pressure reducing valve 46 is opened with the cut-off valve 30 being closed, to keep reducing the pressure in the rear wheel brake cylinder 20. The output of the corresponding flow meter represents the amount of the fluid from only the rear wheel brake cylinder 20. Thus, the continuously changing amounts of the fluid from from the wheel brake cylinders 16, 20 are measured on the basis of the changing outputs of the flow meters. Alternatively, relatively heavy brakes are applied to the vehicle on various road surfaces having different friction coefficients (however, each road surface having a uniform friction coefficient over the entire surface area), so as to cause the braking system to perform anti-lock pressure control operations, during which the amount of the fluid flow from only the rear wheel brake cylinder 20 and the amounts of the fluid flows from both of the front and rear wheel brake cylinders 16, 20 are measured on the basis of the outputs of the flow meters.

To obtain the linear relationships of FIG. 18 between the vehicle deceleration DVso and the fluid flow-in rate Kx on the basis of the curves of FIG. 17, each curve of FIG. 17 is approximated by three straight lines corresponding to the respective three ranges of the continuous pressure reducing time $T_{DX}$, which ranges are defined by the threshold $T_{D1}$ and $T_{D2}$. The gradients of the approximating straight lines represent the fluid flow-in rate Kx. The relationships between the flow-in rate Kx and the vehicle deceleration DVso corresponding to each approximating straight line as indicated in FIG. 17 can be approximated by the straight lines as indicated in FIG. 18.

In step S281, the fluid flow-in rate values Ar–Af, Afr–Ffr or Arf–Frf are selected depending upon whether the fluid is discharged from only the rear wheel brake cylinder 20, or from both of the front and rear wheel brake cylinders 16, 20, namely, depending upon the currently established state of the COEFFICIENT SELECTION flag described above with respect to step S251, which indicates the operating states of the pressure reducing valve 46 and the pressure increasing and reducing valve 40.

While the above explanation is based on the assumption that the friction coefficient of the road surface is uniform for all the vehicle wheels, the areas of the road surface on which the wheels lie actually have different friction coefficient values. Therefore, the actual fluid pressures in the wheel brake cylinders 16, 20 for the individual wheels running on the uneven-friction-coefficient road surface differ from the nominal values where the road surface coefficient is even for all the wheels. In view of this fact, the present embodiment uses the pressure change index Px indicated above. If this index Px is a negative value, the wheel brake cylinder pressure is estimated lower than that if the index Px is a positive value, so that comparatively smaller values A'–F' are selected as the flow-in rate coefficients A–F if the index Px is negative.

In the present embodiment, the pressure change index Px indicates whether the amount of the fluid discharged from the wheel brake cylinder in question in the last pressure reduction is larger or smaller than the amount of the fluid supplied to the wheel brake cylinder in the last pressure increase. The index Px is negative if the amount of the fluid discharged from the wheel brake cylinder is larger than the amount of the fluid supplied to the wheel brake cylinder, and positive if the discharged fluid amount is smaller than the supplied fluid amount. That is, the index Px is a negative value if the pressure in the wheel brake cylinder upon initiation of the present pressure reduction is lower than that upon initiation of the last pressure reduction, and is a positive value if the former pressure is higher than the latter pressure. When the index Px is negative, the present brake cylinder pressure and the present fluid flow-in rate Kx are respectively lower and smaller than those when the index Px is positive.

The pressure change index Px may be obtained on the basis of: last pressure increasing time during which the brake cylinder pressure is increased in the last pressure increase preceding the present pressure reduction; last pressure reducing time during which the brake cylinder pressure is reduced in the last pressure reduction preceding the last pressure increase; and ratio of the gradient of the last pressure reduction to the gradient of the last pressure increase. The index Px is larger when the last pressure increasing time is relatively long than when it is relatively short, if the other conditions are constant.

Figure 19A:
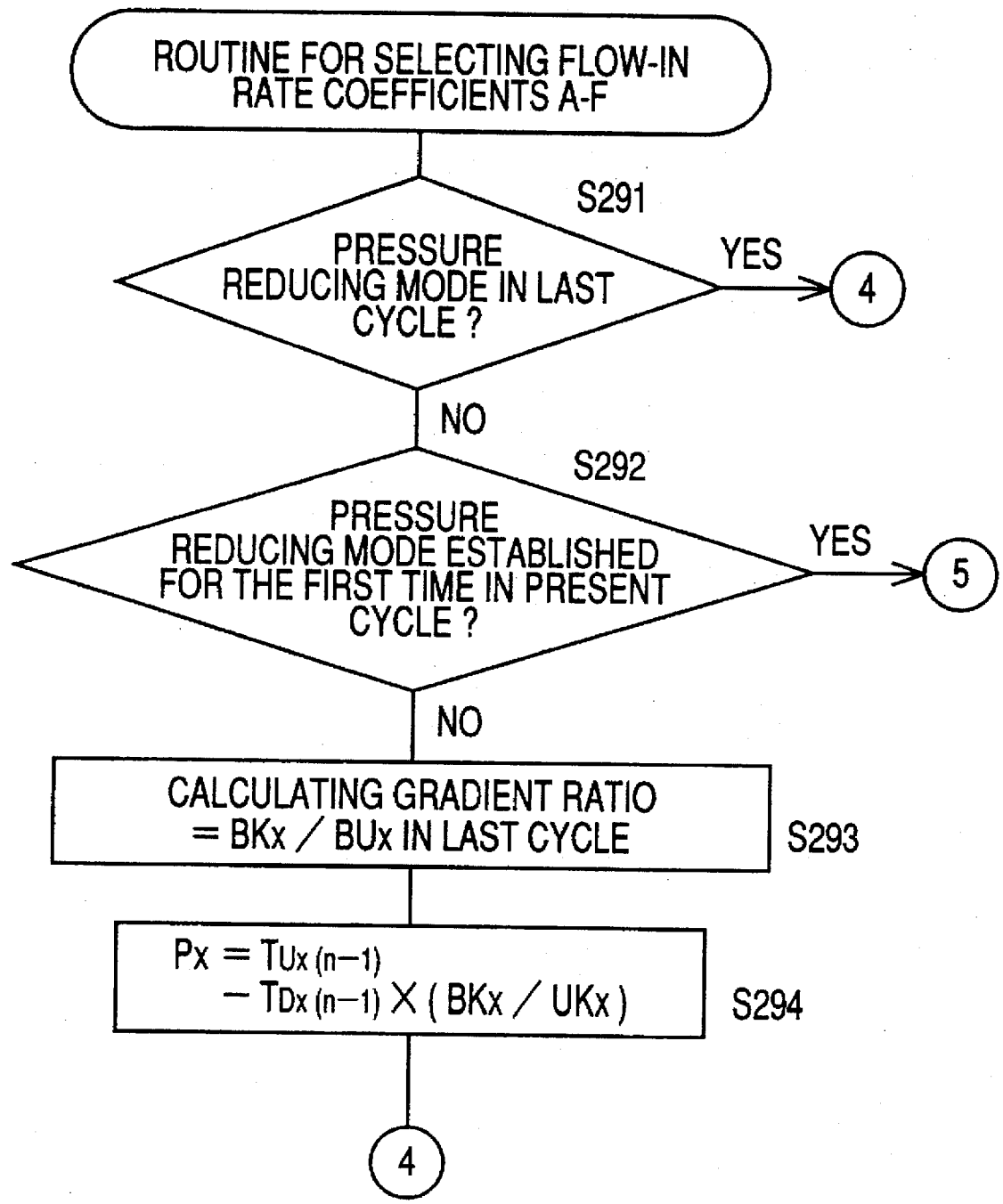
FIGS. 19(a) and 19(b) are flow charts illustrating a routine for determining the fluid flow-in coefficients, according to a control program stored in the read-only memory in the embodiment of FIG. 11.
Figure 19B:
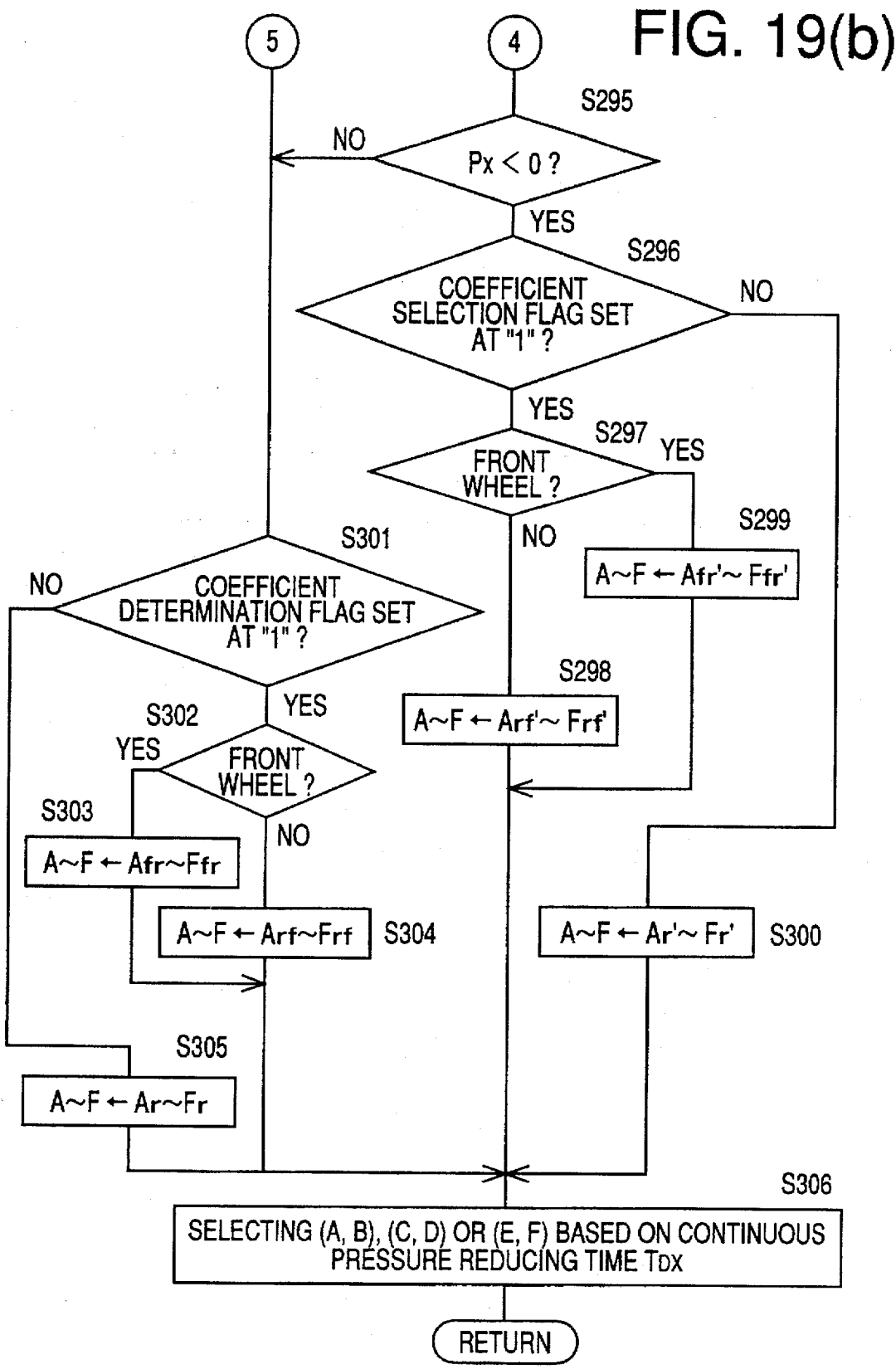

Referring to the flow charts of FIGS. 19(a) and 19(b), the operation in step S281 of FIG. 14 for selecting the flow-in rate coefficients A–F will be described in detail. The routine of FIG. 19 is initiated with step S291 to determine whether the pressure reducing mode was established in the last control cycle. While the pressure change index Px is obtained in step S294, this routine is formulated so that the step S294 is implemented only when pressure reduction of the wheel brake cylinder in question is initiated, that is, only when the pressure increasing or holding mode is replaced by the pressure increasing mode. If an affirmative decision (YES) is obtained in step S291, the control flow goes to step S295 of FIG. 19(b) and the subsequent steps which will be described.

If a negative decision (NO) is obtained in step S291, the control flow goes to step S292 to determine whether the pressure reducing mode is established for the first time in an anti-lock pressure control operation. Since the following step S293 is implemented on the basis of the gradients of the last pressure increase and decrease, the control flow goes to step S301 while skipping steps S293 and S294 if the pressure reducing mode is established for the first time in the present control cycle, that is, if an affirmative decision (YES) is obtained in step S292. In this case, the pressure in the wheel brake cylinder is usually relatively high, and the flow-in rate coefficients A–F are selected as in the case where the pressure change index Px is a positive value, that is, as in the case where a negative decision (NO) is obtained in step S295. Therefore, step S292 is followed by step S301 if the affirmative decision (YES) is obtained in step S292.

If a negative decision (NO) is obtained in step S292, it means that the pressure reducing mode has been established (affirmative decision is obtained in step S253) but is not established for the first time in the present control cycle. In this case, the control flow goes to step S293 to calculate a last pressure changing ratio, which is a ratio of a gradient BKx of the last pressure reduction to a gradient BUx of the last pressure increase. Namely, this ratio (BKx/BUx) is obtained by dividing the last pressure reducing gradient BKx estimated according to a routine of FIG. 20, by the last pressure increasing gradient BUx estimated according to a routine of FIG. 21. These routines will be described- A pressure reducing gradient <Kx> is estimated as an average of the amount of the fluid discharged from each of the front and rear wheel brake cylinders 16, 20 per unit time. Similarly, a pressure increasing gradient <Ux> is estimated as an average of the amount of the fluid supplied to each of the two wheel brake cylinders 16, 20 per unit time.

Step S293 is followed by step S294 to calculate the pressure change index Px according to the following equation:

$$Px = T_{UX(n-1)} - T_{DX(n-1)} \times (BKx/BUx)$$

where, $T_{DX(n-1)}$ represents a last continuous pressure reducing time during which the pressure reducing mode has been established (time period between the moment at which the last pressure reducing mode was established and the moment at which this pressure reducing mode is replaced by the pressure increasing or holding mode), while $T_{UX(n-1)}$ is a last continuous pressure increasing time during which the pressure increasing mode has been established (time period between the moment at which the last pressure increasing mode was established and the moment at which this pressure increasing mode is replaced by the pressure holding or reducing mode).

When the pressure change index Px is a negative value, an affirmative decision (YES) is obtained in step S295, and the control flow goes to step S296 to determine whether the COEFFICIENT SELECTION flag is set at "1" or not. If an affirmative decision (YES) is obtained in step S296, step S297 is implemented to determine whether the wheel in question is the front wheel 14.

If the fluid is discharged from both of the front and rear wheel brake cylinders 16, 20 and the wheel in question is the front wheel 14, the affirmative decision (YES) is obtained in steps S296 and S297, and the control flow goes to step S298 to select the values Afr'–Ffr' as the flow-in rate coefficients A–F.

If the fluid is discharged from both of the front and rear wheel brake cylinders 16, 20 and the wheel in question is the rear wheel 18, the negative decision (NO) is obtained in step S297, and the control flow goes to step S297 to select the values Arf'–Frf' as the coefficients A–F. If the fluid is discharged from only the rear wheel brake cylinder 20, the negative decision (NO) is obtained in step S296, and the control flow goes to step S300 to select the values Ar'–Fr' as the coefficients A–F for the rear wheel 18. Step corresponding to step S297 is not necessary if the negative decision (NO) is obtained in step S296, that is, if the COEFFICIENT SELECTION flag is set at "0", because it is not necessary to select the coefficients A–F for the front wheel 14.

When the pressure change index Px is equal to zero or a positive value, the negative decision (NO) is obtained in step S295, and the control flow goes to step S301 as in the case where the affirmative decision (YES) is obtained in step S292 as described above. Step S301 is provided to determine whether the COEFFICIENT SELECTION flag is set at "1" or not. If an affirmative decision (YES) is obtained in step S301, step S302 is implemented to determine whether the wheel in question is the front wheel 14.

If the fluid is discharged from both of the front and rear wheel brake cylinders 16, 20 and the wheel in question is the front wheel 14, the control flow goes to step S303 to select the values Afr–Ffr as the flow-in rate coefficients A–F for the front wheel 14. If the wheel in question is the rear wheel 18, the control flow goes to step S304 to select the values Arf–Frf as the flow-in rate coefficients A–F for the rear wheel 18. If the fluid is discharged from only the rear wheel brake cylinder 20, the control flow goes to step S305 to select the values Ar–Fr as the coefficients A–F for the rear wheel 20.

Steps S298–S300 and S303–S305 are followed by step S306 to select the coefficients (A, B), (C, D) or (E, F) on the basis of the continuous pressure reducing time $T_{DX}$. It is noted that a pressure reducing operation for the front wheel brake cylinder 16 may be initiated while a pressure reducing operation is performed for only the rear wheel brake cylinder 20. Therefore, steps S295–S306 are implemented if the affirmative decision (YES) is obtained in step S291, that is, during the period of the pressure reducing operation for the wheel in question.

There will be briefly explained the manners of estimating the pressure reducing and increasing gradients <Kx>, <Ux>.

The pressure reducing gradient <Kx> is an average of the rate of flow of the fluid from the wheel brake cylinder in question into the reservoir 44. The routine of FIG. 20 for estimating the pressure reducing gradient Kx is executed for each wheel brake cylinder.

The routine of FIG. 20 is initiated with step S310 to determine whether the pressure reducing mode is established for the wheel in question. If an affirmative decision (YES) is obtained in step S310, the control flow goes to step S311 to increment the time counter $C_{DX}$ to measure the continuous pressure reducing time $T_{DX}$. Step S311 is followed by step S312 and S313 to read the fluid flow-in rate Kx calculated in step S283 and calculate the pressure reducing gradient <Kx>, which is an average of the flow-in rate values Kx which have been obtained so far in step S283.

If a negative decision (NO) is obtained in step S310, that is, if the pressure increasing or holding mode is established, the control flow goes to step S314 to determine whether the pressure reducing mode was established for the wheel in question. If the pressure reducing mode established in the last control cycle has been changed to the pressure increasing or holding mode in the present control cycle, an affirmative decision (YES) is obtained in step S314, and the control flow goes to step S315 to set the present pressure reducing gradient <Kx> as the last pressure reducing gradient BKx, reset the present value <Kx> to zero, and set the present continuous pressure reducing time $T_{DX(n)}$ as the last continuous pressure reducing time $T_{DX(n-1)}$.

The pressure increasing gradient <Ux> is estimated as an average of the amount of flow of the fluid into the wheel brake cylinder per unit time while the pressure increasing mode is established for the wheel brake cylinder. Although the pressurized fluid delivered from the pump 38 is supplied to the wheel brake cylinder in question, the rate of flow of the fluid into the wheel brake cylinder differs depending upon whether the pressurized fluid is supplied from the pump 38 to both of the front and rear wheel brake cylinders 16, 20 or to only the wheel brake cylinder in question. If the pressure increasing mode is established for only one of the front and rear wheel brake cylinders 16, 20, the fluid delivered from the pump 38 is entirely supplied to the wheel brake cylinder in question. In this case, the delivery rate KPUMPUP (delivery amount per unit time) of the pump 28 can be estimated as the pressure increasing gradient <Ux>. If the pressure increasing mode is established for both of the front and rear wheel brake cylinders 16, 20, the amount of the fluid to be supplied to the wheel brake cylinder in question is determined by a distribution ratio Sx, which is a ratio of the amount of the fluid delivery from the pump 38 to the wheel brake cylinder in question to the amount of the fluid delivery to the other wheel brake cylinder in the same pressure application sub-system. Like the flow-in rate coefficients A–F which are determined as described above, the distribution ratios Sf, Sr for the front and rear wheel brake cylinders 16, 20 are determined on the basis of the vehicle deceleration value, construction of the pressure reducing valve device 60, pressure increasing and reducing valve 40 and P valve 36 (including the critical pressure level of the P valve 36), specifications of the primary and secondary fluid passages 20, 24, and specifications of the wheel brake cylinders 16, 20. In the present embodiment, relationships between the distribution ratios Sf, Sr and the vehicle deceleration value are obtained by experiments, and represented by data maps stored in the ROM of the controller 70. It is noted that a sum of the ratios Sf and Sr is equal to 1, i.e., Sf+Sr=1.

The routine for estimating the pressure increasing gradient <Ux> will be described by reference to the flow chart of FIG. 21. This routine is initiated with step S321 to determine whether the pressure increasing mode is established for the wheel brake cylinder in question. If an affirmative decision (YES) is obtained in step S321, the control flow goes to step S322 to increment a time counter $C_{UX}$ to measure the continuous pressure reducing time $T_{UX}$. Then, step S323 is implemented determine whether the pressure reducing mode is established for the other wheel brake cylinder in the same pressure application sub-system using the same pump 38. If the two pressure increasing mode is established for both the front and rear wheel brake cylinders in the same sub-system, an affirmative decision (YES) is obtained in step S323, and the control flow goes to step S324 to determine the distribution ratio Sx (Sf, Sr) for the wheel brake cylinder in question, on the basis of the vehicle deceleration and according to the data map indicated above.

Then, the control flow goes to step S325 to estimate the amount of flow Ux of the fluid into the wheel brake cylinder per unit time (rate of flow Ux), by multiplying the delivery rate KPUMPUP of the pump 38 by the distribution ratio Sx. Step S326 is then implemented to calculate the pressure increasing gradient <Ux>, which is an average of the flow rate values Ux which have been obtained so far in step S325.

If the pressure increasing mode is not established for the other wheel brake cylinder, a negative decision (NO) is obtained in step S323, and the control flow goes to S327 to set the distribution ratio Sx to "1". In this case, the flow rate Ux calculated in step S325 is equal to the delivery rate KPUMPUP of the pump 38.

If the currently established pressure control mode for the wheel brake cylinder in question is other than the pressure increasing mode, a negative decision (NO) is obtained in step S321, and the control flow goes to step S328 to determine whether the pressure increasing mode was established in the last control cycle. If the pressure increasing mode established in the last control cycle has been changed to the pressure reducing or holding mode, an affirmative decision (YES) is obtained in step S328, and the control flow goes to step S329 to set the present pressure increasing gradient <Ux> as the last pressure increasing gradient BUx and reset the present value <Kx> to zero. Then, step S330 is implemented to set the present continuous pressure increasing time $T_{UX(n)}$ as the last continuous pressure increasing time $T_{UX(n-1)}$, and clear the time counter $C_{UX}$.

Referring to step S293 of FIG. 19, the gradient ratio is calculated by dividing the last pressure reducing gradient BKx obtained in step S315, by the last pressure increasing gradient BUx obtained in step S329.

There will next be described the manner of determining in step S282 the overshoot-equivalent amount Qx corresponding to the overshoot of the wheel brake cylinder pressure. The overshoot-equivalent amount Qx is determined only when the pressure reducing mode is established for the first time in one anti-lock pressure control operation is initiated. Generally, the amount of overshoot of the pressure of the wheel brake cylinder is comparatively largely influenced by an operating speed of the brake pedal 12, immediately after the pressure reducing mode is established for the first time to initiate the anti-lock pressure control operation. Namely, the pressure increasing gradient of the master cylinder 10 and the wheel brake cylinder increases with an increase in the operating speed of the brake pedal 12, and the overshoot amount of the wheel brake cylinder pressure is larger when the pressure reducing mode is established for the first time than when it is established subsequently during the anti-lock pressure control operation. In the present embodiment, the overshoot-equivalent amount Qx is determined on the basis of the vehicle deceleration value DVw.

As indicated at OS in the graph of FIG. 22, the overshoot amount of the brake cylinder pressure is relatively large when the pressure increasing gradient of the brake cylinder pressure is relatively large. That is, the amount of the delayed pressure increase of the brake cylinder tends to increase with an increase in the pressure increasing gradient of the brake cylinder pressure, and the rate of flow Kx of the fluid into the reservoir 44 increases with an increase in the overshoot amount.

When the pressure increasing gradient of the brake cylinder is relatively large, the brake cylinder pressure and the vehicle deceleration DVw upon initiation of the pressure reduction are higher than when the pressure increasing gradient is relatively small. Accordingly, the overshoot amount can be estimated on the basis of the vehicle deceleration DVw.

In the present fourth embodiment, the overshoot amount when the brake pedal 12 is operated at an ordinary speed is used as a reference overshoot amount, and the vehicle deceleration DVw corresponding to this reference overshoot amount is used as a reference vehicle deceleration DVwc. The overshoot-equivalent amount Qx is obtained by multiplying a ratio (DVwx/DVwc) of the actual vehicle deceleration DVWx to the reference vehicle deceleration DVWc, by a predetermined coefficient R. Therefore, the overshoot-equivalent amount Qx increases with an increase in the vehicle deceleration DVw. This means that the actual overshoot amount OS is estimated to increase with the vehicle deceleration DVw. Further, the brake cylinder pressure upon initiation of the pressure reduction is estimated to increase with the overshoot-equivalent amount Qx.

The coefficient R is determined such that the lower limit of the overshoot-equivalent amount Qx is "1".

Figure 23:
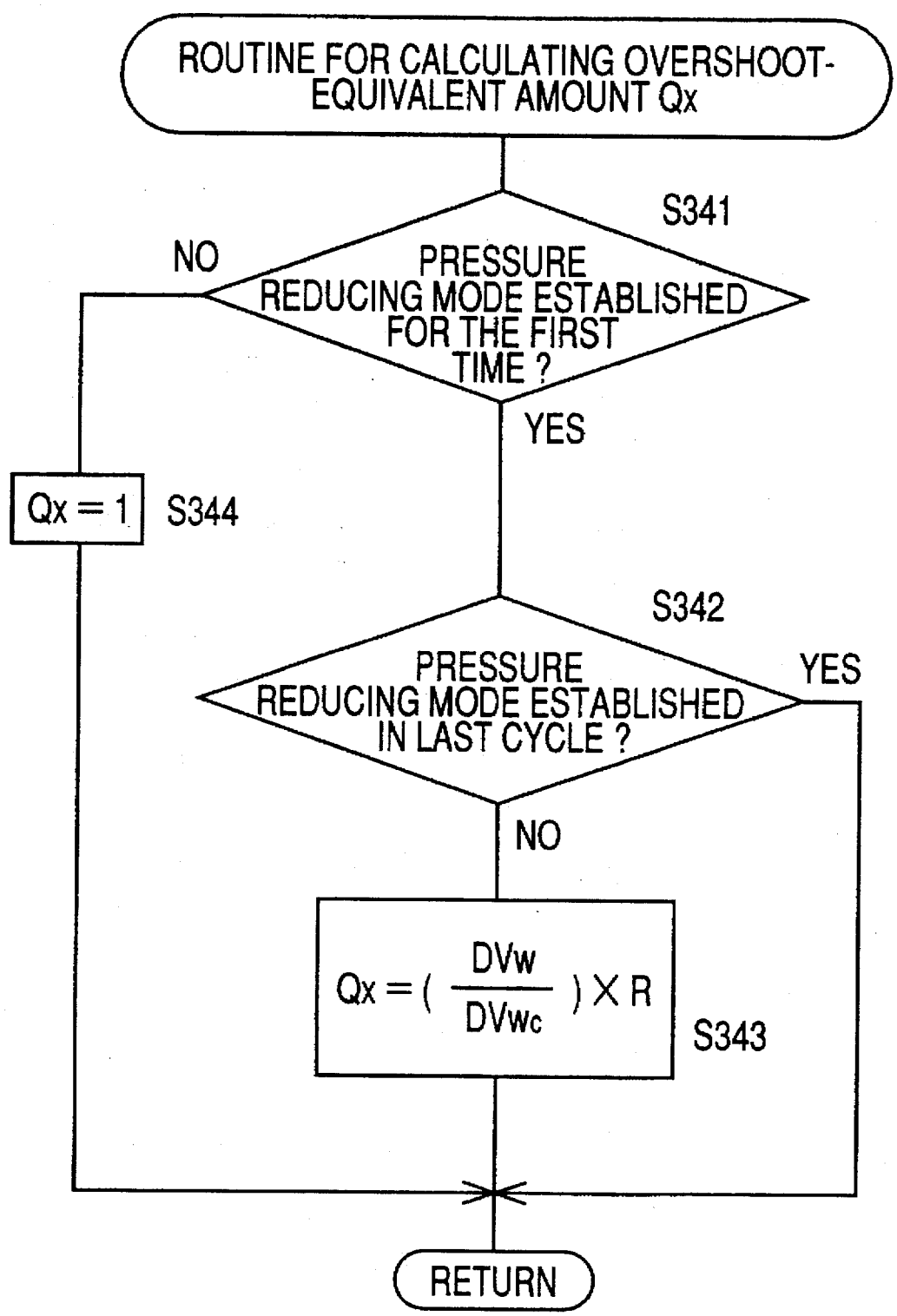
FIG. 23 is a flow chart of a routine for calculating an overshoot-equivalent amount in the embodiment of FIG. 11.

Referring to the flow chart of FIG. 23, there is illustrated a routine for calculating the overshoot-equivalent amount Qx. This routine is initiated with step S341 to determine whether the pressure reducing mode has been established for the first time in an anti-lock pressure control operation. If an affirmative decision (YES) is obtained in step S341, step S342 is implemented to determine whether the pressure reducing mode was established in the last control cycle. If the pressure reducing mode has been established for the first time but was not established in the last control cycle, it means that the pressure reducing mode is established for the first time in the present control cycle so as to initiate the anti-lock pressure control operation. In this case, the affirmative decision (YES) is obtained in step S341 while a negative decision (NO) is obtained in step S342, and the control flow goes to step S343 to calculate the overshoot-equivalent amount Qx.

If the pressure reducing mode was established in the last control cycle, it means that the pressure reducing mode is not established for the first time in the present control cycle and that the pressure in the wheel brake cylinder in question is in the process of being reduced. In this case, step S343 is not implemented. Thus, the overshoot-equivalent amount Qx calculated when the pressure reducing mode was established for the first time is used during the pressure reducing operation. If the pressure control mode is not the pressure reducing mode established for the first time in the anti-lock pressure control operation, a negative decision (NO) is obtained in step S341, and the control flow goes to step S344 to set the overshoot-equivalent amount Qx to "1".

As described above, the present fourth embodiment is adapted to select the flow-in rate coefficients A–F depending upon the pressure change index Px, and estimate the fluid flow-in rate Kx on the basis of the flow-in rate coefficients A–F and depending upon the overshoot-equivalent amount Qx, whereby the accuracy of estimation of the fluid flow-in rate Kx is improved. That is, the use of the pressure change index Px and the overshoot-equivalent amount Qx to estimate the fluid flow-in rate Kx assures improved estimation accuracy of the cumulative amount of the fluid which has been introduced into the reservoir 44.

There will next be explained the manner of estimating the fluid flow-out amount KPUMPUP, that is, the cumulative amount of flow of the fluid which has been pumped up and delivered from the reservoir 44 by the pump 38. In the present embodiment, the fluid flow-out amount KPUMPUP is estimated on the basis of the operating speed of the motor 52, the inertia of the rotating members of the motor 52, and the vehicle deceleration DVso during an estimating interval. During an anti-lock pressure control operation for the wheel brake cylinder in question, the pump 38 is held on to continuously pump up the fluid from the reservoir 44. Accordingly, the estimating interval is equal to the operating time of the pump 38 or motor 52.

Figure 24:
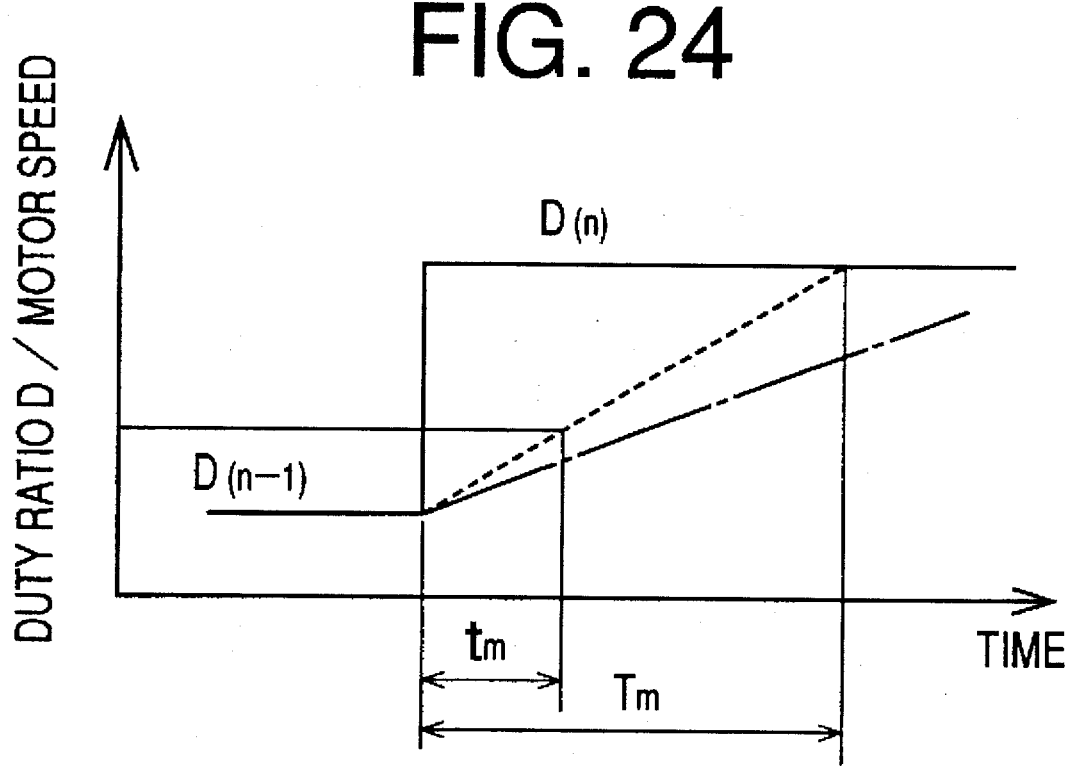
FIG. 24 is a graph indicating a relationship between an electric current applied to a pump motor of the braking system and the time.

The delivery rate KPUMPUP of the pump 38 increases with an increase in the operating speed of the motor 52. The driver circuit for driving the motor 52 is controlled by the controller 70 to control the duty ratio D of the motor 52 such that the operating speed of the motor 52 increases with an increase in the electric current to be applied thereto. However, the operating speed of the motor 52 do not change with a high response to a change in the duty ratio D from D(n–1) to D(n) as indicated in the graph of FIG. 24. Namely, the operating speed of the motor 52 relatively slowly changes with a time delay Tm with respect to the change of the duty ratio D, as indicated by broken line in FIG. 24. This time delay Tm increases with an increase in the inertia of the motor 52.

Assuming that the speed of the motor 52 linearly changes after the moment of change of the duty ratio D from D(n–1) to D(n), the speed of the motor 52 can be estimated on the basis of a speed-equivalent value I which is calculated according to the following equation:

$$I=D(n-1)+[D(n)-D(n-1)]\times tm/Tm$$

where, tm represents the time which passes after the moment of change of the duty ratio D. The time delay Tm is a constant determined by the inertia of the motor 52.

It will be understood from the above equation that the speed-equivalent value I is equal to "1" when the duty ratio D is equal to "1" (100% duty). The value I calculated according to the above equation represents a value corresponding to the speed of the motor 52 when the time tm has passed after the duty ratio D has changed. It is possible to estimate the motor speed and the delivery rate of the pump 38 such that the motor speed and the delivery rate increase with an increase of the calculated speed-equivalent value I toward the upper limit of "1".

The rate of flow of the fluid from the reservoir 44 decreases with an increase in the pressure in the wheel brake cylinder to which the pressurized fluid is delivered from the pump 38. As the pressure in the wheel brake cylinder in question is increased, the delivery pressure of the pump 38 increases, and the delivery rate of the pump 38 accordingly decreases. In the present embodiment, an amount of influence of the vehicle deceleration DVso on the delivery rate of the pump 38 is estimated as a deceleration influence value {G–H×(DVso/1)}. The values G and H are initial values when the vehicle deceleration DVso is 1G, and are constants determined by the specifications of the motor 52. The deceleration influence value {G–H×(DVso/1)} decreases with an increase in the vehicle deceleration DVso. It is possible to estimate the delivery rate of the pump 38 such that the delivery rate decreases with an increase in the vehicle deceleration.

Thus, it is possible to estimate the delivery rate of the pump 38 such that the delivery rate increases with an increase in the speed-equivalent value I and decreases with an increase in the vehicle deceleration DVso (with a decrease in the deceleration influence value). Therefore, the cumulative amount KPUMPUP of flow of the fluid which has been pumped up from the reservoir 44 by the pump 38 (cumulative fluid flow-out amount KPUMPUP) during the estimating interval can be estimated according to the following equation:

$$KPUMPUP=\{G-H\times(DVso/1)\}\times I$$

Figure 25A:
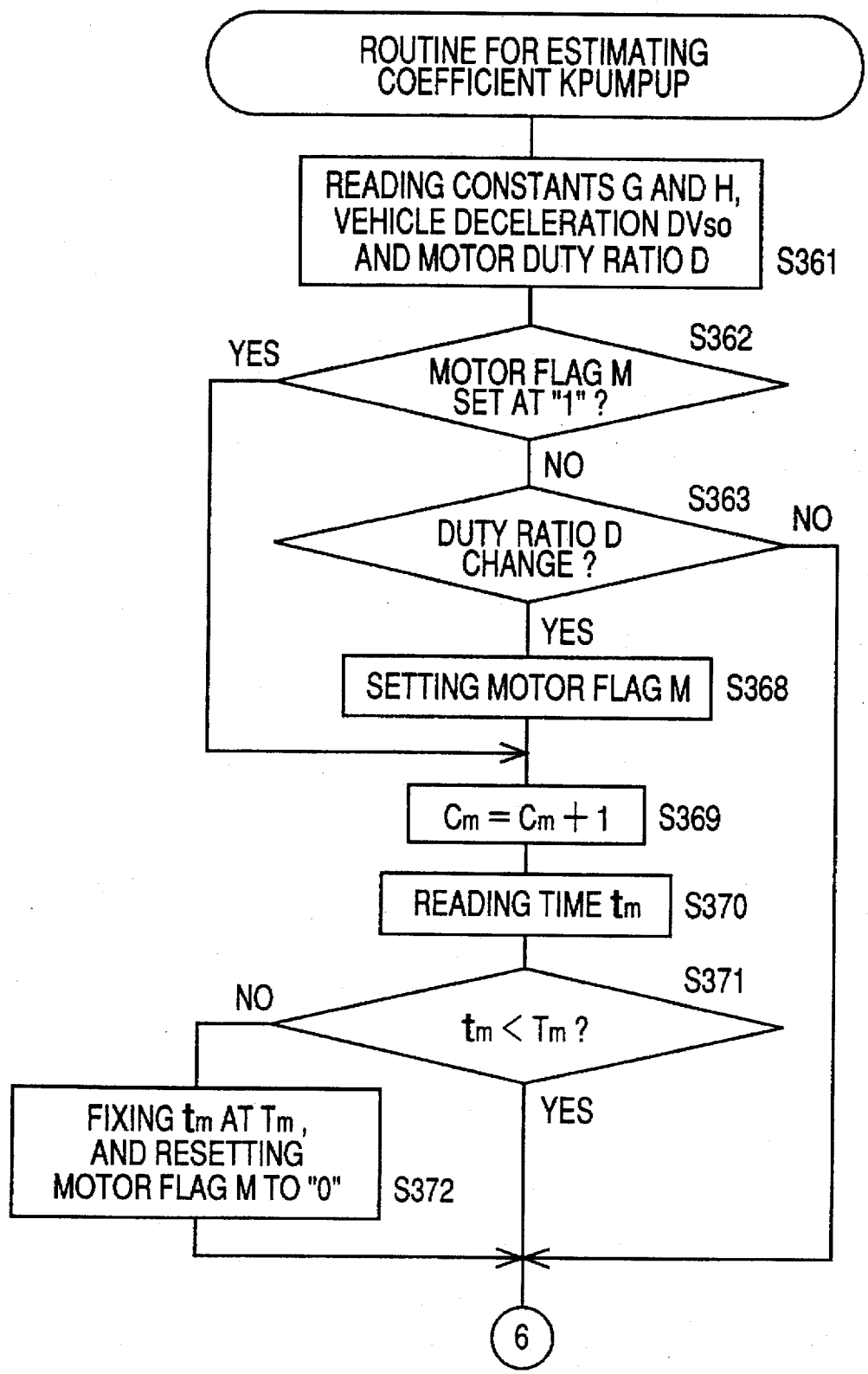
FIGS. 25(a) and 25(b) are flow charts of a routine for estimating a cumulative amount of fluid flow from the reservoir, in the embodiment of FIG. 11.
Figure 25B:
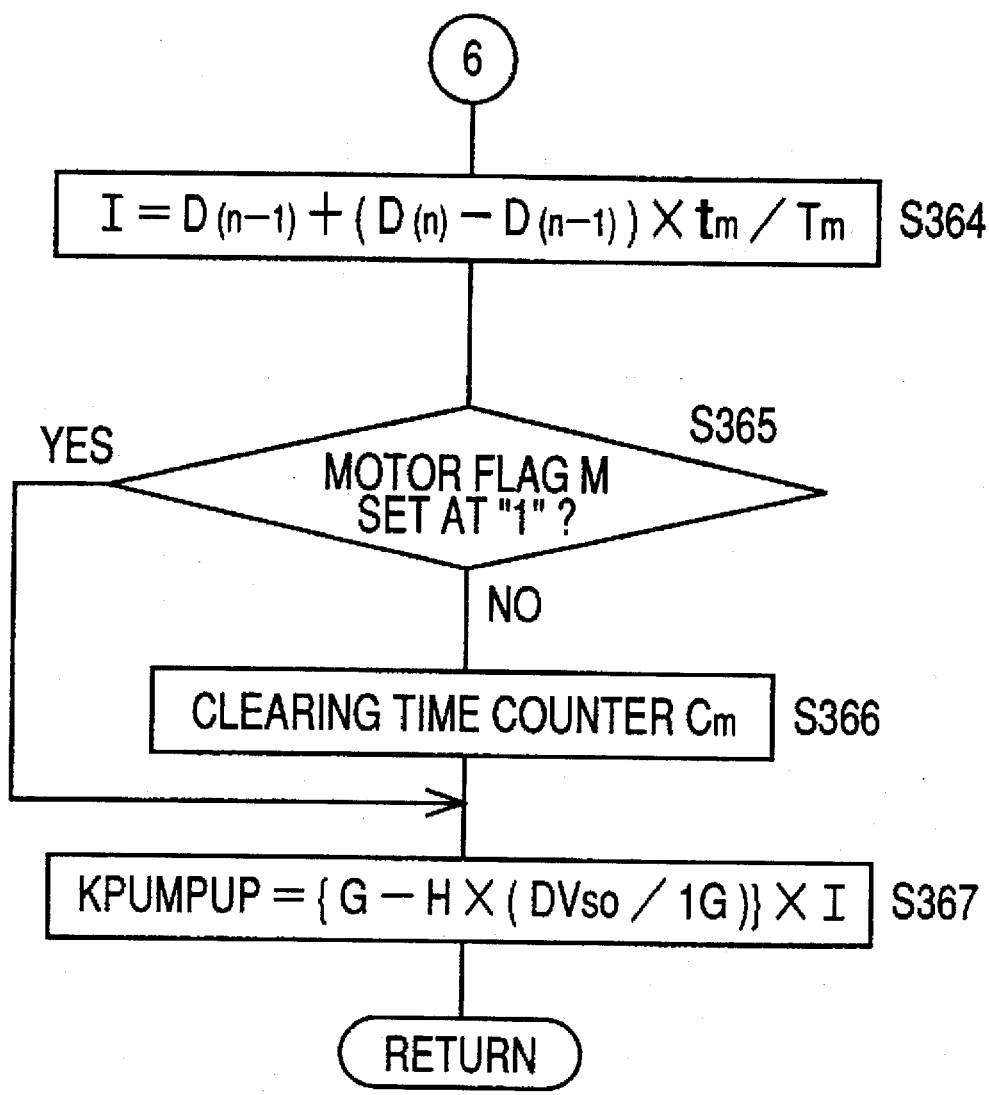
Figure 26A:
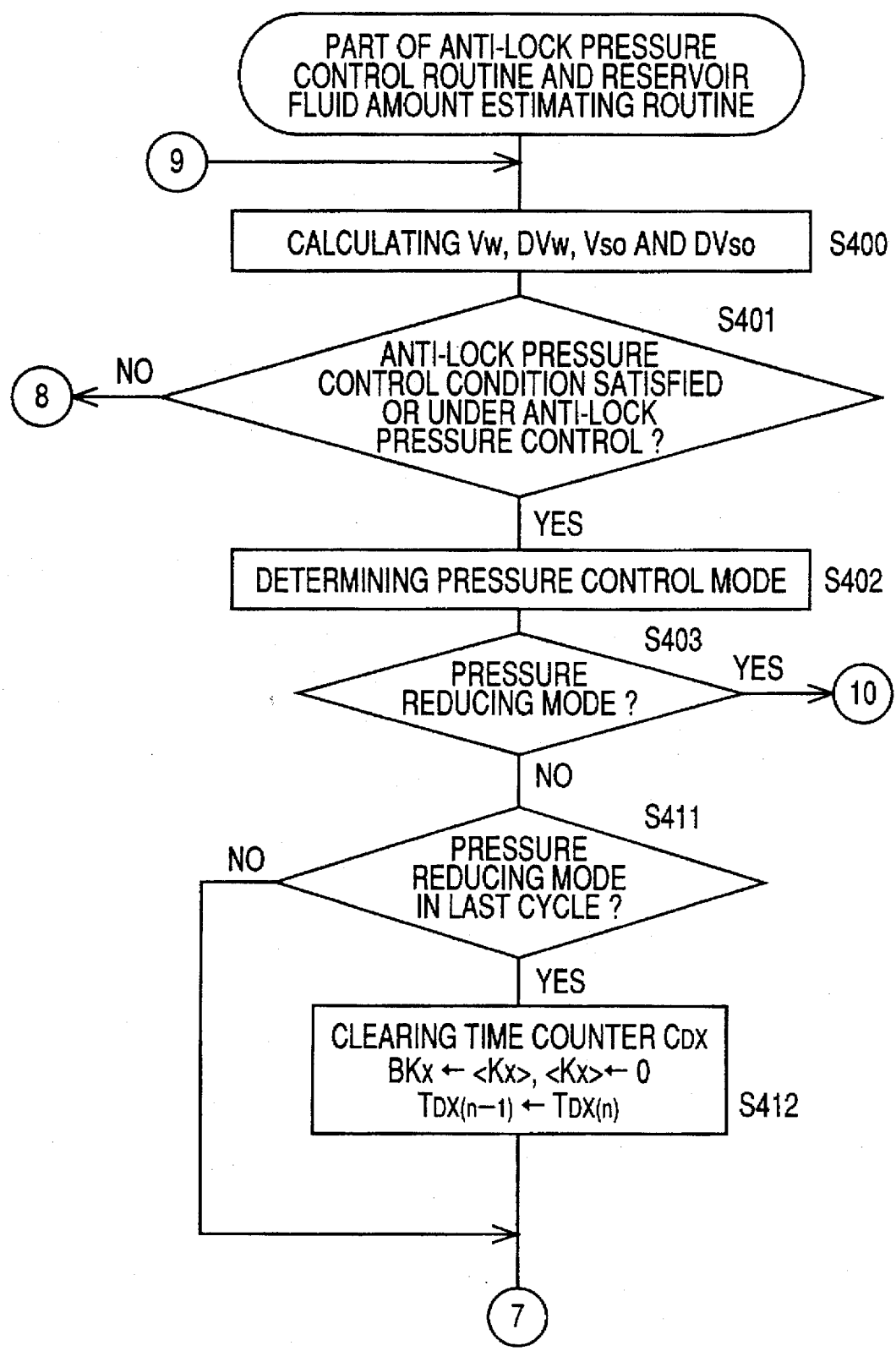
FIGS. 26(a) through 26(d) are flow charts illustrating a part of an anti-lock pressure control routine and a reservoir fluid amount estimating routine, which are stored in the read-only memory of a controller used in a yet further embodiment of this invention.
Figure 26B:
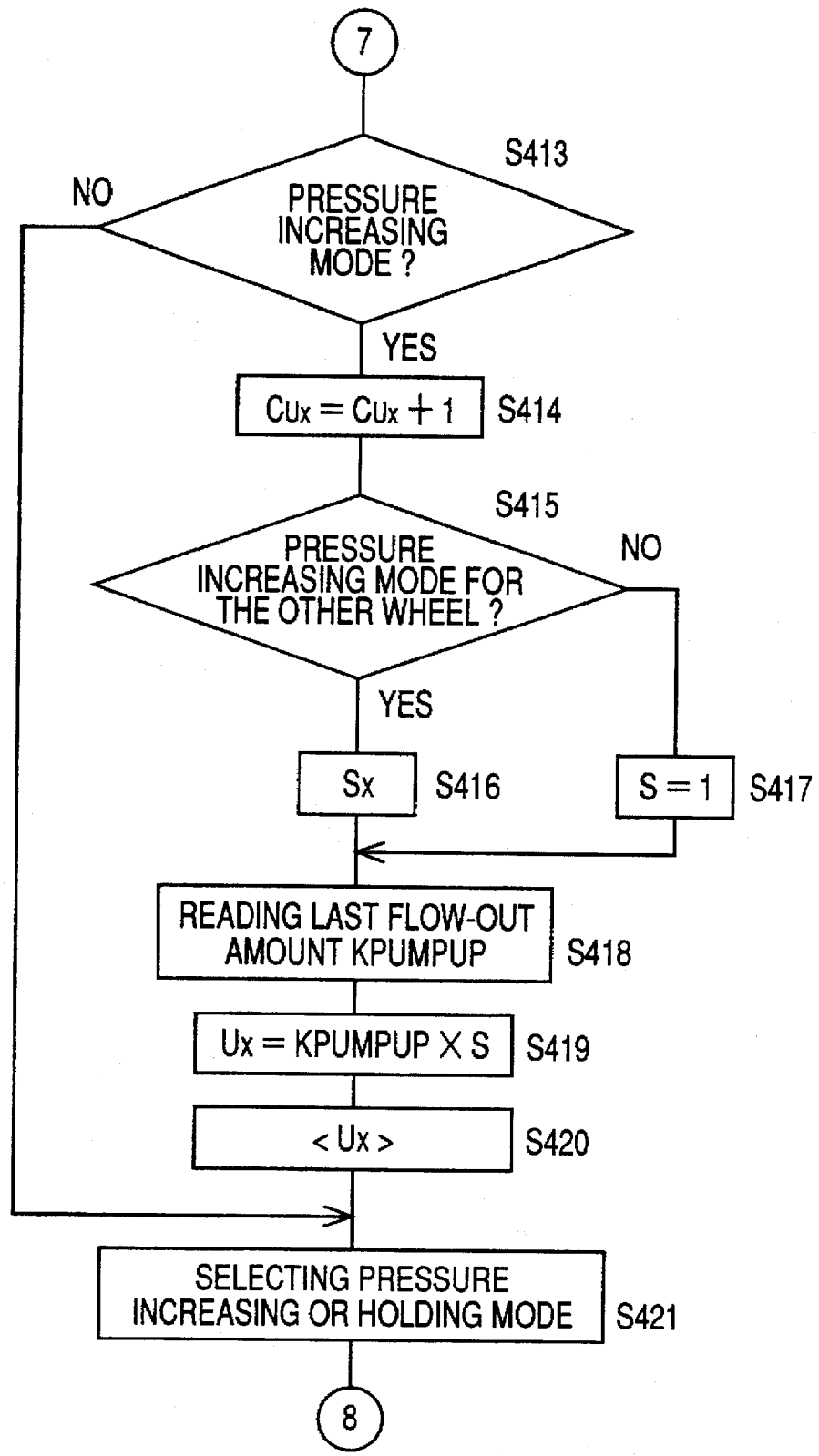
Figure 26C:
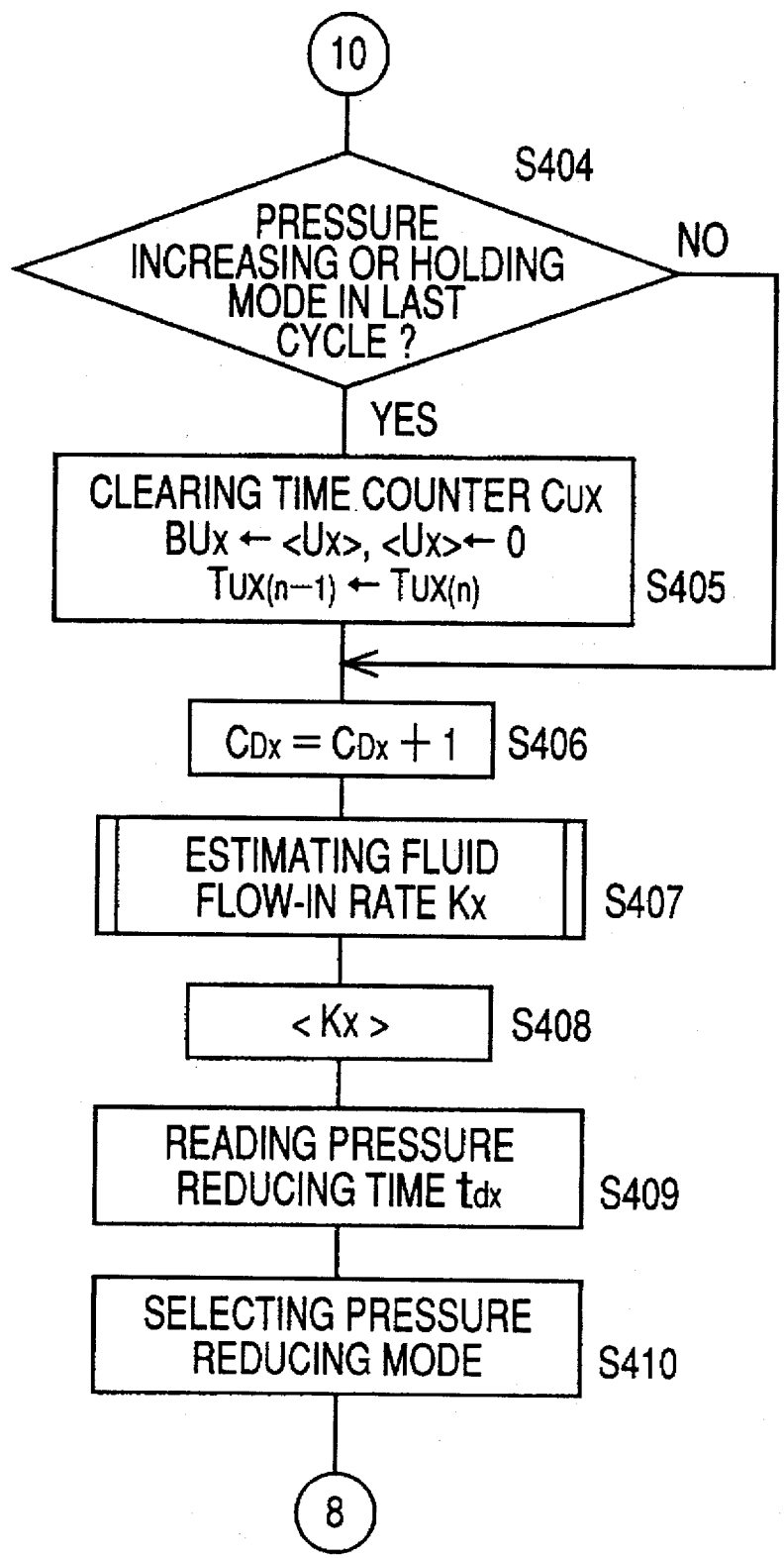
Figure 26D:
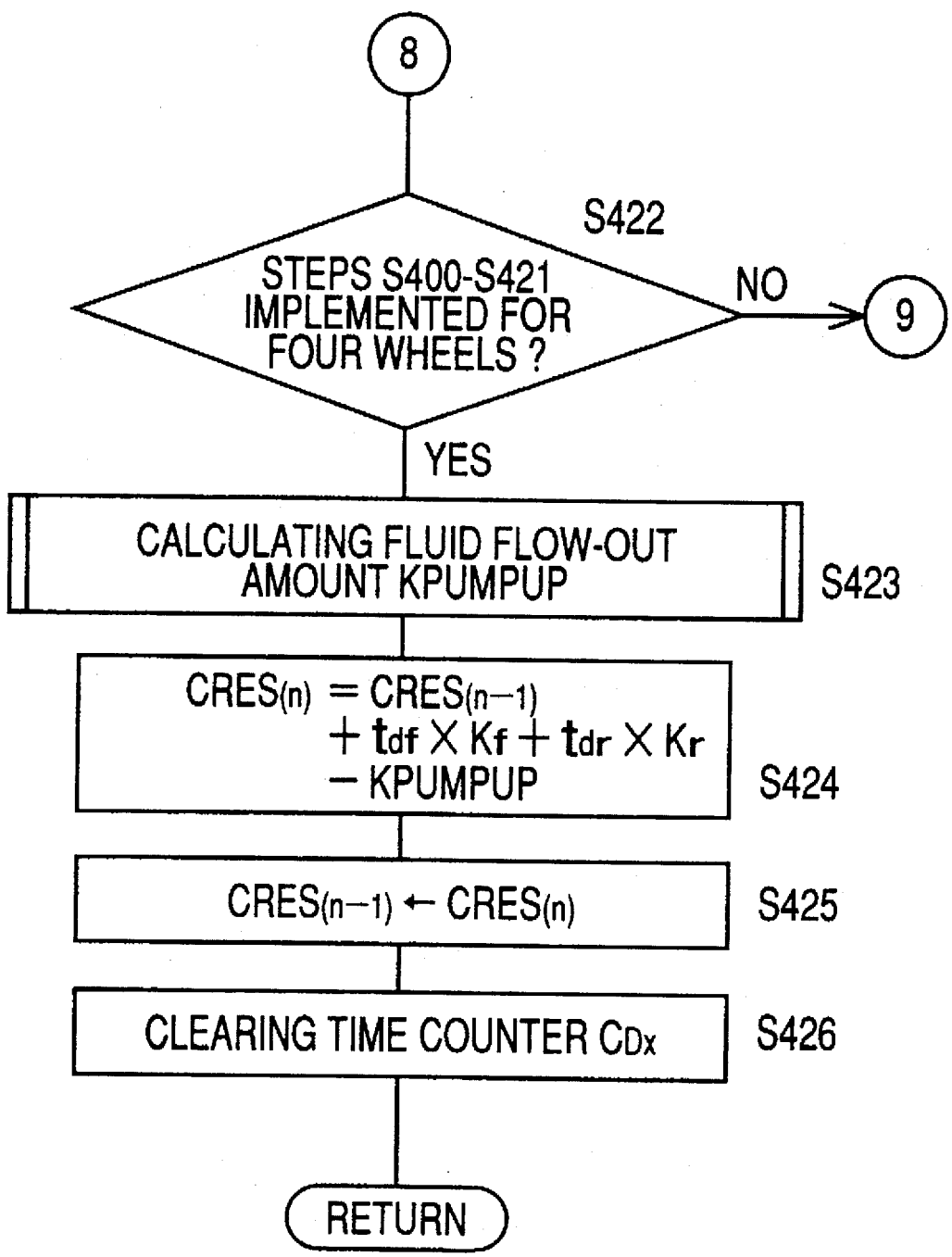
Figure 27:
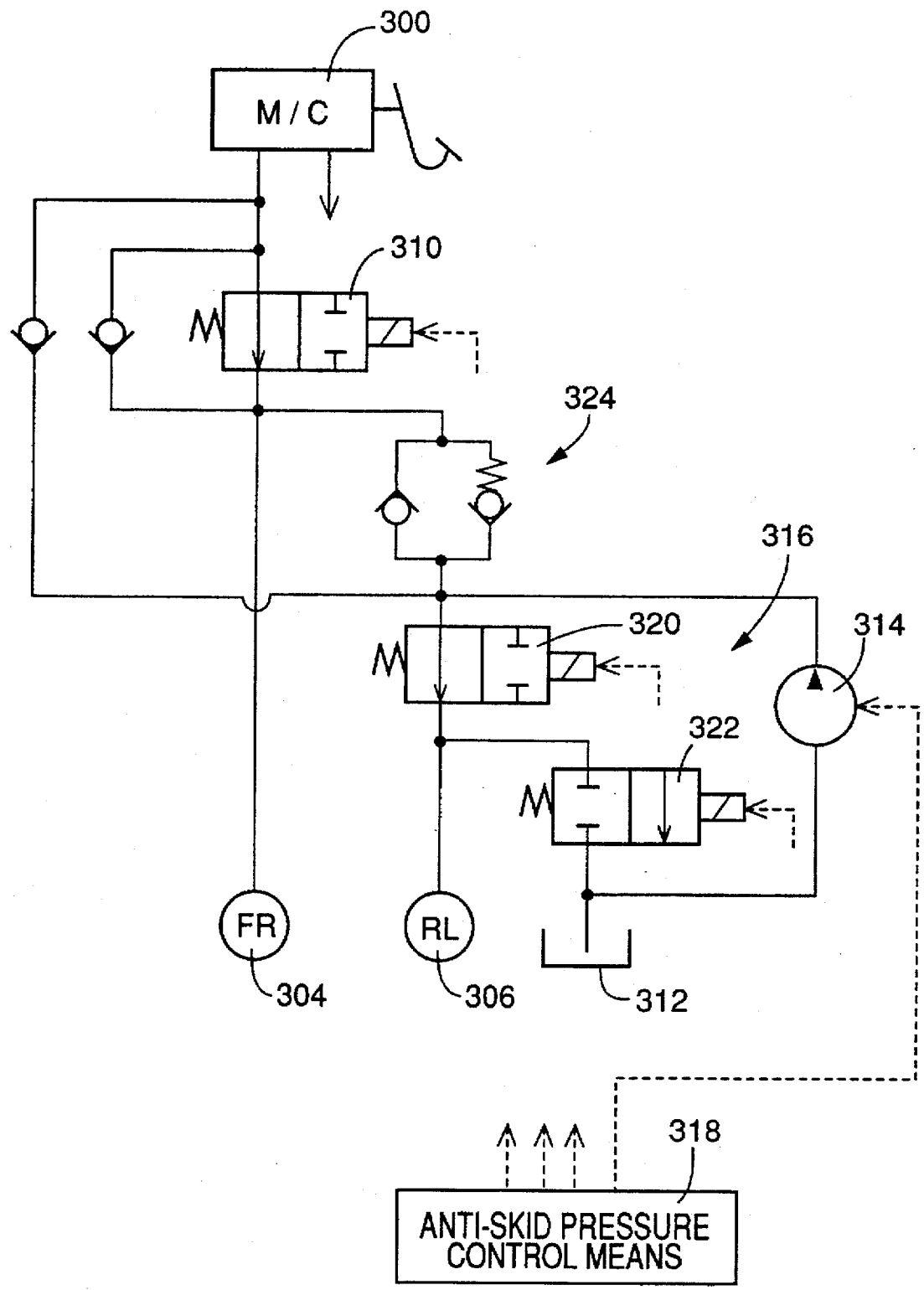
FIG. 27 is a schematic view for explaining a manner of estimating a reservoir fluid amount, which is considered available in a braking apparatus or hydraulic pressure control apparatus of the type wherein two wheel brake cylinders are provided in one brake application circuit.

The cumulative fluid flow-out amount KPUMPUP during the estimating interval is estimated according to a routine illustrated in the flow charts of FIGS. 25(a) and 25(b). It is noted that the cumulative fluid flow-out amount KPUMPUP during the estimating interval which is equal to the cycle time of the routine means the delivery rate of the pump 38. The routine is initiated with step S361 to read the constants G and H, and the currently detected vehicle deceleration DVso and duty ratio D(n). Step S361 is followed by step S362 to determine whether a MOTOR flag M is set at "1". The MOTOR flag M is set to "1" when the duty ratio D is changed, and is reset to "0" when the delay time Tm has passed after the duty ratio D is changed. That is, the MOTOR flag M is set at "1" during the delay time Tm, namely, while the time tm is within the delay time Tm.

When the MOTOR flag M is not set at "1", the control flow goes to step S363 to determine whether the duty ratio D of the motor 52 has been changed. If a negative decision (NO) is obtained in step S363, the control flow goes to steps S364–S367 to estimate the cumulative fluid flow-out amount KPUMPUP. In this case, the present duty ratio D(n) is the same as the duty ratio D(n−1) in the last control cycle, and the time tm is zero, whereby the speed-equivalent amount I is equal to D(n−1). Further, a negative decision (NO) is obtained in step S365 since the MOTOR flag M is not set at "1", and the control flow goes to step S366 to clear a time counter Cm which measures the time tm. Step S366 is followed by step S367 to estimate the cumulative fluid flow-out amount KPUMPUP according to the following equation:

$$KPUMPUP = (G - H \times DVso) \times I$$

When the duty ratio D is changed, an affirmative decision (YES) is obtained in step S363, and the MOTOR flag M is set to "1" in step S368. Then, the control flow goes to step S369 to increment the time counter Cm to measure the time tm, and to step S370 to read the time tm. Step S370 is followed by step S371 to determine whether the time tm is shorter than the delay time Tm. When step S371 is implemented for the first time, the time tm is shorter than the delay time Tm, and an affirmative decision (YES) is obtained in step S371, and the control flow goes to steps S364–S367 to estimate the cumulative fluid flow-out amount KPUMPUP. When the time tm has become equal to the delay time Tm, the control flow goes to step S372 to fix the time tm at Tm, and reset the MOTOR flag M to "0". In this respect, the time tm does not exceed the delay time Tm. When the time tm is equal to the delay time Tm, the speed-equivalent value I obtained in step S364 is equal to D(n).

Thus, the cumulative fluid flow-out amount KPUMPUP during the estimating interval is estimated on the basis of the operating speed of the motor 52 and the vehicle deceleration DVso, whereby the accuracy of estimation is improved. In step S262 of the reservoir fluid amount estimating routine of FIG. 13(b), the cumulative fluid flow-in amount (tdf×Kf+ tdr×Kr) during the estimating interval is estimated by multiplying the flow-in rate Kx by the pressure reducing time tdx, and the present reservoir fluid amount CRES(n) is estimated by subtracting the cumulative fluid flow-out amount KPUMPUP from the cumulative fluid flow-in amount. The sum of the cumulative fluid flow-out amounts KPUMPUP obtained during one anti-lock pressure control operation is the sum of the fluid amounts which have been discharged from the reservoir 44 in that anti-lock pressure control operation.

In the present embodiment wherein the fluid flow-in amount and the flow-out amount can be estimated with high accuracy, the accuracy of estimation of the reservoir fluid amount CRES can be accordingly improved.

Therefore, the present braking system does not suffer from a failure to achieve rapid reduction of the wheel brake cylinder pressure, or a shortage of the fluid in the reservoir 44, which would cause a failure to increase the wheel brake cylinder pressure as required.

The present embodiment is also advantageous in that the reservoir fluid amount is estimated throughout an anti-lock pressure control operation, not just for a time period during which the pressure increasing mode is established.

Further, the improved accuracy of estimation of the reservoir fluid amount makes it possible to reduce the required extra operating time during which the motor 52 is operated after termination of an anti-lock pressure control operation to return the entire fluid from the reservoir 44 to the master cylinder 10. The extra operating time of the motor 52 is usually determined to be slightly longer than a time which corresponds to the amount of the fluid left in the reservoir 44 upon termination of the anti-lock pressure control operation. Since the reservoir fluid amount can be accurately estimated in the present braking system, the required extra operating time may be set to be relatively short, resulting in a reduced total operating time of the motor 52 and a reduced operating noise thereof.

In the present fourth embodiment, the wheel speed sensors 72, 74 and a portion of the controller 70 assigned to implement steps S250 and S282 constitute a major part of means for estimating the overshoot amount of the pressure of the wheel brake cylinder. A portion of the controller 70 assigned to implement step S283 constitutes a major part of means for taking into account the overshoot amount when the fluid flow-in rate Kx is estimated. This means may be adapted to take into account the overshoot amount when the pressure reducing mode is established for the first time in an anti-lock pressure control operation, or may be adapted to compensate the fluid flow-in rate Kx by an amount corresponding to the overshoot amount.

A portion of the controller 70 assigned to implement step S322 constitutes a major part of means for obtaining the pressure increasing time $T_{UX}$, while a portion of the controller 70 assigned to implement step S281 and the ROM of the controller 70 storing the data maps of FIGS. 15 and 16 constitutes a major part of means for taking into account the pressure increasing time when the fluid flow-in rate Kx is estimated. This means may be adapted to compensate the fluid flow-in rate Kx by an amount corresponding to the pressure reducing time $T_{UX}$.

Further, a portion of the controller 70 assigned to measure the time of an anti-lock pressure control operation (operating time of the pump 38) constitutes a major part of means for obtaining a time during which the fluid is pumped up by the pump 38. In this respect, it is noted that the pump 38 is held in the operated state throughout an anti-lock pressure control operation performed for at least one of the vehicle wheels, as described above. A portion of the controller 70 assigned to control the duty ratio D of the motor 52 and implement steps S361–S366 and S368–S372 constitute a major part of means for obtaining the rotating speed of the motor, and a portion of the controller 70 assigned to implement step S261 (S367) constitutes a major part of means for estimating the cumulative amount of the fluid which has been discharged or pumped up from the reservoir 44.

In the fourth embodiment described above, the flow-in rate coefficients A–F are determined or selected according to the data maps of FIGS. 15 and 16 such that the coefficients are smaller when the pressure change index Px is a negative value than when the index Px is zero or a positive value. However, the coefficients A–F may be determined or selected according to the following equation:

$$A = (1 + Px/Pc) \times A$$

where, Pc is an average pressure change index which is a constant determined by experiment.

In this modified embodiment, the coefficients A–F are changed with the pressure change index Px, and the accuracy of estimation of the reservoir fluid amount can be accordingly improved.

In the above fourth embodiment, the pressure change index Px is determined on the basis of the last continuous pressure increasing time $T_{UX(n-1)}$, last continuous pressure reducing time $T_{DX(n-1)}$, pressure increasing gradient BUx and pressure reducing gradient BKx. However, the index Px may be determined on the basis of only the last continuous pressure increasing time $T_{UX(n-1)}$. For instance, the index Px may be obtained by subtracting a reference pressure increasing time from the last continuous pressure increasing time $T_{UX(n-1)}$. Further, the index Px may be determined on the basis of the last continuous pressure increasing and reducing times $T_{UX(n-1)}$ and $T_{DX}(n-1)$, or on the basis of any other parameter or parameters including at least the last continuous pressure increasing time $T_{UX(n-1)}$.

The ratio of the pressure reducing gradient BKx to the pressure increasing gradient BUx, which is calculated in step S294, may be obtained by a suitable mechanical arrangement in a hydraulic control circuit in the braking system.

While the fluid flow-in rate Kx is estimated on the basis of the vehicle deceleration DVso obtained at a time interval equal to the cycle time of the routine of FIG. 13, the vehicle deceleration DVso need not be obtained at this frequency, but may be obtained at predetermined points of time, for instance, when the continuous pressure reducing time $T_{DX}$ reaches the predetermined threshold time durations $T_{D1}$ and $T_{D2}$ used in the data maps of FIG. 15 and 16 to select the flow-in rate coefficients A–F. In this case, the flow-in rate Kx is estimated on the basis of the vehicle deceleration DVso when the deceleration values DVso are obtained at those points of time. The value Kx obtained at the point corresponding to the threshold $T_{D1}$, for example, is held constant until the value Kx is updated at the point corresponding to the threshold $T_{D2}$.

In the above embodiment, the data maps of FIGS. 15 and 16 to select the coefficients A–F uses the two threshold times $T_{D1}$ and $T_{D2}$ to provide three ranges of the continuous pressure reducing time so that the coefficients A–F change in three steps depending upon the continuous pressure reducing time. However, the continuous pressure reducing time may be divided into two ranges or four or more ranges.

The fourth embodiment may be modified such that the fluid flow-in rate Kx is held constant throughout one antilock pressure control operation as in the first embodiment. In this case, too, the use of the pressure increase change index Px and the overshoot-equivalent amount Qx permits the estimation of the cumulative amount of the fluid into the reservoir 44 with improved accuracy.

While the fluid flow-in rate coefficients Ar—Ar, Afr–Ffr and Arf–Frf are obtained on the basis of the vehicle deceleration, these values may be determined by a suitable mechanical arrangement of a hydraulic control circuit in the braking system.

In the fourth embodiment, all flow-in rate coefficients A–F are multiplied by the overshoot-equivalent amount Qx to estimate the flow-in rate Kx in step S283, when the pressure reducing mode is established for the first time. However, only a selected one or ones of the coefficients A–F, for example, at least one of the two coefficients A and B corresponding to the first range of the pressure reducing time may be multiplied by the overshoot-equivalent amount Qx.

Further, the amount corresponding to the overshoot amount of the wheel brake cylinder pressure may be added to at least one of the coefficients A–F.

The equation for obtaining the overshoot-equivalent Qx is not limited to that used in step S343 of FIG. 23, but may be suitably modified. Further, the overshoot-equivalent amount Qx may be obtained on the basis of the operating speed of the brake pedal 12.

All of the flow-in rate coefficients A–F need not be changed depending upon the pressure change index Px, but a selected one or ones of the coefficients A–F may be changed depending upon the index Px.

The cumulative amount of flow of the fluid into the reservoir 44, rather than the rate Kx of flow of the fluid into the reservoir 44, may be compensated by the overshoot-equivalent amount Qx and/or the pressure increase change index Px.

It is noted that the use of the overshoot-equivalent amount Qx and the pressure change index Px is not essential to estimate the cumulative amount of the fluid into the reservoir 44 according to the principle of the present invention, provided that the estimation is effected using the vehicle deceleration.

The equation for obtaining the cumulative fluid flow-out amount KPUMPUP is not limited to that used in step S367, but may be suitably modified. Further, the speed-equivalent value I may be estimated on the basis of not only the duty ratio D of the motor 52 but also the vehicle deceleration. In this respect, it is noted that the operating speed of the motor 52 decreases with an increase in the load acting on the motor 52, even if the electric current applied to the motor 52 is constant. Further, where the pump 38 is of a positive-displacement type as in the illustrated embodiment, an increase of the delivery pressure of the pump causes an increase in the load acting on the motor 52 and a decrease in the operating speed. The load acting on the motor 52 increases with an increase in the pressure in the wheel brake cylinder, and the wheel brake cylinder pressure may be estimated to be relatively large when the vehicle deceleration DVso is relatively high. Accordingly, the operating speed of the motor 52 may be estimated to decrease with an increase in the vehicle deceleration DVso, and may be considered to change as indicated by one-dot chain line in the graph of FIG. 24.

For instance, a speed-equivalent value I' may be calculated according to the following equation:

$$I'=G' \times I + H' \times DVsO$$

In this instance, the fluid flow-out amount KPUMPUP may he obtained according to the following equation:

$$KPUMPUP=G^* \times I'$$

In the above equations, G', H' and G* are constants.

Further, the fluid flow-out amount KPUMPUP need not be estimated using the vehicle deceleration, but may be estimated using only the operating speed of the motor 52. For instance, the fluid flow-out amount KPUMPUP may be estimated on the basis of the operating speed of the motor 52 which is directly detected. As described above, the load acting on the motor 52 increases with an increase in the pressure in the wheel brake cylinder, while the operating speed of the motor increases with an increase in the electric current applied to the motor and decreases with an increase in the load. Accordingly, the actual delivery rate of the pump 38 and the fluid flow-out amount can be accurately estimated on the basis of the actual operating speed of the motor 52.

It is noted that the operating speed of the motor 52 is an amount relating to the vehicle deceleration, but does not represent the vehicle deceleration.

The fluid flow-out amount KPUMPUP need not be estimated using the operating speed of the motor 52, but may be estimated using only the vehicle deceleration. Further, the flow-out amount KPUMPUP may be estimated on the basis of the electric current flowing through the motor 52 as in the first embodiment.

The pump 38 is not limited to a positive-displacement type, but may be a velocity type. In this case, the delivery rate of the pump is not necessarily proportional to the operating speed of the pump motor, and the accuracy of estimation of the flow-in amount KPUMPUP is more or less reduced. However, the estimation on the basis of the operating speed of the pump motor is not impossible, and the accuracy of this estimation may be higher than where the estimation is based on only the operating time of the pump.

In the fourth embodiment of FIGS. 13(a) and 13(b), the estimation of the reservoir fluid amount in step S262 is carried out only after steps S250–S259 have been implemented for all of the four wheels of the vehicle. However, the fourth embodiment may be modified such that the amount of the fluid in the reservoir 44 in the pressure application sub-system including the front and rear wheel brake cylinders 16, 20 for the front right and rear left wheels 14, 18 is estimated after steps S250–S259 have been implemented for the front and rear wheels 14, 18, and the amount of the fluid in the reservoir in the other pressure application sub-system is estimated after steps S250–S259 have been implemented for the front left and rear right wheels.

The controller 70 storing the various control programs illustrated in the flow charts of FIGS. 11–14, FIGS. 19–21 and FIGS. 23 and 25 may be used for the braking system shown in FIG. 7 or 10, rather than the braking system of FIG. 1. In the braking systems of FIGS. 7 and 10, the fluid is not discharged from both of the front and rear wheel brake cylinders through the common pressure reducing valve or circuit, and therefore it is not necessary to distinguish the case where the fluid is discharged from the front and rear wheel brake cylinders, and the case where the fluid is discharged from only the rear wheel brake cylinder, as in the fourth embodiment. Accordingly, the control operation may be made simpler.

Furthermore, the concept of the first embodiment is applicable to the other embodiments as needed.

Figure 21:
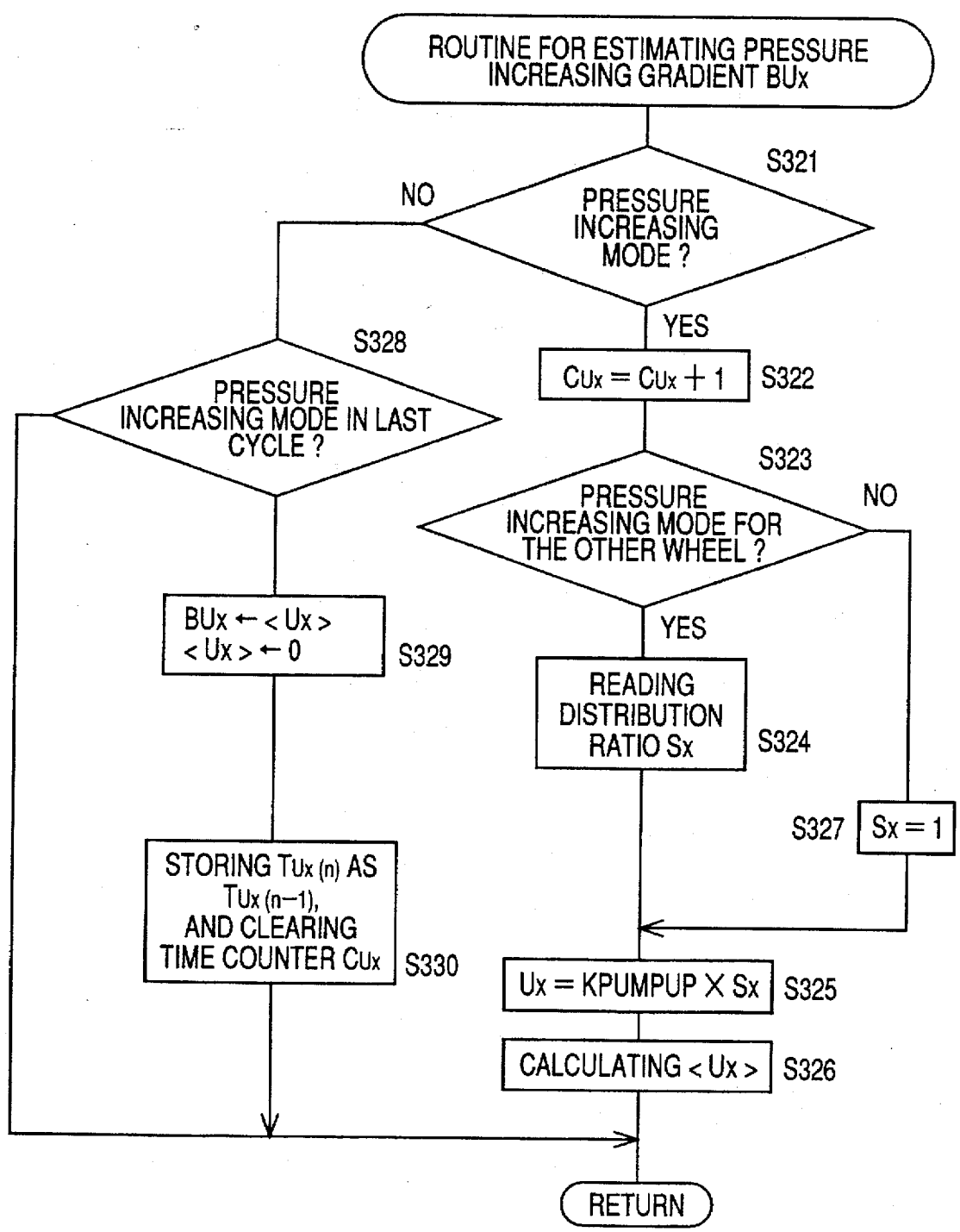
FIG. 21 is a flow chart of a routine for estimating a pressure increasing gradient in the embodiment of FIG. 11.

In the fourth embodiment, the routines of FIGS. 20 and 21 for estimating the pressure reducing and increasing gradients BKx and BUx are executed independently of the routines of FIGS. 13(a) and 13(b) for controlling anti-lock pressure control operations and estimating the reservoir fluid amount CRES(n). However, these routines may be integrated as a single routine as illustrated in the flow charts of FIGS. 26(a) through 26(d).

In the routine of FIGS. 26(a)–(d), step S403 is implemented to determine whether the pressure control mode determined in step S402 for the wheel brake cylinder in question is the pressure reducing mode or not. If an affirmative decision (YES) is obtained in step S403, the control flow goes to step S404 to determine whether the pressure increasing or holding mode was established in the last control cycle.

If an affirmative decision (YES) is obtained in step S404, the control flow goes to step S405 to initialize the various variables, for instance, to clear the time counter $C_{UX}$ which measures the continuous pressure increasing time $T_{UX}$, set the present continuous pressure increasing time $T_{UX(n)}$ as the last continuous pressure increasing time $T_{UX(n-1)}$, set the present average pressure increasing gradient <Ux> as the last average pressure increasing gradient BUx, and reset the gradient <Ux> to zero. Subsequently, steps S406–S410 are implemented to measure the continuous pressure reducing time $T_{DX}$, obtain the pressure reducing gradient and select the pressure reducing mode. As long as the pressure reducing mode is selected or established, steps S406–S410 are repeatedly implemented to obtain an average of the pressure reducing gradient values obtained.

When the pressure reducing mode is selected, a negative decision (NO) is obtained in step S403, and an affirmative decision (YES) is obtained in step S411. As a result, step S412 is implemented to clear the time counter $C_{DX}$ which measures the continuous pressure reducing time, set the present continuous pressure reducing time $T_{DX(n)}$ and the present average pressure reducing gradient <Kx> as the last continuous pressure reducing time $T_{DX}$ (n–1) and the last pressure reducing gradient BKx, and reset the gradient <Kx> to zero. Then, step S413 is implemented to determine whether the pressure increasing mode is selected. If the pressure reducing mode is established, steps S414–S420 are implemented to measure the continuous pressure increasing time $T_{DX}$ and estimate the pressure increasing gradient <Kx>. As long as the pressure increasing mode is selected or established, steps S414–S421 are repeatedly implemented.

When the pressure holding mode is selected, a negative decision (NO) is obtained in step S413, and steps S414–S420 are not implemented.

If the pressure increasing and holding modes are alternately established two or more times between two successive pressure reducing operations or periods in the pressure reducing mode, steps S414–S420 are implemented for each pressure increasing period, without resetting of the average pressure increasing gradient and the continuous pressure increasing time, and the pressure increasing gradient values in the two or more pressure reducing periods are averaged. The continuous pressure increasing time is a sum of the pressure reducing times of the two or more pressure reducing periods.

In the fifth embodiment of FIGS. 26(a)–26(d), the rate of flow Kx of the fluid into the reservoir is estimated on the basis of the pressure increasing and reducing gradients estimated as described above, and the fluid flow-in amount and the reservoir fluid amount CRES are estimated in steps S423 and S424 in the same manner in the fifth embodiment.

While the present invention has been described above in its presently preferred embodiments, for illustrative purpose only, it is to be understood that the present invention is not limited to the details of the illustrated embodiments and the specific changes and modifications indicated above, and that the invention may be embodied with various other changes, modifications and improvements, which may occur to those skilled in the art, without departing from the scope of the invention defined in the following claims.

What is claimed is:

1. A hydraulic pressure control apparatus for a brake including a brake cylinder activated by a pressurized fluid for braking a wheel of a vehicle and a reservoir for storing the fluid discharged from said brake cylinder when a pressure of the fluid in said brake cylinder is reduced, said apparatus comprising:

deceleration obtaining means for obtaining a deceleration value of a body of the vehicle;

pressure reducing time obtaining means for obtaining a pressure reducing time during which the pressure of the fluid in said brake cylinder is reduced; and flow-in amount estimating means for estimating a cumulative amount of flow of the fluid into said reservoir, on the basis of said deceleration value obtained by said deceleration obtaining means and said pressure reducing time obtained by said pressure reducing time obtaining means.

2. A hydraulic pressure control apparatus according to claim 1, wherein said flow-in amount estimating means comprises:

overshoot estimating means for estimating an amount of overshoot of the pressure in the brake cylinder upon initiation of reduction of the pressure in the brake cylinder; and means for taking into account said amount of overshoot of the pressure estimated by said overshoot estimating means, when said cumulative amount of flow of the fluid into said reservoir is estimated.

3. A hydraulic pressure control apparatus according to claim 1, further comprising a pressure increasing device for supplying the pressurized fluid to said brake cylinder, and wherein said flow-in amount estimating means comprises:

pressure increasing time obtaining means for obtaining a pressure increasing time during which the pressure in said brake cylinder is increased by said pressure increasing device at least immediately before initiation of reduction of said pressure in said brake cylinder; and means for taking into account said pressure increasing time obtained by said pressure increasing time obtaining means, when said cumulative amount of flow of the fluid into said reservoir is estimated.

4. A hydraulic pressure control apparatus according to claim 1, further comprising:

a pump for pumping up the fluid from said reservoir;

flow-out amount estimating means for estimating a cumulative amount of flow of the fluid which has been discharged from said reservoir by pumping of the fluid by said pump; and reservoir fluid amount estimating means for estimating an amount of the fluid stored in said reservoir, on the basis of said cumulative amount of flow of the fluid discharged from said reservoir estimated by said flow-out amount estimating means and said cumulative amount of flow of the fluid into said reservoir estimated by said flow-in amount estimating means.

5. A hydraulic pressure control apparatus according to claim 1, further comprising:

a pump for pumping up the fluid from said reservoir and delivering the pumped-up fluid to said brake cylinder to increase the pressure of the fluid in said brake cylinder;

flow-out amount estimating means for estimating a cumulative amount of flow of the fluid which has been discharged from said reservoir on the basis of a pumping time during which said fluid is pumped up from said reservoir by said pump, and one of said deceleration value obtained by said deceleration obtaining means and an operating speed of an electric motor for operating said pump; and reservoir fluid amount estimating means for estimating an amount of the fluid stored in said reservoir, on the basis of said cumulative amount of flow of the fluid discharged from said reservoir estimated by said flow-out amount estimating means and said cumulative amount of flow of the fluid into said reservoir estimated by said flow-in amount estimating means.

6. A hydraulic pressure control apparatus according to claim 1, wherein said deceleration obtaining means comprises a wheel speed sensor for detecting a rotating speed of said wheel, and deceleration estimating means for estimating said deceleration value of said body of the vehicle on the basis of an output of said wheel speed sensor.

7. A hydraulic pressure control apparatus according to claim 1, wherein said deceleration obtaining means comprises at least one of first deceleration obtaining means for obtaining the deceleration value of said body of the vehicle upon initiation of reduction of the pressure in said brake cylinder, and second deceleration obtaining means for obtaining the deceleration value of the body of the vehicle during said reduction of the pressure in said brake cylinder.

8. A hydraulic pressure control apparatus according to claim 1, further comprising a pressure reducing device disposed in a fluid passage connecting said brake cylinder and said reservoir, and valve control means for controlling said pressure reducing device such that said valve device is selectively placed in a connecting state for connecting said brake cylinder and said reservoir and a disconnecting state for disconnecting said brake cylinder and said reservoir from each other, and wherein said pressure reducing time obtaining means obtains as said pressure reducing time a time during which said valve device is held in said connecting state.

9. A hydraulic pressure control apparatus according to claim 1, wherein said flow-in amount estimating means comprises means for estimating a pressure-equivalent amount corresponding to a level of the pressure in said brake cylinder, and means for taking into account said pressure-equivalent amount when said cumulative amount of flow of the fluid into said reservoir is estimated.

10. A hydraulic pressure control apparatus according to claim 1, wherein said flow-in amount estimating means comprises flow-in rate estimating means for estimating an amount of flow of the fluid discharged from said brake cylinder into said reservoir per unit time.

11. A hydraulic pressure control apparatus according to claim 1, wherein said pressure reducing time obtaining means comprises means for obtaining a continuous pressure reducing time during which the pressure in said brake cylinder is continuously reduced, and said flow-in amount estimating means comprises means for estimating a rate of flow of the fluid discharged from said brake cylinder into said reservoir, on the basis of said continuous pressure reducing time.

12. A hydraulic pressure control apparatus according to claim 1, wherein said flow-in amount estimating means comprises overshoot estimating means for estimating an amount of overshoot of the pressure in the brake cylinder upon initiation of reduction of the pressure in the brake cylinder; and means for compensating said cumulative amount of flow of the fluid into said reservoir, depending upon said amount of overshoot estimated by said overshoot estimating means.

13. A hydraulic pressure control apparatus according to claim 2, wherein said overshoot estimating means comprises wheel deceleration obtaining means for obtaining a deceleration value of said wheel of the vehicle, and means for estimating said amount of overshoot of the pressure in said brake cylinder on the basis of said deceleration value of said wheel obtained by said wheel deceleration obtaining means.

14. A hydraulic pressure control apparatus according to claim 2, further comprising a brake operating member, and a pressurizing device for pressurizing the fluid to a level depending upon an operating state of said brake operating member, and wherein said overshoot estimating means comprises gradient obtaining means for obtaining an amount of increase in the pressure in said brake cylinder per unit time during an operation of said brake operating member, and means for estimating said amount of overshoot on the basis of said amount of increase in the pressure in said brake cylinder per unit time obtained by said gradient obtaining means.

15. A hydraulic pressure control apparatus according to claim 2, further comprising anti-lock pressure control means for controlling the pressure in said brake cylinder so as to maintain a slip of said wheel on a road surface during activation of said brake cylinder at a substantially optimum value, and wherein said means for taking into account said amount of overshoot comprises means for taking into account said amount of overshoot estimated by said overshoot estimating means when said cumulative amount of flow of the fluid into said reservoir is estimated upon initiation of a first pressure reducing operation by said anti-lock pressure control means to reduce the pressure of the fluid in said brake cylinder for the first time.

16. A hydraulic pressure control apparatus according to claim 1, further comprising a pressure increasing device for supplying the pressurized fluid to said brake cylinder, and wherein said flow-in amount estimating means comprises:

pressure increasing time obtaining means for obtaining a pressure increasing time during which the pressure in said brake cylinder is increased by said pressure increasing device at least immediately before initiation of reduction of said pressure in said brake cylinder; and means for compensating said cumulative amount of flow of the fluid into said reservoir, depending upon said pressure increasing time obtained by said pressure increasing time obtaining means.

17. A hydraulic pressure control apparatus according to claim 1, further comprising a pressure increasing device for supplying the pressurized fluid to said brake cylinder, and wherein said flow-in amount estimating means comprises:

gradient obtaining means for obtaining a gradient of increase in the pressure in said brake cylinder by said pressure increasing device; and means for taking into account said gradient of increase in the pressure in said brake cylinder obtained by said gradient obtaining means, when said cumulative amount of flow of the fluid into said reservoir is estimated.

18. A hydraulic pressure control apparatus according to claim 1, wherein said pressure reducing time obtaining means comprises means for obtaining a last pressure reducing time during which the pressure in said brake cylinder was reduced before present reduction in the pressure in said brake cylinder, and said flow-in amount estimating means comprises means for taking into account said last pressure reducing time when said cumulative amount of flow of the fluid into said reservoir is estimated.

19. A hydraulic pressure control apparatus according to claim 1, wherein said flow-in amount estimating means comprises means for obtaining a gradient of last reduction in the pressure in said brake cylinder before present reduction in the pressure in said brake cylinder, and means for taking into account said gradient of last reduction in the pressure in said brake cylinder when said cumulative amount of flow of the fluid into said reservoir.

20. A hydraulic pressure control apparatus according to claim 1, further comprising:

a master cylinder;

a cut-off valve device disposed in a fluid passage connecting said master cylinder and said brake cylinder, said cut-off valve device having a connecting state for connecting said master cylinder and said brake cylinder and a disconnecting state for disconnecting said master cylinder and said brake cylinder from each other;

a pressure reducing valve device disposed in a pressure reducing fluid passage connecting said reservoir and said brake cylinder, said pressure reducing valve device having a connecting state for connecting said reservoir and said brake cylinder and a disconnecting state for disconnecting said reservoir and said brake cylinder from each other;

a pump for pumping up the fluid from said reservoir;

a pressure increasing valve device disposed in a pressure increasing fluid passage connecting a delivery port of said pump and said brake cylinder, said pressure increasing valve device having a connecting state for connecting said delivery port of said pump and said brake cylinder and a disconnecting state for disconnecting said delivery port and said brake cylinder from each other; and anti-lock pressure control means for controlling said cut-off valve device, said pressure reducing valve device and said pressure increasing valve device such that each of said pressure increasing and reducing valve devices is selectively placed in said connecting and disconnecting states while said cut-off valve device is held in said disconnecting state, for controlling the pressure in said brake cylinder so as to maintain a slip of said wheel on a road surface during activation of said brake cylinder at a substantially optimum value.

21. A hydraulic pressure control apparatus according to claim 1, further comprising:

a master cylinder;

a cut-off valve device disposed in a primary fluid passage connecting said master cylinder and said brake cylinder, said cut-off valve device having a connecting state for connecting said master cylinder and said brake cylinder and a disconnecting state for disconnecting said master cylinder and said brake cylinder from each other;

a pressure reducing valve device disposed in a pressure reducing fluid passage connecting said reservoir and said brake cylinder, said pressure reducing valve device having a connecting state for connecting said reservoir and said brake cylinder and a disconnecting state for disconnecting said reservoir and said brake cylinder from each other;

a pump for pumping up the fluid from said reservoir;

a pump-up control valve device disposed in a pump-up passage connecting a delivery port of said pump and said reservoir, said pump-up control valve device having a connecting state for connecting said delivery port of said pump and said reservoir and a disconnecting state for disconnecting said delivery port and said reservoir from each other; and anti-lock pressure control means for controlling said cut-off valve device, said pressure reducing valve device and said pump-up control valve device such that each of said pressure increasing and reducing valve devices is selectively placed in said connecting and disconnecting states while said cut-off valve device is held in said disconnecting state, for controlling the pressure in said brake cylinder so as to maintain a slip of said wheel on a road surface during activation of said brake cylinder at a substantially optimum value.

22. A hydraulic pressure control apparatus according to claim 20, wherein said anti-lock pressure control means comprises:

reservoir fluid amount estimating means for estimating an amount of the fluid stored in said reservoir on the basis of said cumulative amount of flow of the fluid into said reservoir estimated by said flow-in amount estimating means, and a cumulative amount of flow of the fluid from said brake cylinder into said reservoir; and cut-off valve device control means for switching said cut-off valve device to said connecting state when said amount of the fluid stored in said reservoir estimated by said reservoir fluid amount estimating means is smaller than a predetermined threshold.

23. A hydraulic pressure control apparatus according to claim 20, wherein said anti-lock pressure control means comprises means for switching said cut-off valve device in said connecting and disconnecting states alternately so as to control a duty ratio thereof.

24. A hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to said brake cylinder to increase a pressure of the fluid in the brake cylinder, said apparatus comprising:

deceleration obtaining means for obtaining a deceleration value of a body of the vehicle;

pumping time obtaining means for obtaining a pumping time during which the fluid is pumped up from said reservoir by said pump; and flow-out amount estimating means for estimating a cumulative amount of flow of the fluid from said reservoir, on the basis of said pumping time obtained by said pumping time obtaining means and a deceleration value of said body of the vehicle obtained by said deceleration obtaining means.

25. A hydraulic pressure control apparatus according to claim 24, further comprising an electric motor for operating said pump, and wherein said flow-out amount estimating means comprises:

motor speed obtaining means for obtaining an operating speed of said electric motor; and means for taking into account said operating speed of said motor obtained by said motor speed obtaining means, when said cumulative amount of flow of the fluid from said reservoir is estimated.

26. A hydraulic pressure control apparatus according to claim 24, further comprising:

flow-in amount estimating means for estimating a cumulative amount of flow of the fluid from said brake cylinder into said reservoir; and reservoir fluid amount estimating means for estimating an amount of the fluid stored in said reservoir, on the basis of said cumulative amount of flow of the fluid into said reservoir estimated by said flow-in amount estimating means, and said cumulative amount of flow of the fluid from said reservoir estimated by said flow-out amount estimating means.

27. A hydraulic pressure control apparatus according to claim 24, wherein said pumping time obtaining means comprises operating time obtaining means for obtaining as said pumping time an operating time of said pump.

28. A hydraulic pressure control apparatus according to claim 24, wherein said flow-out amount estimating means comprises pump delivery estimating means for estimating a delivery rate of said pump which is an amount of the fluid delivered from said pump per unit time.

29. A hydraulic pressure control apparatus for a brake including a brake cylinder activated by a pressurized fluid for braking a wheel of a vehicle, a reservoir for storing the fluid discharged from the brake cylinder, and a pump operated by an electric motor for pumping up the fluid from the reservoir and supplying the pumped-up fluid to said brake cylinder to increase a pressure of the fluid in the brake cylinder, said apparatus comprising:

motor speed obtaining means for obtaining an operating speed of said electric motor;

pumping time obtaining means for obtaining a pumping time during which the fluid is pumped up from said reservoir by said pump; and flow-out amount estimating means for estimating a cumulative amount of flow of the fluid from said reservoir, on the basis of said pumping time obtained by said pumping time obtaining means and said operating speed of said electric motor.

30. A hydraulic pressure control apparatus according to claim 29, wherein said flow-out amount estimating means comprises:

deceleration obtaining means for obtaining a deceleration value of a body of the vehicle; and means for taking into account said deceleration value obtained by said deceleration obtaining means, when said cumulative amount of flow of the fluid from said reservoir is estimated.

31. A hydraulic pressure control apparatus according to claim 29, further comprising:

flow-in amount estimating means for estimating a cumulative amount of flow of the fluid from said brake cylinder into said reservoir; and reservoir fluid amount estimating means for estimating an amount of the fluid stored in said reservoir, on the basis of said cumulative amount of flow of the fluid into said reservoir estimated by said flow-in amount estimating means, and said cumulative amount of flow of the fluid from said reservoir estimated by said flow-out amount estimating means.

32. A hydraulic pressure control apparatus according to claim 29, wherein said pumping time obtaining means comprises operating time obtaining means for obtaining as said pumping time an operating time of said pump.

33. A hydraulic pressure control apparatus according to claim 29, further comprising current control means for controlling an electric current to be supplied to said electric motor, and wherein said motor speed obtaining means comprises speed estimating means for estimating the operating speed of said electric motor on the basis of said electric current supplied to said electric motor and at least one amount including an inertia of a rotating portion of said electric motor.

34. A hydraulic pressure control apparatus according to claim 29, wherein said motor speed obtaining means comprises a speed detecting device for directly detecting the operating speed of said electric motor.

35. A hydraulic pressure control apparatus according to claim 29, wherein said flow-out amount estimating means comprises pump delivery estimating means for estimating a delivery rate of said pump which is an amount of the fluid delivered from said pump per unit time.

36. A hydraulic pressure control apparatus according to claim 29, wherein a delivery rate of said pump is determined by said operating speed of said electric motor, and said flow-out amount estimating means comprises a pump delivery estimating mans for estimating said delivery rate of said pump which is an amount of the fluid delivered from said pump per unit time, said pump delivery estimating means comprising means for estimating said delivery rate on the basis of said operating speed of said electric motor.

37. A hydraulic pressure control apparatus for a brake including a brake cylinder activated by a pressurized fluid for braking a wheel of a vehicle and a reservoir for storing the fluid discharged from said brake cylinder when a pressure of the fluid in said brake cylinder is reduced, said apparatus comprising:

pressure reducing time obtaining means for obtaining a pressure reducing time during which the pressure of the fluid in said brake cylinder is reduced;

a pressure detecting device for detecting the pressure of the fluid in said brake cylinder; and flow-in amount estimating means for estimating a cumulative amount of flow of the fluid into said reservoir, on the basis of said pressure of the fluid in said brake cylinder detected by said pressure detecting device and said pressure reducing time obtained by said pressure reducing time obtaining means.

38. A hydraulic pressure control apparatus for a brake including a brake cylinder activated by a pressurized fluid for braking a wheel of a vehicle, a reservoir for storing the fluid discharged from the brake cylinder, and a pump operated by an electric motor for pumping up the fluid from the reservoir and supplying the pumped-up fluid to said brake cylinder to increase a pressure of the fluid in the brake cylinder, said apparatus comprising:

a current obtaining device for obtaining an electric current flowing through said electric motor;

pumping time obtaining means for obtaining a pumping time during which the fluid is pumped up from said reservoir by said pump; and flow-out amount estimating means for estimating a cumulative amount of flow of the fluid from said reservoir, on the basis of said pumping time obtained by said pumping time obtaining means and said electric current detected by said deceleration obtaining means.

39. A hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to said brake cylinder to increase a pressure of the fluid in the brake cylinder, said apparatus comprising:

pumping time obtaining means for obtaining a pumping time during which the fluid is pumped up from said reservoir by said pump;

pump state estimating means for estimating an operating state of said pump; and flow-out amount estimating means for estimating a cumulative amount of flow of the fluid from said reservoir, on the basis of said operating state of said pump estimated by said pump state estimating means and said pumping time obtained by said pumping time obtaining means.

40. A hydraulic pressure control apparatus for a brake including a brake cylinder activated by a pressurized fluid for braking a wheel of a vehicle, a reservoir for storing the fluid discharged from the brake cylinder, and a pump for pumping up the fluid from the reservoir and supplying the pumped-up fluid to said brake cylinder to increase a pressure of the fluid in the brake cylinder, said apparatus comprising:

a pressure detecting device for detecting the pressure of the fluid in said brake cylinder;

pumping time obtaining means for obtaining a pumping time during which the fluid is pumped up from said reservoir by said pump; and flow-out amount estimating means for estimating a cumulative amount of flow of the fluid from said reservoir, on the basis of said pumping time obtained by said pumping time obtaining means and said pressure of the fluid in said brake cylinder detected by said pressure detecting device.

41. A hydraulic braking system for a motor vehicle, comprising:

a master cylinder having two pressurizing chambers;

two fluid passages for connecting one of said two pressurizing chambers of said master cylinder to a front wheel brake cylinder and a rear wheel brake cylinder for braking a front and a rear wheel, respectively;

a first shut-off valve selectively placed in a connecting state for connecting said front and rear wheel brake cylinders to said master cylinder and a disconnecting state for disconnecting said wheel brake cylinders from said master cylinder;

a reservoir for storing a working fluid;

a pump for pressurizing the fluid pumped up from said reservoir and delivering the pressurized fluid to said front and rear wheel brake cylinders;

a valve device having a first state for permitting flows of the fluid from both of said front and rear wheel brake cylinders into said reservoir, a second state for permitting a flow of the fluid from said rear wheel brake cylinder into said reservoir while inhibiting a flow of the fluid from said front wheel brake cylinder, and a third state for inhibiting the flows of the fluid from both of said front and rear wheel brake cylinders while permitting a flow of said pressurized fluid from said pump into at least one of said front and rear wheel brake cylinders;

anti-lock pressure control means for controlling an operation of said pump while said first shut-off valve is placed in said connecting state, and selectively placing said valve device in said first, second and third states, so as to control pressures of the fluid in said front and rear wheel brake cylinders such that a slip of each of said front and rear wheels on a road surface upon activation of said front and rear wheel brake cylinder is maintained at a substantially optimum value; and said anti-lock pressure control means comprising reservoir fluid amount estimating means for estimating an amount of the fluid stored in said reservoir, on the basis of a pressure reducing time during which said valve device is placed in said first state, and an operating time of said pump.

42. A hydraulic braking system according to claim 41, wherein said reservoir fluid amount estimating means comprises deceleration obtaining means for obtaining a deceleration value of a body of the vehicle, and estimates said amount of the fluid stored in said reservoir on the basis of said deceleration value obtained by said deceleration obtaining means, said pressure reducing time and said operating time of said pump.

43. A hydraulic braking system according to claim 41, wherein said reservoir fluid amount estimating means comprises flow-in amount estimating means for estimating an amount of flow of the fluid into said reservoir on the basis of said pressure reducing time, said flow-in amount estimating means comprising deceleration obtaining means for obtaining a deceleration value of a body of the vehicle, and estimates said amount of flow of the fluid into said reservoir on the basis of said deceleration value obtained by said deceleration obtaining means and said pressure reducing time.

44. A hydraulic braking system according to claim 41, wherein said reservoir fluid amount estimating means comprises flow-in amount estimating means for estimating an amount of flow of the fluid into said reservoir on the basis of said pressure reducing time, said flow-in amount estimating means comprising a pressure detecting device for detecting at least the pressure of the fluid in said front wheel brake cylinder, and estimating said amount of flow of the fluid into said reservoir on the basis of said pressure of the fluid in said front wheel brake cylinder and said pressure reducing time.

45. A hydraulic braking system according to claim 41, wherein said reservoir fluid amount estimating means comprises flow-out amount estimating means for estimating an amount of flow of the fluid from said reservoir by pumping of the fluid by said pump, on the basis of said operating time of said pump, said flow-out amount estimating means comprising deceleration obtaining means for obtaining a deceleration value of a body of the vehicle, and estimating said amount of flow of the fluid from said reservoir on the basis of said deceleration value obtained by said deceleration obtaining means and said operating time of said pump.

46. A hydraulic braking system according to claim 41, further comprising an electric motor for operating said pump, and wherein said reservoir fluid amount estimating means comprises flow-out amount estimating means for estimating an amount of flow of the fluid from said reservoir by pumping of the fluid by said pump, on the basis of said operating time of said pump, said flow-out amount estimating means comprising a current detecting device for detecting an electric current flowing through said electric motor, and estimating said amount of flow of the fluid from said reservoir on the basis of said electric current detected by said current detecting means and said operating time of said pump.

47. A hydraulic braking system according to claim 41, wherein said valve device comprises a second shut-off valve disposed in a front wheel reservoir passage connecting said front wheel brake cylinder and said reservoir, and a third shut-off valve disposed in a portion of a rear wheel reservoir passage connecting said rear wheel brake cylinder and said reservoir, which portion also functioning as a portion of said front wheel reservoir passage, said pump having a delivery port connected to a portion of said front wheel reservoir passage between said front wheel brake cylinder and said second shut-off valve.

48. A hydraulic braking system according to claim 47, wherein said valve device further comprises a pressure reducing device disposed in a portion of said front wheel reservoir passage between said front wheel brake cylinder and said second shut-off valve, said pressure reducing device permitting a flow of the fluid therethrough in a first direction from said front wheel brake cylinder toward said reservoir and inhibiting a flow of the fluid therethrough in a second direction opposite to said first direction when the pressure of the fluid on one side of said pressure reducing device on the side of said front wheel brake cylinder is not higher than that on the other side of said pressure reducing device by more than a predetermined valve opening pressure difference, said pump having a delivery port connected to a portion of said front wheel reservoir passage between said pressure reducing device and said second shut-off valve.

49. A hydraulic braking system according to claim 41, wherein said anti-lock pressure control means comprises means for holding said pump in an operated state during during an anti-lock pressure control operation for at least one of said front and rear wheel brake cylinders such that said slip is maintained at said substantially optimum value.

50. A hydraulic braking system according to claim 41, further comprising valve control means for switching said first shut-off valve from said disconnecting state to said connecting state when said amount of the fluid stored in said reservoir estimated by said reservoir fluid amount estimating means is reduced below a predetermined lower limit.

51. A hydraulic braking system according to claim 41, further comprising pump control means for turning off said pump when said amount of the fluid stored in said reservoir estimated by said reservoir fluid amount estimating means is reduced below a predetermined lower limit.

52. A hydraulic braking system according to claim 41, further comprising an electric motor for operating said pump, and wherein said anti-lock pressure control means comprises current control means for controlling an electric current to be supplied to said electric motor.

* * * * *

UNITED STATES PATENT AND TRADEMARK OFFICE
CERTIFICATE OF CORRECTION

PATENT NO. : 5,683,149
DATED : 4 November 1997
INVENTOR(S) : Hideyuki AIZAWA et al.

It is certified that error appears in the above-identified patent and that said Letters Patent is hereby corrected as shown below:

| Column | Line | |
|---|---|---|
| 2 | 24 | After "left" delete "10". |
| 3 | 10 | After "third" delete "10". |
| 13 | 44 | Change "the during" to --time during--. |
| 24 | 19 | After "motor" insert --.--. |
| 42 | 8 | Move "Front Wheel" to line 9 above the word "Brake" on line 10. |
| 46 | 57 | Move "Front Wheel" to line 58 above the word "Brake" on line 59. |
| 47 | 6 | Move "Front Wheel" to line 7 above the word "Brake" on line 8. |

UNITED STATES PATENT AND TRADEMARK OFFICE
CERTIFICATE OF CORRECTION

PATENT NO. : 5,683,149

DATED : 4 November 1997

INVENTOR(S) : Hideyuki AIZAWA et al.

It is certified that error appears in the above-identified patent and that said Letters Patent is hereby corrected as shown below:

| Column | Line | |
|---|---|---|
| 64 | 34 | Change "212,220" to --212, 220--. |
| 69 | 26 | Change "TDX" to --$T_{DX}$--. |
| 71 | 63 | Change "TDX" to --$T_{DX}$--. |
| 75 | 31 | Change "described-" to --described.--. |

Signed and Sealed this

Twenty-sixth Day of May, 1998

Attest:

BRUCE LEHMAN

Attesting Officer

Commissioner of Patents and Trademarks